US011998772B2

(12) United States Patent
Mohanraj et al.

(10) Patent No.: US 11,998,772 B2
(45) Date of Patent: Jun. 4, 2024

(54) RECEPTACLE DEVICE

(71) Applicants: Vasanth Mohanraj, San Francisco, CA (US); Derek Jenwen Ho, Oakland, CA (US)

(72) Inventors: Vasanth Mohanraj, San Francisco, CA (US); Derek Jenwen Ho, Oakland, CA (US)

( * ) Notice: Subject to any disclaimer, the term of this patent is extended or adjusted under 35 U.S.C. 154(b) by 0 days.

(21) Appl. No.: 17/564,871

(22) Filed: Dec. 29, 2021

(65) Prior Publication Data

US 2022/0241622 A1 Aug. 4, 2022

Related U.S. Application Data

(60) Provisional application No. 63/143,133, filed on Jan. 29, 2021.

(51) Int. Cl.

| | |
|---|---|
| ***A62B 18/08*** | (2006.01) |
| ***A41D 13/11*** | (2006.01) |
| ***A62B 18/10*** | (2006.01) |

(52) U.S. Cl.

CPC ........ *A62B 18/086* (2013.01); *A41D 13/1107* (2013.01); *A62B 18/10* (2013.01)

(58) Field of Classification Search

CPC ....... A62B 18/086; A61M 16/06–0694; A41D 13/11–1192

See application file for complete search history.

(56) References Cited

U.S. PATENT DOCUMENTS

| | | | | |
|---|---|---|---|---|
| 2,023,267 | A * | 12/1935 | De Saint Rapt | A62B 18/086 137/849 |
| 2,540,567 | A * | 2/1951 | Bennett, V | A62B 18/086 128/206.26 |
| 4,823,785 | A | 4/1989 | Mancosu | |
| 4,896,666 | A | 1/1990 | Hinkle | |
| 5,146,913 | A | 8/1992 | Khorsandian | |
| 9,044,541 | B2 * | 6/2015 | Blanchard | A61M 25/0075 |
| 10,980,296 | B1 * | 4/2021 | Hosac | A62B 18/10 |
| 2005/0043703 | A1 * | 2/2005 | Nordgren | A61M 25/0075 604/246 |
| 2009/0114228 | A1 * | 5/2009 | Kirschner | A01M 31/008 128/206.13 |
| 2010/0199996 | A1 * | 8/2010 | Fu | A61M 16/06 128/206.21 |

(Continued)

FOREIGN PATENT DOCUMENTS

CN 212036128 U 12/2020

OTHER PUBLICATIONS

International Search Report and Written Opinion issued in related international Application No. PCT/US2021/073161, dated Mar. 15, 2022, 12 pages.

*Primary Examiner* — Rachel T Sippel
(74) *Attorney, Agent, or Firm* — Shirley A. Recipon

(57) ABSTRACT

There is provided a receptacle device for a mask, the receptacle device comprising: a valve; a body portion surrounding the valve; and an anchor portion; wherein the body portion and the anchor portion are integrally formed; and wherein the anchor portion and the body portion define a channel therebetween, and the channel is configured to releasably engage the mask. A method of manufacturing a mask assembly or retrofitting a receptacle device to a workpiece mask is also provided which comprises a mask and said receptacle device.

25 Claims, 47 Drawing Sheets

(56) References Cited

U.S. PATENT DOCUMENTS

| | | | | |
|---|---|---|---|---|
| 2012/0091381 | A1* | 4/2012 | Kern | F16K 15/145 251/336 |
| 2012/0247474 | A1* | 10/2012 | Torbenson | A62B 18/10 128/206.15 |
| 2016/0331930 | A1* | 11/2016 | Okamura | A61M 25/0097 |
| 2019/0357708 | A1* | 11/2019 | Rees | B65D 51/165 |

* cited by examiner

SECTION A-A

SECTION C-C

SECTION D-D

SECTION H-H

SECTION I-I

SECTION F-F

SECTION G-G

SECTION H-H

SECTION I-I

SECTION J-J

FIG. 19a
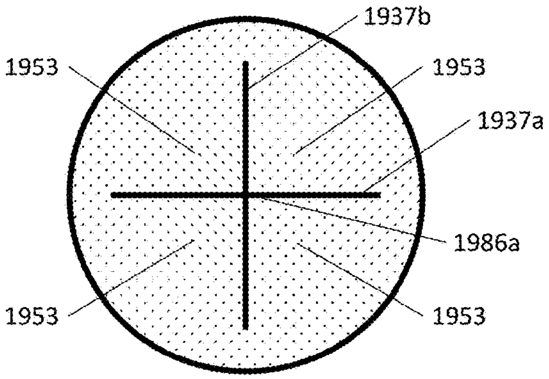
FIG. 19b
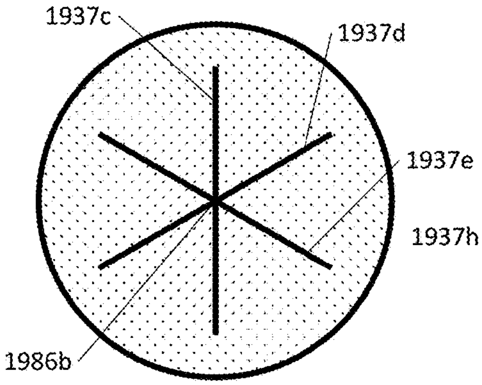
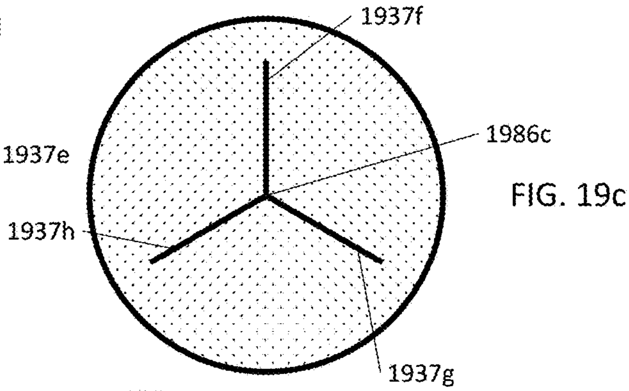
FIG. 19c
FIG. 19d
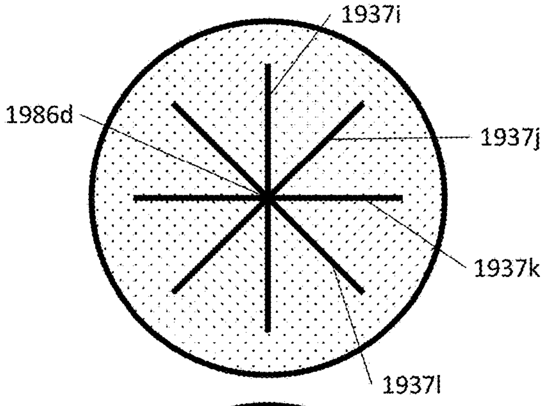
FIG. 19e
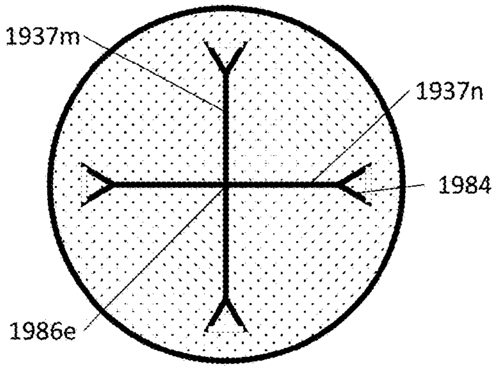

RECEPTACLE DEVICE

FIELD OF THE INVENTION

Embodiments of the present invention are directed to a receptacle device. More specifically, the present invention relates to a receptacle device for a (facial) mask. The present invention also encompasses a mask assembly comprising a mask and a receptacle device; a method of manufacturing a mask assembly; a method of drinking, feeding or inhaling without unmasking; and use of a mask assembly on a user's face for drinking, feeding or inhaling without unmasking.

BACKGROUND OF THE INVENTION

The present application was filed in January 2021. This is during the time at which the COVID-19 pandemic had forced many governments globally to order their subjects to the confines of their homes in an attempt to minimize contact between humans and slow down the spread of the virus (lockdown). A vital component in combatting the virus was the use of facial masks that were to be worn by people in order to reduce the effects of the virus. In the US, for example, guidelines were provided by the Centers for Disease Control and Prevention (CDC) and the World Health Organization (WHO) on how and why masks should be worn by the general public to safeguard against the virus.

More specifically, these organizations confirmed that masks are a key measure to suppress transmission and save lives. Masks reduce potential exposure risk from an infected person whether they have symptoms or not. Further, people wearing masks are protected from becoming infected. Furthermore, masks also prevent onward transmission when worn by a person who is infected. The CDC recommended that people wear masks in public settings, involving public and mass transportation, at events and gatherings, and anywhere they will be around other people. The guidelines also stated that people should wear a mask over their nose and mouth and secure it under their chin for optimum protection.

In the US, as local and federal governments eased the lockdown restrictions, people were again able to begin socializing, albeit in a more limited capacity than normal. People were able to meet at local coffee shops, bars, restaurants and the like, during which they often came into contact with their peers to share a meal or a beverage. One of the exceptions to the rule of wearing a mask in public has been when people are drinking or eating in public, what has commonly become known as "the mask loophole." However, the risk of becoming infected by the virus does not diminish simply because persons are drinking or eating; but since it is difficult or impractical to drink or eat with a mask on, it appears the risk is overlooked or somewhat tolerated. Since March 2020 to January 2021, there have been three waves of increased virus infection rates in the US. Each of these waves have followed a period when lockdown restrictions were eased and people restarted interacting and perhaps not taking the appropriate measures of distancing and protecting themselves and others during social gatherings.

Clearly there exists a need to protect people during when they are drinking, feeding or inhaling, for example, in a social setting. While some people have opted to temporarily lift their mask away from their mouth region to drink or eat when in a social setting, this practice is both highly inconvenient and unsafe. For instance, it is highly inconvenient because a mask user would need to lift the mask away from their mouth for each sip of beverage or bite of food taken before replacing the mask to its original position. More importantly, this practice is unsafe because the protection afforded by the mask, when lifted away from the mouth region, is negated and the user thus becomes susceptible to infection by the airborne virus owing to nearby persons or if the user touches his/her mouth with his/her potentially virus-infected hands, for example.

Another technique employed by people to address this problem is to cut a small hole in their mask proximal the mouth region through which they can drink through a straw for instance. However, this technique provides only a marginal, and possibly no, improvement over lifting the mask temporarily since the virus is able to penetrate the mask very easily due to its size. The CDC confirms that research has shown that the particle size of SARS-CoV-2, the virus that causes COVID-19, is around 0.1 micrometer (μm). Thus, a hole of approximately 10 mm, for instance, created in a mask provides negligible defense to a user against the virus even when the hole is housing a straw for example. Additionally, such a hole creates a breach of the mask in the most dangerous place, in the air flow directly in front of the mouth and nose.

The present invention intends to address and/or at least in part overcome the limitations discussed above by presenting new designs and methods not hitherto contemplated nor possible by known constructions. More particularly, the invention intends to allow a user to wear a mask while drinking, feeding and inhaling while substantially maintaining the integrity/purpose of the mask; particularly the positional integrity of the mask against the face of the user.

SUMMARY OF THE INVENTION

According to an aspect of the present invention, there is provided a receptacle device for a mask, the receptacle device comprising: a valve; a body portion surrounding the valve; an anchor portion; wherein the body portion and the anchor portion are integrally formed; and wherein the anchor portion and the body portion define a channel therebetween, and the channel is configured to releasably engage the mask.

According to another aspect of the present invention, there is provided a receptacle device for a mask, the receptacle device comprising: a valve; a body portion surrounding the valve; and an anchor portion; wherein at least one of the body portion and anchor portion is configured to engage the mask by at least one of plastic joining, adhesive bonding, welding, mechanical fastening, stitching, and magnetic elements.

According to another aspect of the present invention, there is provided a receptacle device for a mask, the receptacle device comprising: a valve; a body portion surrounding the valve; an anchor portion; and a securing portion; wherein the anchor portion and the body portion define a channel therebetween, and the channel is configured to releasably engage the securing portion; and wherein the securing portion is configured to engage the mask by at least one of plastic joining, adhesive bonding, welding, mechanical fastening, stitching, and magnetic elements.

One purpose of the present invention is the provision of a receptacle device (i.e. a universal docking system or receptacle) for a mask, such as a facial mask, that allows for various drinking/feeding/inhaling instruments (i.e. inserts, apparatus or connectors) to be inserted and withdrawn easily and frequently through and from the mask, without compromising the positional integrity of the mask. By positional integrity, it should be understood that the position of the mask with respect to the user's face remains substantially unaltered, thus providing superior protection to the user against infection with COVID-19, for instance, compared with known techniques and constructions. More particularly, a straw for drinking a beverage, for example, may be pushed through the receptacle device without the need to remove or shift the mask, while at the same time providing an air-tight or near air-tight seal before, during, and after the act of drinking using the straw. Since the mask remains intact during insertion and removal of drinking/feeding/inhaling instrument from the receptacle device, this prevents any unwanted contaminants from entering the nose or mouth of the user via the edges of the mask.

The receptacle device thus allows for the operator/user to consume various substances without compromising the integrity, purpose, utility and efficacy of the mask. The primary purpose of the mask is to protect the user from harmful contaminants that may be airborne or may come directly into contact with the user's face via contaminated hands or the like. In this way, the inventors realized that a receptacle device formed according to the present invention affords more constant protection against the inhalation and exhalation of particulate matter (solid and liquid particles) suspended in the air such as but not limited to aerosolized and projectile water droplets containing microbes, pollutants, smoke, toxic fumes, and the like. The air-tight or near air-tight seal helps prevention of air transfer from the outside to the inside of a mask, and vice versa, especially so close to the inhalation and exhalation orifices of the body (mouth and nose), thus reducing the risk of contamination, contagion, and pollution to a minimum.

As will be discussed further herein, the receptacle device allows for the consumption of various substances that include but are not limited to liquids, foods, gases, and vapors without compromising the integrity of the mask and consequently without compromising the safety of the user in a public setting.

The receptacle device can be used with any suitable mask. It may be pre-installed or built-in to a mask, or may be distributed as a kit for self-assembly by the end user in a retrofit manner to an existing mask.

The receptacle device makes it highly convenient for a mask user because it eradicates the need to remove or lift the mask away from their mouth for each sip of beverage or bite of food taken before replacing the mask to its original position, which would otherwise be the case with known methods and constructions discussed above. This is advantageous because it requires less physical and mental energy by the user compared with when using a mask without a receptacle device since the user would have to ensure the mask is replaced to its original and correct position each time a sip of beverage or bite of food is taken. The receptacle device of the present invention in this way largely eliminates user error because the step of removing/shifting the mask is not involved when the receptacle device is used with a mask, for instance. It also provides protection during the period of consumption, wherein otherwise the user would be exposed during the removing/shifting of the mask. Additionally, without a receptacle device, once the user removes the mask, there is a high likelihood that the user will not replace the mask between sips/bites. It often stays off until the entire consumption is finished. In such case, the receptacle device provides significantly increased protection in that the user will keep the mask on.

In social settings when alcohol is consumed, the ability of a mask user to replace a mask to its original and correct position each time following a sip of alcohol will gradually diminish. It is well documented that drinking alcohol causes the phenomenon of euphoria by increasing the release of dopamine in a subject, which creates a pleasurable sensation. During euphoria, the subject generally feels relaxed, but also experiences impairment of reasoning and memory, and loss of inhibition. The lowered inhibition has been shown to reduce the disciplined practice of behaviors, such as mask usage. It is these effects on the brain which contribute to a mask being improperly worn and used by a user in a social setting when consuming alcohol. Due to the impairment of reasoning and memory, and loss of inhibition, a user may fail to notice that the mask has not been replaced to its correct position; a user may fail to notice that the mask has shifted to an incorrect position on the face allowing contaminants to enter; a user may forget to replace the mask to its correct position after consuming a sip of alcohol; and a user may lose inhibition of socializing without wearing a mask. As a result, public gatherings involving alcohol consumption have been found to be a contributing factor in the increased virus infection rates seen in the US, at least, where the likelihood of mask misuse increases significantly.

The receptacle device of the present invention may encourage more people to engage in social settings in the knowledge that this can be done in a safe manner by utilizing the receptacle device to drinking, feed or inhale without unmasking. Encouraging more people to interact is advantageous in that it allows people to leave their homes to engage with their peers; thus preventing or at least reducing the following: back pain and posture issues (sitting for prolonged periods puts a huge stress on back muscles, the neck, and the spine—slouching makes this worse); social isolation has been associated with a significantly increased risk of premature mortality from many causes; risk of developing dementia; risk of incident coronary heart disease; risk for cancer mortality; risk of functional decline; risk of stroke; depression; suicidal ideation; suicide; mental health decline; substance abuse; anxiety disorder and depressive disorder; trauma- and stressor-related disorder (TSRD); and since lockdowns first began at the start of the COVID-19 pandemic, advocates for domestic abuse victims have sounded the alarm that calls to stay home could increase cases of intimate partner violence. Use of the receptacle device reduces social isolation to prevent/reduce the above problems.

The shape of the body portion may be annular, square, circular, triangular, pentagonal, hexagonal, octagonal, cylindrical, cubic, elliptical, oval, lip-shaped or a shield.

The shape of the anchor portion may be annular, square, circular, triangular, pentagonal, hexagonal, octagonal, cylindrical, cubic, elliptical, oval, lip-shaped or a shield.

It may be that body portion and the anchor portion are separate components.

At least one of the body portion and the anchor portion may be interchangeable. It may be that the interchangeable body portion is attachable to the anchor portion. It may be that the interchangeable anchor portion is attachable to the body portion. The interchangeable body portion may serve the purpose of swapping out or exchanging body portions to adapt to different uses, including but not limited to changing the body portion for a different shape, color, or valve size. The interchangeable anchor portion may serve the purpose of swapping out anchor portions to adapt to different uses or preferences, including but not limited to changing the anchor for a different shape, color, size or material. This may allow greater versatility for the receptacle device in that a body portion or anchor portion can easily be replaced for reasons of damage thereto or preference of the user, for instance.

The body portion may be connectable to the anchor portion.

The body portion may be moveable between a first position and a second position relative to the anchor portion.

It may be that movement towards the first position causes generation of a substantially hermetic seal between the anchor portion and the body portion, and movement towards the second position causes breaking of the substantially hermetic seal between the anchor portion and the body portion.

The body portion may be connectable to the anchor portion by screwing thereon.

It may be that the anchor portion comprises a threaded surface, and the body portion comprises a threaded aperture, and wherein the threaded surface mates with the threaded aperture.

The body portion may be connectable to the anchor portion by a push-pull connection.

The body portion may slidably engage the anchor portion.

The anchor portion may be connected with the body portion through the mask without first creating a hole in the mask. This may provide an easier installation process for the receptacle device, without the need to pre-cut a hole in the mask.

The body portion and the anchor portion may be integrally formed. This may improve the robustness and structural integrity of the receptacle device.

The receptacle device may be molded or 3D printed. This may enhance the ease with which the receptacle device is manufactured in terms of time taken and cost of manufacture.

The receptacle device may be a unitary construction.

It may be that the valve allows communication between a mask interior and mask exterior.

The valve may be configured to receive a drinking, feeding or inhalation instrument therethrough.

The drinking, feeding or inhalation instrument may be at least one selected from a straw, a bottle pourer, a spout, a squeeze bottle, a tube, a hose, a nebulizer, a smoking apparatus, an e-cigarette, a vape pen, an inhaler, and a ventilator. Of course, other suitable drinking, feeding or inhalation instruments are also contemplated.

The valve may be flexible. The flexibility of the valve may allow it to be manipulated during installation, and still retain the integrity of its seal post installation.

The valve may be elastomeric.

The elastomeric valve may comprise a material selected from silicone, rubber, a thermoplastic elastomer (TPE), and combinations thereof.

The valve may comprise a material selected from silicone, plastic, rubber, a thermoplastic elastomer (TPE), and combinations thereof.

The above characteristics (flexible, elastomeric, material composition) enable the valve to close and open, allowing the drinking, feeding or inhalation instrument to push through the valve while providing an air-tight or near air-tight seal. This prevents air transmission through the valve when closed and minimizes air leakage when pushed open.

It may be that the valve is a self-sealing valve. This automatic prevents unwanted contaminants from entering the mask when using a receptacle device.

When the drinking, feeding or inhalation instrument is withdrawn, the self-sealing valve reforms/folds back to its original position, once again forming a secure seal after use. This self-sealing feature is of high value to the integrity and purpose of the mask, as users may frequently insert and withdraw the drinking, feeding or inhalation instrument multiple times during consumption.

The self-sealing valve may be configured to generate a hermetic seal.

The valve may be hemispherical. The hemispherical valve may provide several advantages over a flat valve. The hemispherical bowl smoothly funnels/guides the drinking, feeding or inhalation instrument towards the valve opening (slits). The angled approach vector provided by the hemispherical bowl may offer less resistance on insertion and may allow a wider margin of error as the user aims the drinking, feeding or inhalation instrument towards the valve opening. This may improve the ease of insertion and withdrawal, and thus the user experience, increasing user adoption and adherence to the present disclosure.

The valve may be flexibly suspended from the body portion. This may be for dampening a force exerted on the body portion for example or to accommodate variations during insertion. This type of suspended valve may provide several advantages over a standard hemispherical or flat valve. It may protect the valve and seal from external forces: The suspended area between the valve and the body portion may act to dampen the impact from external forces on the body portion, thus protecting the integrity of the valve and maintaining the seal (minimizing air leakage). The suspended valve may also create a better seal during insertion and use of the drinking, feeding, or inhalation instrument. The suspension may allow the valve to slide/shift and better adjust to the position and angle of the drinking, feeding, or inhalation instrument, thus more securely gripping the drinking, feeding, or inhalation instrument. The more secure grip creates a better seal and minimizes air leakage. Embodiments in which the valve is flexibly suspended from the body portion may also provide more freedom of insertion for the drinking, feeding or inhalation instrument through the valve. This may encompass, for example, greater degrees of angle, placement, and positioning of the drinking, feeding or inhalation instrument within or with respect to the valve. It may be that the flexibly suspended valve from the body portion allows the valve to better conform to various insertion angles and placements of the drinking, feeding or inhalation instrument. This enhanced conformation of the drinking, feeding or inhalation instrument with respect to the valve may improve the seal generated by the valve with the respective drinking, feeding or inhalation instrument, for example. The suspended valve may also provide an easier withdrawal of the drinking, feeding or inhalation instrument. The suspension may allow the valve petals to invert upon withdrawal, thus pointing them in the same direction of movement as the drinking, feeding, or inhalation instrument. When the valve petals are pointed in the direction of movement, they offer less resistance and a better user experience during withdrawal.

The receptacle device may comprise a suspension ridge associated with the body portion, wherein the valve is suspended from the suspension ridge.

The valve, suspension ridge and body portion may define a space, such as an empty space, therebetween.

The shape of the valve may be annular, square, circular, triangular, pentagonal, hexagonal, octagonal, cylindrical, cubic, elliptical, or oval.

The valve may be dome-shaped.

The valve may be convex.

The valve may be concave.

The body portion may be flexible. The flexibility of the body portion may allow it to be manipulated through a tight hole in the mask or securing ring during installation, and still retain the integrity of its shape and valve seal post installation.

The body portion may be rigid.

It may be that the body portion comprises at least one of a silicone material, plastic composites, a thermoplastic elastomer (TPE), metal, rubber, Acrylonitrile Butadiene Styrene (ABS), Thermoplastic Polyurethane (TPU), Polylactic Acid (PLA), High Impact Polystyrene (HIPS), Polyethylene terephthalate (PETG), Nylon, Carbon Fiber Filled, Acrylonitrile styrene acrylate (ASA), Polycarbonate, Polypropylene, Metal Filled, Wood Filled, and combinations thereof. Some suitable materials for 3D applications in particular may include Acrylonitrile Butadiene Styrene (ABS)—ABS is a low-cost material, that exhibits excellent properties for printing tough and durable parts that can withstand high temperatures; Thermoplastic elastomers (TPE) or Thermoplastic Polyurethane (TPU)—Flexible filaments, commonly referred to as TPE or TPU, exhibit excellent elasticity allowing the material to easily stretch and bend; Polylactic Acid (PLA)—PLA is exceptional due to its ease-of-use, dimensional accuracy, and low cost; High Impact Polystyrene (HIPS)—HIPS is a lightweight material particularly suitable for use as a dissolvable support structure for ABS models; Polyethylene terephthalate (PETG)—PET and PETG filaments are important for their ease of printability, smooth surface finish, and water resistance; Nylon—Nylon is a tough and semi-flexible material that offers high impact and abrasion resistance, and makes it an excellent choice for printing durable parts; Carbon Fiber Filled—Carbon fiber filaments contain short fibers that are infused into a PLA or ABS base material to help increase strength and stiffness; Acrylonitrile styrene acrylate (ASA)—ASA is a useful alternative to ABS and is particularly suitable for outdoor applications due to its high UV, temperature, and impact resistance; Polycarbonate—Polycarbonate has high strength and durability, and has very high heat and impact resistance making it an excellent choice for tough environments; Polypropylene—Polypropylene is particularly suitable for high-cycle, low strength applications due to its fatigue resistance, semi-flexible, and lightweight characteristics; Metal Filled—Metal filled filaments are made by mixing a fine metal powder into a base material (e.g., PLA) providing a unique metallic finish and added weight; and Wood Filled—Wood filaments combine a PLA base material with cork, wood dust, or other derivatives, giving the models a real wooden look and feel.

The body portion may comprise gripping ridges or notches. The gripping ridges/notches may provide the user an easier surface to locate and hold when inserting or withdrawing the drinking, feeding or inhalation instrument. They may also help secure a better grip during the installation process, such as (but not limited to) when connecting the body portion to the anchor portion using a screwing or push-pull connection.

The gripping ridges/notches may be equidistantly positioned about a perimeter of the body portion.

The body portion may surround the valve about its perimeter. This may provide an improved seal therewith.

The valve may comprise a slit pattern. These slits may create valve petals that open upon pressure from the insertion of a drinking, feeding or inhalation instrument. The slit pattern may minimize the air gaps around the drinking, feeding or inhalation instrument, yet still accommodate various sized drinking, feeding or inhalation instruments.

The slit pattern may generate valve petals. The petals may flexibly adapt to and apply pressure to the drinking, feeding or inhalation instrument, allow the valve to secure a better seal on the drinking, feeding or inhalation instrument.

It may be that the slit pattern comprises dual crosshairs.

The slit pattern may comprise at least three crosshairs.

It may be that each of the at least three crosshairs radially extend from a common center and are radially equally spaced.

It may be that the at least three crosshairs intersect at their respective centers and are radially equally spaced.

The slit pattern may comprise at least four crosshairs.

The slit pattern may comprise a snowflake pattern. The snowflake pattern creates additional mini valve petals to better adapt to the drinking, feeding or inhalation instrument, creating a better seal and minimizing air gaps.

The snowflake pattern may comprise at least two crosshairs.

The slit pattern may be configured to conform to the shape of a drinking, feeding or inhalation instrument when inserted through the valve.

The slit pattern may be configured to releasably grip and hold in position a drinking, feeding or inhalation instrument when inserted through the valve.

In at least some embodiments, the receptacle device comprises an anchor portion. The anchor portion may serve the purpose of anchoring/securing the receptacle device and body portion through the mask, thereby trapping/fitting the mask between the body portion and anchor portion. The anchor portion may also provide a surface for the user's lips to brace against during insertion of the drinking, feeding or inhalation instrument, making it easier to push the instrument through during insertion and thereby enhancing the user experience.

The anchor portion may be configured to be substantially flush with the inner surface of the mask. The substantially flush surface may prevent the anchor portion from protruding into the user's mouth. The substantially flush surface may also make it easier for the user's lips to brace against during insertion of the drinking, feeding or inhalation instrument.

The anchor portion may comprise at least one of a silicone material, plastic composites, a thermoplastic elastomer (TPE), metal, rubber, Acrylonitrile Butadiene Styrene (ABS), Thermoplastic Polyurethane (TPU), Polylactic Acid (PLA), High Impact Polystyrene (HIPS), Polyethylene terephthalate (PETG), Nylon, Carbon Fiber Filled, Acrylonitrile styrene acrylate (ASA), Polycarbonate, Polypropylene, Metal Filled, Wood Filled, and combinations thereof.

The anchor portion may comprise a silicone surface. The silicone may provide a soft surface for the lips to brush and brace against during insertion of the drinking, feeding or inhalation instrument, thereby improving the user experience.

The anchor portion may comprise gripping ridges or notches. The gripping ridges/notches may provide a better grip during the installation process, such as, but not limited to, when connecting the body portion to the anchor portion using a screwing or push-pull connection.

The gripping ridges/notches may be equidistantly positioned about a perimeter of the anchor portion.

The receptacle device may comprise a securing portion. The securing portion (or in at least some embodiments a securing ring) may sit between the body portion and the outside of the mask, providing pressure between the body portion, mask, and anchor portion. This pressure may create a tighter seal between the body portion, mask, and anchor portion, thereby minimizing air leaks. The securing portion may also allow the receptacle device to fit and securely seal to masks of varying thickness and with various sized and shaped holes, thereby allowing the receptacle device to be retrofitted and work with other masks. It may also allow for masks with imperfect holes (imperfect symmetry and size) to still seal securely with the receptacle device. The securing portion may also provide a grabbable surface for the user during insertion of the drinking, feeding or inhalation instrument, and may improve the user experience and ease of insertion by providing an easier target for the user to locate the receptacle device's valve opening. The securing portion may also provide a solid structure to be used as an opposable surface; this surface may make it easier for the user's fingers to push against during withdrawal of the drinking, feeding or inhalation instrument, thereby providing better user ergonomics.

The body portion may comprise the securing portion.

The securing portion may be a separate component.

The securing portion may be configured to engage at least one of the body portion, anchor portion, and mask.

It may be that the shape of the securing portion is annular, square, circular, triangular, pentagonal, hexagonal, octagonal, cylindrical, cubic, elliptical, or oval.

The securing portion may be rigid.

The securing portion may comprise at least one of a silicone material, nylon, plastic composites, a thermoplastic elastomer (TPE), metal, rubber, and combinations thereof.

It may be that the securing portion comprises gripping ridges or notches. The gripping ridges/notches may provide the user an easier surface to locate and hold when inserting or withdrawing the drinking, feeding or inhalation instrument. They may also help secure a better grip during the installation process.

The gripping ridges/notches may be equidistantly positioned about a perimeter of the securing portion.

The receptacle device may comprise a guide portion. The guide portion may provide a wider berth (entry point) for the user to guide the drinking, feeding or inhalation instrument towards the valve opening. This may allow a wider margin of error when the user is inserting the drinking, feeding or inhalation instrument.

The body portion may comprise the guide portion.

The guide portion may be detachably attachable to the body portion.

The securing portion may comprise the guide portion.

The guide portion may be detachably attachable to the securing portion.

The guide portion may comprise a base and a wall, and wherein the wall tapers towards the base. The tapered wall provides an angled approach vector during insertion, beginning with a wide entry point and smoothly sliding the drinking, feeding or inhalation instrument down towards the valve opening.

It may be that the guide portion comprises a base and a wall, and wherein the wall extends generally orthogonally from the base. The orthogonal wall provides a wider base for the user to locate the receptacle device during insertion of the drinking, feeding or inhalation instrument.

The guide portion may comprise a linear or exponential funnel shape.

The receptacle device may comprise a cap. The cap may serve at least two purposes. It may provide a cover for the receptacle device, providing an additional barrier of protection against air leakage when not actively in use (i.e. when a drinking, feeding or inhalation instrument is not being inserted).

The cap may be a separate component.

It may be that the cap is configured to engage the body portion.

The cap may be configured to engage the guide portion.

The cap may be movable between an open and closed position.

The valve may be covered when the cap is in the closed position.

The cap may be connectable to the body portion by screwing thereon, by clipping thereon, by a hinge connection, by a string attachment, by a push-pull connection, or by a magnetic connection.

It may be that the shape of the cap is disk-shaped, square, circular, triangular, pentagonal, hexagonal, octagonal, cylindrical, cubic, elliptical, or oval.

The cap may comprise an exterior surface for displaying advertising indicia or decoration. The cap may provide a surface for branding, sponsorship, or promotion, including causes that may inspire higher adoption and adherence of the present invention.

It may be that the securing portion comprises an exterior surface for displaying advertising indicia or decoration. The securing portion may provide a surface for branding, sponsorship, or promotion, including causes that may inspire higher adoption and adherence of the present invention.

The body portion may comprise an exterior surface for displaying advertising indicia or decoration. The body portion may also provide a surface for branding, sponsorship, or promotion, including causes that may inspire higher adoption and adherence of the present invention.

In at least some embodiments, the receptacle device may comprise a channel.

It may be that the shape of the channel substantially matches the shape of at least one of the anchor portion, body portion and securing portion.

The channel may be a groove.

The channel may be a disk-shaped space.

It may be that the shape of the channel is annular, square, circular, triangular, pentagonal, hexagonal, octagonal, cylindrical, cubic, elliptical, or oval.

The mask may be trapped within the channel to generate a substantially hermetic seal.

The mask may be engaged with at least one of the body portion and anchor portion to generate a substantially hermetic seal.

The mask may be engaged with the securing portion to generate a substantially hermetic seal. The securing portion may be trapped within the channel to generate a substantially hermetic seal.

The body portion may be configured to protrude through a hole in the mask.

The body portion may be configured to protrude through a hole in the securing portion. For example, the receptacle device may engage a mask or securing portion by way of a channel in the form of a groove. More particularly, the body portion may be pushed through a hole in a mask or securing portion so that it protrudes therethrough. The body portion may be flexible/deformable in that its shape can be temporarily changed to more easily fit through the hole in the mask or securing portion. For example, the body portion may be squeezed to help push it through the hole of the mask or securing portion. This provides the benefit of an integrally formed body portion and anchor portion, for instance, of larger diameter to squeeze through a smaller diameter hole of the mask or securing portion, thus allowing the mask or securing portion to be trapped/releasably engaged within the channel between the body portion and anchor portion. This flexibility of the body portion is what allows the integral formation of the body portion and anchor portion to be possible while still maintaining the releasable engagement of the mask or securing portion with the channel. The edges of the hole are thus able to enter and rest in the groove to close the hole of the mask or securing portion. The channel thus engages the mask or securing portion.

The valve may be alignable with a hole in the mask, allowing the drinking, feeding or inhalation instrument to go through the valve and mask hole in a single motion.

In another aspect, the present invention contemplates a mask assembly comprising a mask and a receptacle device, the receptacle device comprising: a valve; a body portion surrounding the valve; and an anchor portion; wherein the anchor portion and the body portion define a channel therebetween, and the channel releasably engages the mask.

In another aspect, the present invention contemplates a mask assembly comprising a mask and a receptacle device, the receptacle device comprising: a valve; a body portion surrounding the valve; and an anchor portion; wherein at least one of the body portion and anchor portion engages the mask by at least one of plastic joining, adhesive bonding, welding, mechanical fastening, stitching, and magnetic elements.

In another aspect, the present invention contemplates a mask assembly comprising a mask and a receptacle device, the receptacle device comprising: a valve; a body portion surrounding the valve; an anchor portion; and a securing portion; wherein the anchor portion and the body portion define a channel therebetween, and the channel releasably engages the securing portion; and wherein the securing portion engages the mask by at least one of plastic joining, adhesive bonding, welding, mechanical fastening, stitching, and magnetic elements.

Any of the mask assemblies defined herein may comprise any receptacle device defined herein.

The mask may comprise a material including at least one of polypropylene, polystyrene, polycarbonate, polyethylene, polyester, cotton, linen, silk, wool, nylon, rayon, spandex, and combinations thereof.

The mask may comprise a filtration barrier for filtering particulate matter.

The particulate matter may include aerosolized or projectile water droplets containing at least one of microbes, pollutants, smoke, and toxic fumes.

The mask may comprise a hole alignable with the valve.

The hole may be positioned on the mask proximal a user's mouth region.

In another aspect, the present invention encompasses a method of manufacturing a mask assembly, comprising the steps of: providing a mask; providing a receptacle device having a valve, a body portion surrounding the valve, and an anchor portion, wherein the anchor portion and the body portion define a channel therebetween; engaging the channel with the mask.

In another aspect, the present invention encompasses a method of manufacturing a mask assembly, comprising the steps of: providing a mask; providing a receptacle device having a valve, a body portion surrounding the valve, and an anchor portion; engaging at least one of the body portion and anchor portion with the mask by at least one of plastic joining, adhesive bonding, welding, mechanical fastening, stitching, and magnetic elements.

In another aspect, the present invention encompasses a method of manufacturing a mask assembly, comprising the steps of: providing a mask; providing a receptacle device having a valve, a body portion surrounding the valve, an anchor portion, and a securing portion, wherein the anchor portion and the body portion define a channel therebetween; engaging the channel with the securing portion; engaging the securing portion with the mask by at least one of plastic joining, adhesive bonding, welding, mechanical fastening, stitching, and magnetic elements.

In at least some embodiments, it may be that the process of installation is such that an assembler or end user may be able to install the mask assembly onto a mask simply using their hands in under or around three simple steps. The simplicity of install increases user adoption of the present invention.

Any of the methods defined herein may involve providing any receptacle device defined herein.

Any of the methods defined herein may comprise the step of piercing a hole through the mask.

In at least some of the methods defined herein, the body portion and the anchor portion may be integrally formed, and the method may further comprise the step of pushing the body portion through the hole to engage the channel with the mask.

In at least some of the methods defined herein, the body portion and the anchor portion may be separate components, and the method may further comprise the step of connecting the body portion to the anchor portion, trapping the mask therebetween in the channel to generate a substantially hermetic seal. The step of piercing the hole through the mask may be performed after the mask is trapped in the channel.

In at least some methods defined herein, the hole may be aligned with the valve.

Any of the methods defined herein may comprise at least one of the step of providing a securing portion, the step of providing a cap, and the step of providing a guide.

In at least some methods defined herein, the body portion and the anchor portion may be separate components, and the method may further comprise the step of connecting the body portion to the anchor portion.

In at least some methods defined herein, the hole may be aligned with at least one of the body portion or anchor portion.

In at least some methods defined herein, the body portion and the anchor portion may be integrally formed, and the method may further comprise the step of pushing the body portion through the securing portion.

In at least some methods defined herein, the body portion and the anchor portion may be separate components, and the method may further comprise the step of connecting the body portion to the anchor portion, trapping the securing portion therebetween in the channel to generate a substantially hermetic seal.

In at least some methods defined herein, the hole may be aligned with the securing portion.

It may be that at least one of the body portion, anchor portion, securing portion, guide portion and cap are generated by at least one of injection molding, cast molding, 3D printing, and stamping.

In another aspect, the present invention envisages a method of drinking, feeding or inhaling without unmasking, comprising the steps of: providing a mask assembly comprising a mask and a receptacle device, the receptacle device comprising a valve, a body portion surrounding the valve, and an anchor portion, wherein the anchor portion and the body portion define a channel therebetween, and the channel releasably engages the mask, and piercing a hole through the mask in line with the valve; releasably attaching the mask assembly to at least partially cover the face of a user; inserting a drinking, feeding or inhalation instrument through the valve to the user's mouth when the user is drinking, feeding or inhaling through the valve; and removing the drinking, feeding or inhalation instrument from the valve and user's mouth when the user is not drinking, feeding or inhaling through the valve.

The method may comprise the step of providing a securing portion for engaging with the body portion.

In another aspect, the present invention envisages a method of drinking, feeding or inhaling without unmasking, comprising the steps of: providing a mask assembly comprising a mask and a receptacle device, the receptacle device comprising a valve, a body portion surrounding the valve, and an anchor portion, wherein at least one of the body portion and anchor portion engages the mask by at least one of plastic joining, adhesive bonding, welding, mechanical fastening, stitching, and magnetic elements, and piercing a hole through the mask in line with at least one of the body portion, the anchor portion and the valve; releasably attaching the mask assembly to at least partially cover the face of a user; inserting a drinking, feeding or inhalation instrument through the valve to the user's mouth when the user is drinking, feeding or inhaling through the valve; and removing the drinking, feeding or inhalation instrument from the valve and user's mouth when the user is not drinking, feeding or inhaling through the valve.

In another aspect, the present invention envisages a method of drinking, feeding or inhaling without unmasking, comprising the steps of: providing a mask assembly comprising a mask and a receptacle device, the receptacle device comprising a valve, a body portion surrounding the valve, an anchor portion, and a securing portion, wherein the anchor portion and the body portion define a channel therebetween, and the channel releasably engages the securing portion, the securing portion engages the mask by at least one of plastic joining, adhesive bonding, welding, mechanical fastening, stitching, and magnetic elements, and piercing a hole through the mask in line with at least one of the securing portion and the valve; releasably attaching the mask assembly to at least partially cover the face of a user; inserting a drinking, feeding or inhalation instrument through the valve to the user's mouth when the user is drinking, feeding or inhaling through the valve; and removing the drinking, feeding or inhalation instrument from the valve and user's mouth when the user is not drinking, feeding or inhaling through the valve.

Any of the methods defined herein may involve any mask assembly defined herein.

Any of the methods defined herein may comprise the step of providing a guide portion for detachably attaching to the body portion or securing portion, wherein the guide portion guides the drinking, feeding or inhalation instrument when being inserted through the valve.

Any of the methods defined herein may comprise the step of providing a cap for covering the valve when the user is not drinking, feeding or inhaling through the valve.

In another aspect, the present invention comprehends the use of a mask assembly on a user's face for drinking, feeding or inhaling without unmasking, the mask assembly comprising a mask and a receptacle device, the receptacle device comprising a valve, a body portion surrounding the valve, and an anchor portion, wherein the anchor portion and the body portion define a channel therebetween, and the channel releasably engages the mask, and wherein the valve is configured for receiving a drinking, feeding or inhalation instrument.

In another aspect, the present invention comprehends the use of a mask assembly on a user's face for drinking, feeding or inhaling without unmasking, the mask assembly comprising a mask and a receptacle device, the receptacle device comprising a valve, a body portion surrounding the valve, and an anchor portion, wherein at least one of the body portion and anchor portion engages the mask by at least one of plastic joining, adhesive bonding, welding, mechanical fastening, stitching, and magnetic elements, and wherein the valve is configured for receiving a drinking, feeding or inhalation instrument.

In another aspect, the present invention comprehends the use of a mask assembly on a user's face for drinking, feeding or inhaling without unmasking, the mask assembly comprising a mask and a receptacle device, the receptacle device comprising a valve, a body portion surrounding the valve, an anchor portion, and a securing portion, wherein the anchor portion and the body portion define a channel therebetween, and the channel releasably engages the securing portion, wherein the securing portion engages the mask by at least one of plastic joining, adhesive bonding, welding, mechanical fastening, stitching, and magnetic elements, and wherein the valve is configured for receiving a drinking, feeding or inhalation instrument.

Any of the uses defined herein may involve any mask assembly defined herein.

In another aspect, the present invention contemplates the use of any receptacle device defined herein for retrofitting to a mask.

In another aspect, the present invention envisages a method of creating a hole in a mask for engaging a receptacle device with the mask, the method comprising the steps of: providing a mask; providing a receptacle device for a mask, the receptacle device comprising a valve; a body portion surrounding the valve; and an anchor portion; wherein the anchor portion and the body portion define a channel therebetween, and the channel is configured to releasably engage the mask; providing a piercing tool comprising a longitudinal body and tip portion, wherein the width of the longitudinal body is substantially the same as the width of the channel; piercing the mask with the tip portion; and passing the longitudinal body through the mask to define a hole configured for releasably engaging the receptacle device with the mask.

The process of piercing this hole is such that an assembler or end user may be able to do so using no additional tools, and may do so within seconds for example. The simplicity of install increases user adoption of the present invention.

The method may involve providing any receptacle device defined herein.

It will be appreciated that the features disclosed herein in aspects and embodiments of the receptacle devices, assemblies, and methods can be used interchangeably with other aspect and embodiments without departing from the scope of the invention. The inventors contemplated such features being equally applicable in different embodiments to which they are shown or in the drawings, for example.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, in which:

FIGS. 19*a* to 19*e* are plan views of various valve slit patterns in accordance with embodiments of the invention;

DETAILED DESCRIPTION OF THE INVENTION

Figure 1:
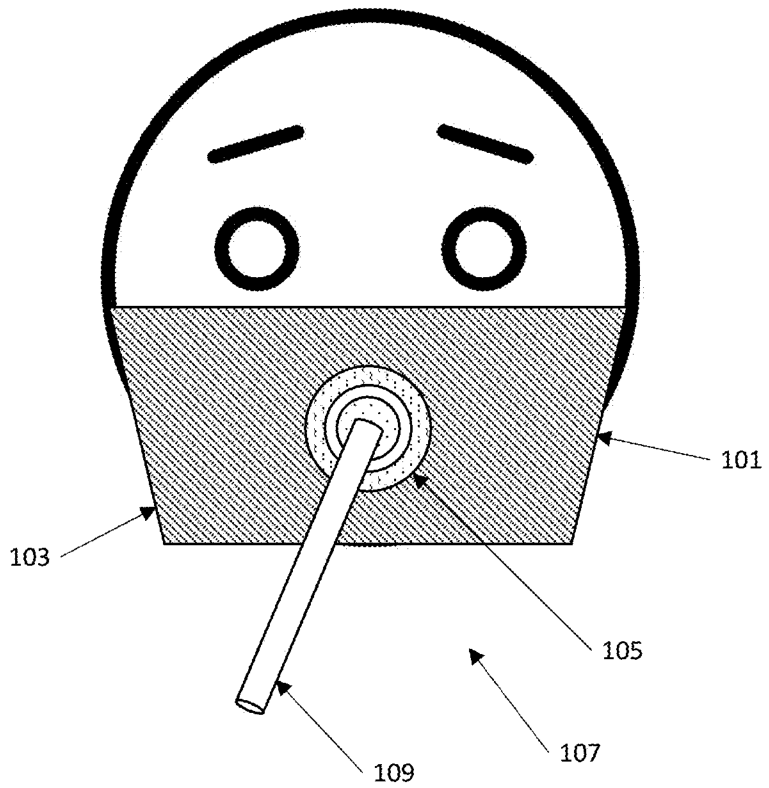
FIG. 1 is a schematic front view of a user wearing a mask bearing a receptacle device in accordance with an embodiment of the invention.

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration. Throughout this specification like reference numerals are used to denote like parts.

Referring to FIG. 1, there is shown a schematic front view of a user's face 101 wearing a mask 103 bearing a receptacle device 105 in accordance with an embodiment of the invention. In this embodiment, the mask 103 is made from a polypropylene material, but it will be appreciated that any suitable mask, for example, including a material of at least one of polycarbonate, polyethylene, polyester, cotton, linen, silk, wool, nylon, rayon, spandex, and combinations thereof could be used in conjunction with the receptacle device 105. FIG. 1 thus depicts a mask assembly generally indicated 107 formed in accordance with an embodiment of the present invention.

In this embodiment, the mask 103 has a trapezium shape which is positioned over the user's face 101 such that the mouth and nose (not shown) are covered. It will be appreciated that the mask may have any suitable shape to allow it fit over and ideally match the shape of a user's face, for instance. For example, the mask can be any shape and is most often rectangular (e.g., surgical mask). The receptacle device 105 is releasably engaged with the mask 103 and positioned near the user's mouth region (not shown) and is shown receiving a drinking instrument, which in this embodiment is a straw 109. It will be appreciated that the receptacle device 105 is configured to receive any of a drinking, feeding or inhalation instrument which may be at least one selected from a straw, bottle pourer, a spout, a squeeze bottle, a tube, a hose, a nebulizer, a smoking apparatus, an e-cigarette, a vape pen, an inhaler, and a ventilator, for instance. The straw 109 protrudes from the receptacle device 105 at a downward angle to provide maximum comfort to the user.

The receptacle device 105 (i.e., a universal docking system or receptacle) for the mask 103 allows for various drinking/feeding/inhaling instruments (i.e., inserts, apparatus or connectors) to be inserted and withdrawn easily and frequently through and from the mask 103, without compromising the positional integrity of the mask 103 with respect to the user's face 101. Thus, the position of the mask 103 with respect to the user's face 101 remains substantially unaltered, thus providing superior protection to the user against infection with COVID-19, for instance, compared with known techniques and constructions. More particularly, the straw 109 for drinking a beverage (not shown), for example, can be pushed through the receptacle device 105 without the need to remove or shift the mask 103, while at the same time providing an air-tight or near air-tight seal before, during, and after the act of drinking using the straw 109. Since the mask 103 remains intact during insertion and removal of the straw 109 from the receptacle device 105, this prevents any unwanted contaminants from entering the nose or mouth of the user via the edges of the mask 103.

The receptacle device 105 thus allows for the operator/user to consume various substances without compromising the integrity, purpose, utility and efficacy of the mask 103. The primary purpose of the mask 103 is to protect the user from harmful contaminants that may be airborne or may come directly into contact with the user's face 101 via contaminated hands or the like. In this way, the inventors realized that a receptacle device 105 formed according to the present invention affords more constant protection against the inhalation and exhalation of particulate matter (solid and liquid particles) suspended in the air such as but not limited to aerosolized and projectile water droplets containing microbes, pollutants, smoke, toxic fumes, and the like (not shown). The air-tight or near air-tight seal helps prevention of air transfer from the outside to the inside of a mask 103, and vice versa, especially so close to the inhalation and exhalation orifices of the body (mouth and nose), thus reducing the risk of contamination, contagion, and pollution to a minimum.

The receptacle device 105 makes it highly convenient for a mask user because it eradicates the need to lift the mask 103 away from their mouth for each sip of beverage or bite of food taken before replacing the mask to its original position, which would otherwise be the case with known methods and constructions discussed above. This is advantageous because it requires less physical and mental energy by the user compared with when using a mask without a receptacle device 105 since the user would have to ensure the mask is replaced to its original and correct position each time a sip of beverage or bite of food is taken. The receptacle device 105 of the present invention in this way largely eliminates user error because the step of removing/shifting the mask 103 is not involved when the receptacle device 105 is used with the mask 103.

In social settings when alcohol is consumed, the ability of a mask user to replace a mask to its original and correct position each time following a sip of alcohol will gradually diminish. It is well documented that drinking alcohol causes the phenomenon of euphoria by increasing the release of dopamine in a subject, which creates a pleasurable sensation. During euphoria, the subject generally feels relaxed, but also experiences impairment of reasoning and memory, and loss of inhibition. It is these effects on the brain which contribute to a mask being improperly worn and used by a user in a social setting when consuming alcohol. Due to the impairment of reasoning and memory, and loss of inhibition, a user may fail to notice that the mask has not been replaced to its correct position; a user may fail to notice that the mask has shifted to an incorrect position on the face allowing contaminants to enter; a user may forget to replace the mask to its correct position after consuming a sip of alcohol; and a user may lose inhibition of socializing without wearing a mask. As a result, public gatherings involving alcohol consumption have been found to be a contributing factor in the increased virus infection rates seen in the US, at least, where the likelihood of mask misuse and non-use increases significantly.

The receptacle device 105 of the present invention can encourage more people to engage in social settings in the knowledge that this can be done in a safe manner by utilizing the receptacle device 105 to drink, feed or inhale without unmasking. Encouraging more people to interact is advantageous in that it allows people to leave their homes to engage with their peers; thus preventing or at least reducing the following: back pain and posture issues (sitting for prolonged periods puts a huge stress on back muscles, the neck, and the spine—slouching makes this worse); social isolation has been associated with a significantly increased risk of premature mortality from many causes; risk of developing dementia; risk of incident coronary heart disease; risk for cancer mortality; risk of functional decline; risk of stroke; depression; suicidal ideation; suicide; mental health decline; substance abuse; anxiety disorder and depressive disorder; trauma- and stressor-related disorder (TSRD); and since lockdowns first began at the start of the COVID-19 pandemic, advocates for domestic abuse victims have sounded the alarm that calls to stay home could increase cases of intimate partner violence. Use of the receptacle device 105 reduces social isolation to prevent/reduce the above problems.

Figure 2:
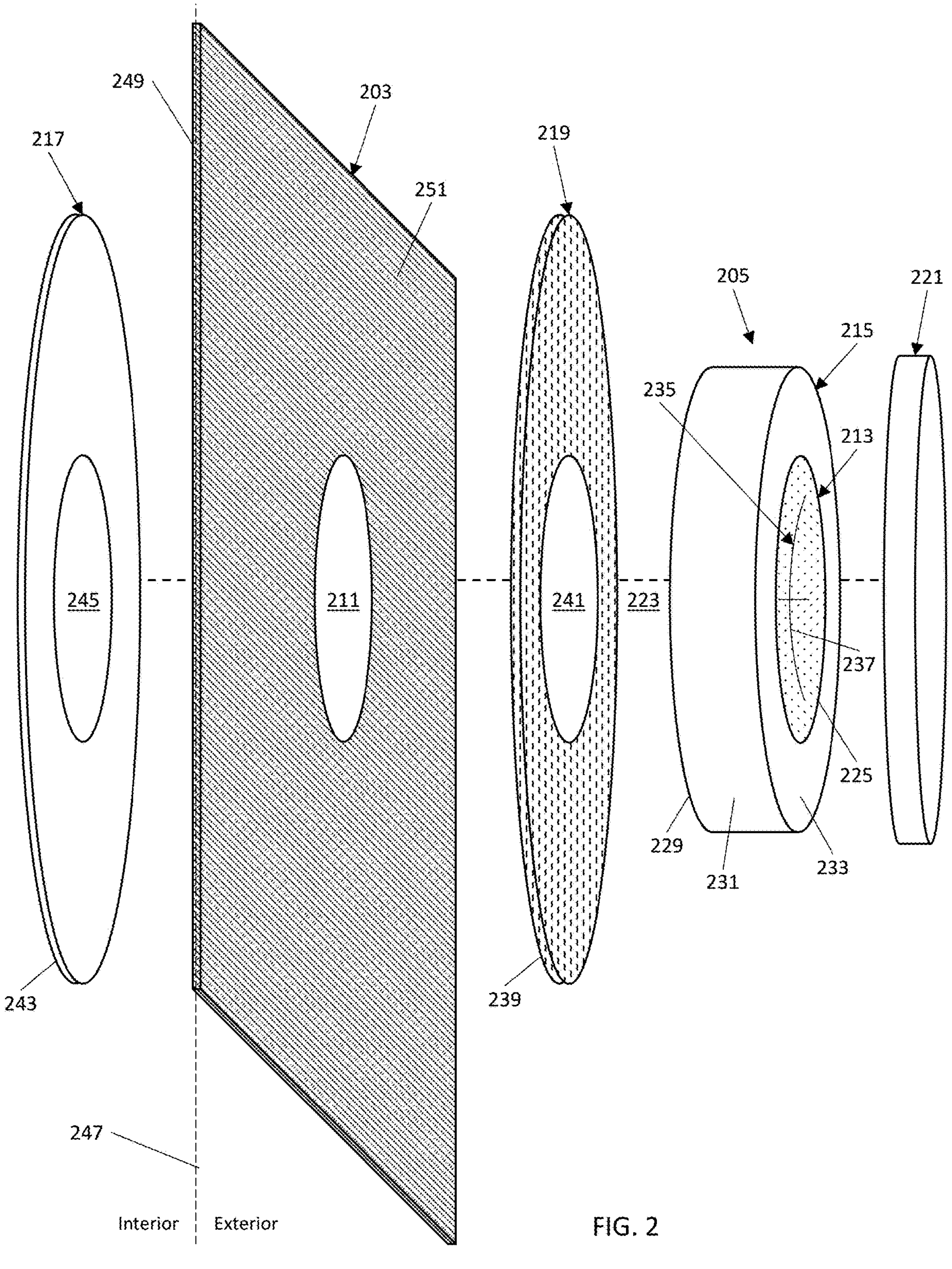
FIG. 2 is a perspective exploded view of a mask and receptacle device in accordance with an embodiment of the invention.

Referring now to FIG. 2, there is shown a perspective exploded view of a mask 203 and receptacle device generally indicated 205 formed in accordance with an embodiment of the present invention. In this embodiment, the mask 203 is a rectangular sheet of an electrostatic non-woven polypropylene fiber comprising a hole 211 at its center. In this embodiment, the receptacle device 205 comprises a valve 213, a body portion 215 surrounding the valve 213, an anchor portion 217, a securing portion 219 and a cap 221, wherein the anchor portion 217 and the body portion 215 define a channel 223 therebetween, and the channel 223 is configured to releasably engage the mask 203. It will be understood that the channel 223 may alternatively or additionally be located between the securing portion 219 and the mask 203, for instance, or between the securing portion 219 and mask 203, for instance, or between the and mask 203 and anchor portion 217 for instance.

It will be appreciated that the securing portion 219 and the cap 221 are not essential for the present invention to operate, but do offer advantages in combination with the other features of the invention over known methods and constructions. In this embodiment, the channel 223 has an annular shape, but it will be appreciated that in other embodiments the shape of the channel may substantially match the shape of at least one of the anchor portion, body portion and securing portion, or the shape of the channel may be a groove, a disk-shaped space, circular, triangular, pentagonal, hexagonal, octagonal, cylindrical, cubic, elliptical, or oval.

The body portion 215 is a short cylinder 231 with a hole 225 through its center. At the top 233 of the short cylinder 331 is located the valve 213. In this way, the body portion 215, by way of the hole 225 housing the valve 213, surrounds the valve 213. The valve 213 is half-domed shaped or hemispherical and comprises a slit pattern 235 in the form of two crosshairs 237 that intersect at their centers. The valve 213 shown in FIG. 2 is concave, as viewed from outside the mask. It will be appreciated the valve 213 may be concave or convex in other embodiments.

The cap 221 is disk-shaped and has substantially the same diameter as that of the top 233 of the body portion 215, such that in operation the cap 221 is able to cover the top 233 and consequently the valve 213 surrounded by the body portion 215. In this embodiment, the securing portion 219 is a ring 239 comprising a hole 241 at its center. In this embodiment, the anchor portion is also a ring 243 comprising a hole 245. The diameter of the securing portion 219 and the anchor portion 217 is the same in this embodiment, which diameter is approximately 50% greater, in this embodiment, than that of the body portion 215 and cap 221.

The mask 203 defines a partition 247 which can be seen as an exterior (exposed to airborne contaminants) and interior (protected from airborne contaminants). The exterior and interior regions are shown in FIG. 2. It will be understood that, in operation, the interior surface 249 of the mask 203 faces towards the user's face (not shown). In the same way, the exterior surface 251 of the mask 203 faces away from the user's face. The mask 203, therefore, protects the user from COVID-19 and the like.

When the receptacle device 205 is assembled, the respective holes 225, 241, 211, and 245 are aligned. More particularly, the body portion 215 is releasably connected to the anchor portion 217 by snap-fitting thereon (but could be screwed on or have a push-pull connection), and concurrently engaging the mask 203 in the channel 223 formed from said connection of the body portion 215 and anchor portion 217. To this end, the hole 211 is substantially hermetically sealed by the valve 213 which is aligned with the hole 211.

In this environment, the components shown—the cap 221, the body portion 215, the securing portion 219, and the anchor portion 217 are all separate components, but it will be understood that in other embodiments at least some of these components maybe integrally formed. For instance, the anchor portion and body portion maybe integrally formed, or the body portion may comprise the securing portion, or the receptacle device may be a unitary construction. The receptacle device 205 can be used with any suitable mask. It may be pre-installed or built into a mask, or may be distributed as a kit for self-assembly by the end user in a retrofit manner to an existing mask.

Figure 3A:
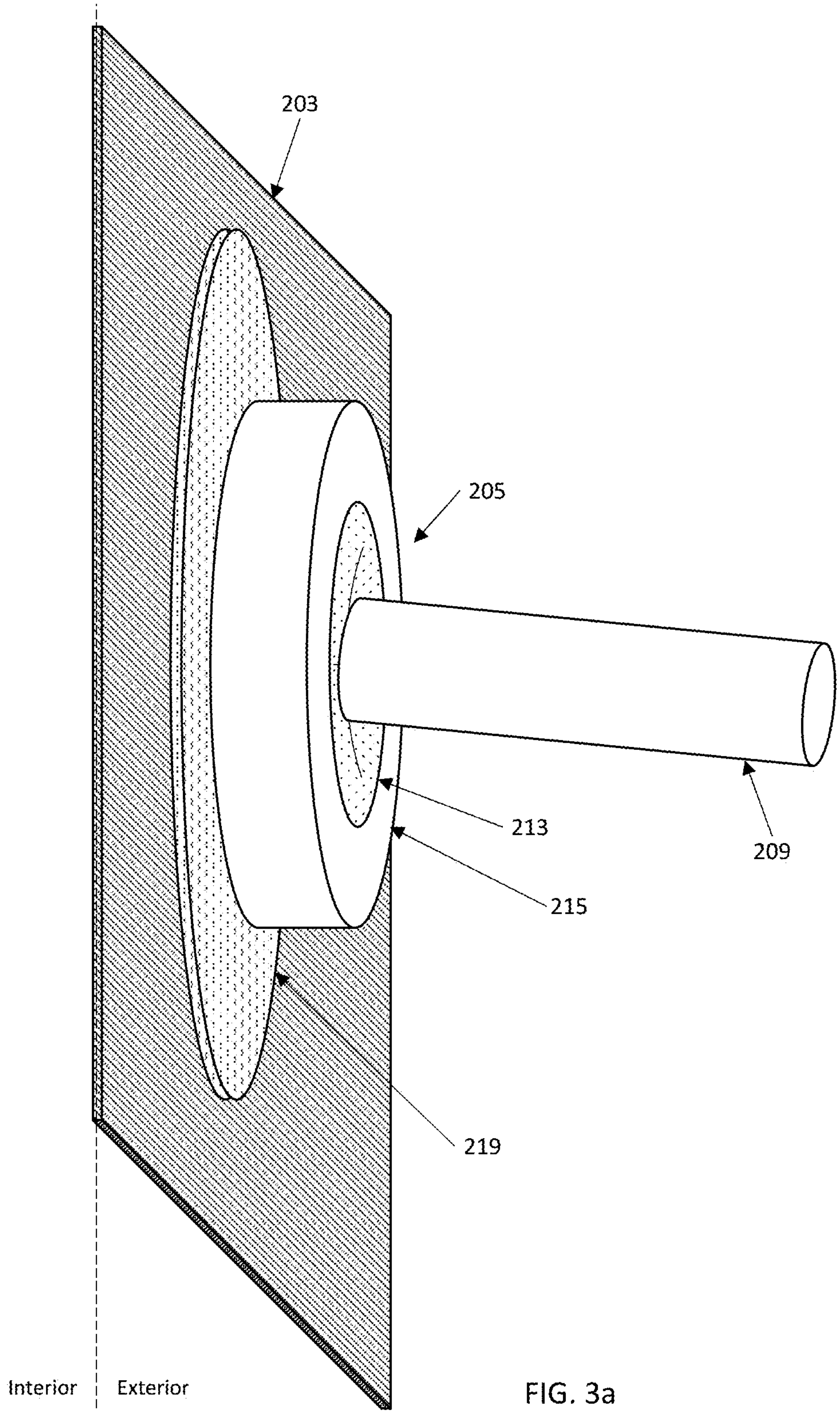
FIG. 3*a* is an exterior perspective assembled view of the mask and receptacle device of FIG. 2 receiving a drinking instrument.
Figure 3B:
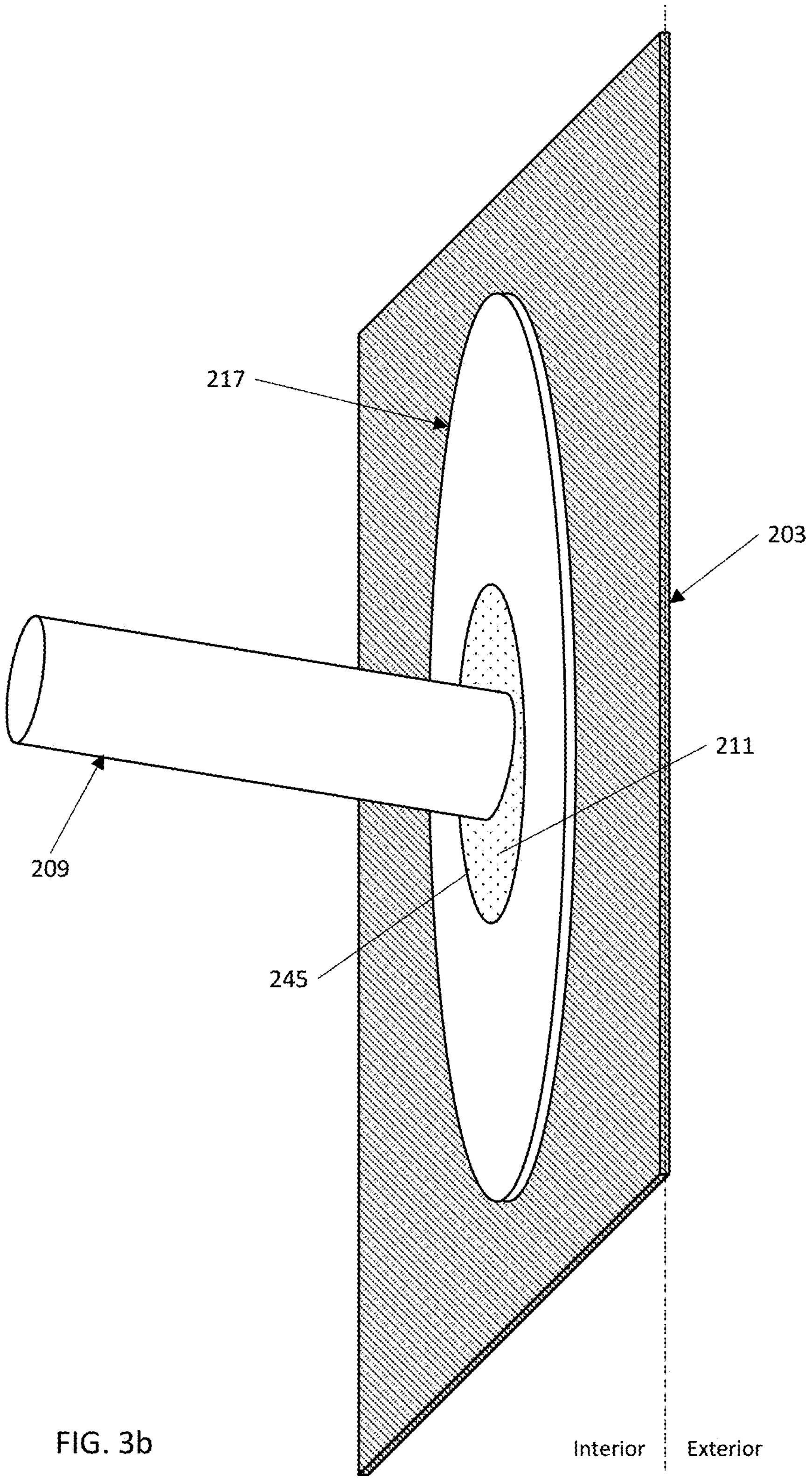
FIG. 3*b* is an interior perspective assembled view of the mask and receptacle device of FIG. 2 receiving a drinking instrument.

Referring now to FIG. 3*a*, there is shown an exterior perspective assembled view of the mask and receptacle device of FIG. 2 receiving a drinking instrument in the form of a straw 209. Here, the straw 209 is shown protruding through the valve 213 to the interior of the mask 203 such that a user could drink through the straw 209 while still being protected from any contaminants that may exist at the exterior of the mask 203. In this embodiment, the hole 225 of the body portion 215, hole 241 of the securing portion 219, hole 211 of the mask 203 and hole 245 of the anchor portion 217 are concentrically aligned. The straw 209 takes a path through the valve 215, and holes 241, 211 and 245 to enter the interior space of the mask 203. In this way, any drinking, feeding, or inhaling instrument can communicate between the interior and exterior of the mask 203. The interior of the mask 203 showing the protruding straw 209 therethrough is best seen in FIG. 3*b* which is an interior perspective assembled view of the mask 203 and receptacle device 205 of FIG. 2. In this perspective, the straw 209 enters the interior space of the mask 203 through the hole 211 of the mask 203 and hole 245 of the anchor portion 217.

Figure 4A:
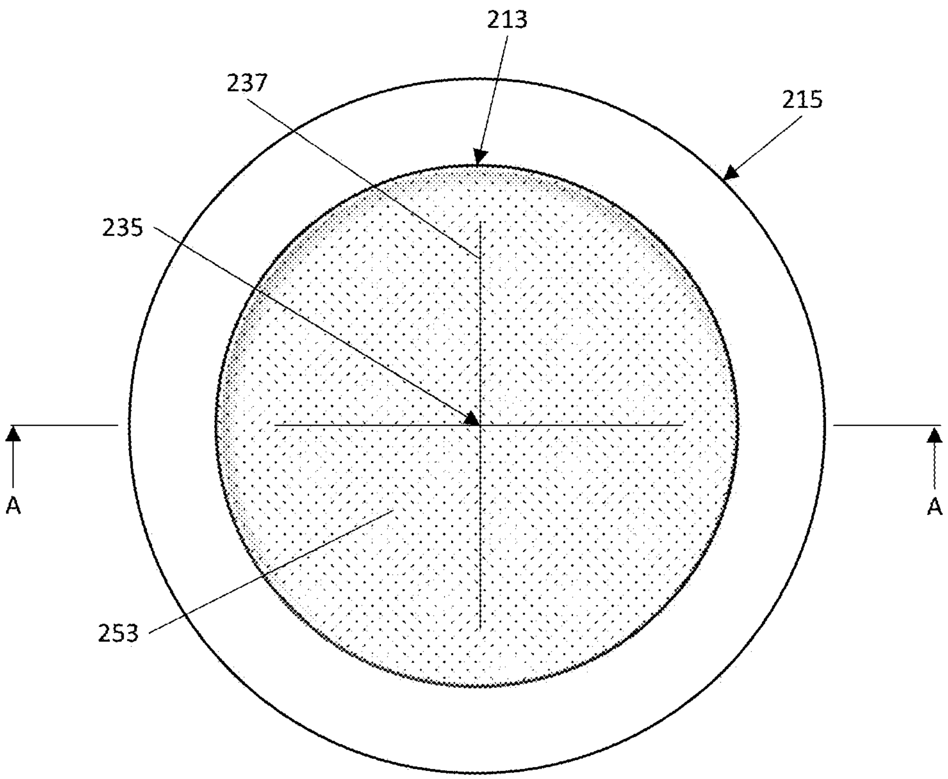
FIG. 4*a* is a plan view of a valve closed position of a receptacle device in accordance with an embodiment of the invention.
Figure 4B:
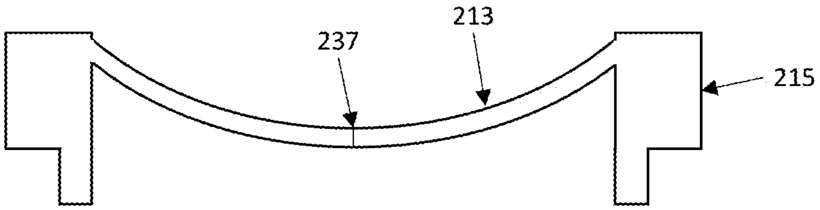
FIG. 4*b* is a cross sectional side view through A-A of the valve closed position of FIG. 4*a;*
Figure 5A:
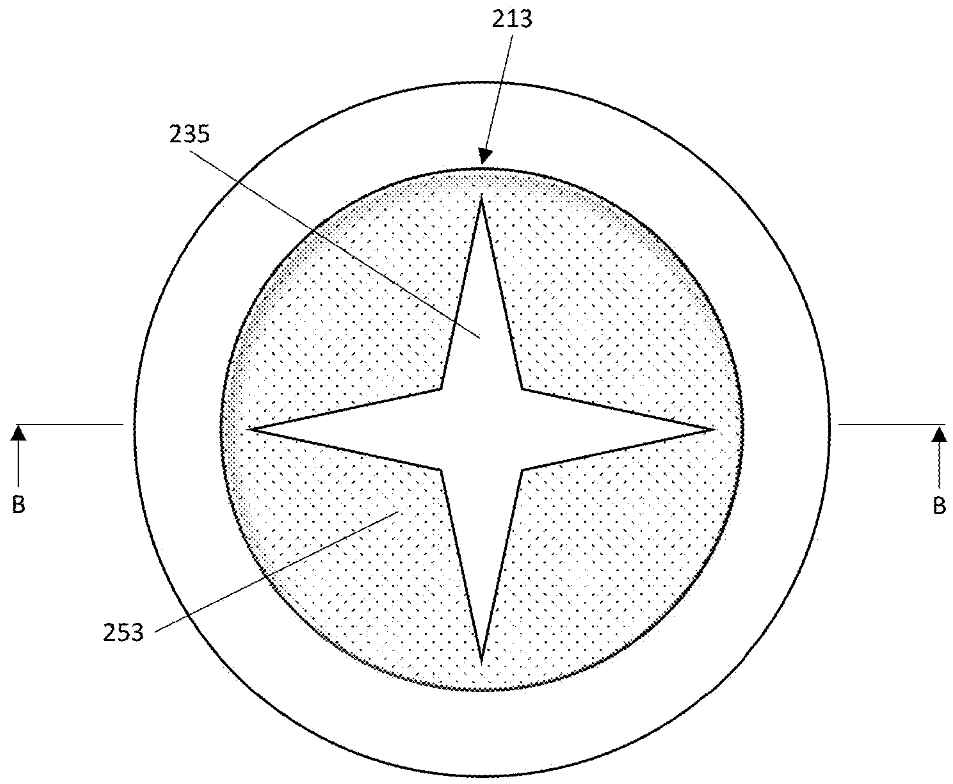
FIG. 5*a* is a plan view of the valve open position of the receptacle device of FIG. 4*a;*
Figure 5B:
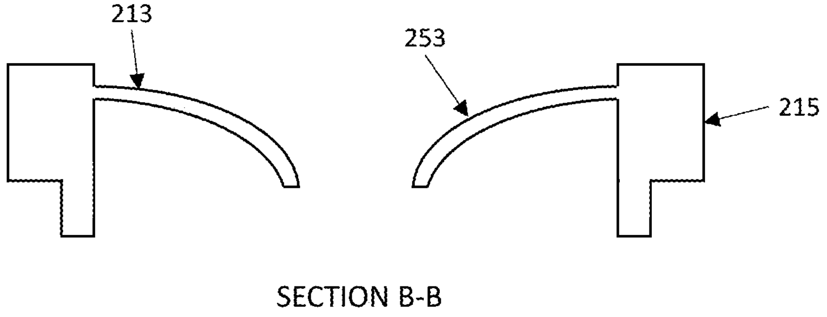
FIG. 5*b* is a cross sectional side view through B-B of the valve open position of FIG. 5*a;*

Referring now to FIG. 4*a*, there is shown a plan view of the valve 213 in a closed position and FIG. 4*b* is a cross sectional side view through A-A of the valve 213 in the closed position of FIG. 4*a*. The valve 213 and the body portion 215 are both circular when seen in the plan view of FIG. 4*a*. In the cross-sectional view of FIG. 4*b*, it can be seen that the valve 213 has a hemispherical shape. The slit pattern 235 comprises two crosshairs 237 defining four opposing valve petals 253 which can be flexed to allow entry and removal of a drinking, feeding or inhalation instrument such as a straw, for example. In the closed position, the valve petals 253 adjoin to form a substantially hermetic seal. This may be considered an airtight seal, for example. By contrast, in the open valve position shown in FIGS. 5*a* and 5*b*, the valve petals 253 bend away from each other and do not adjoin, causing the slit pattern 235 to open up to define a four-cornered star shape when seen in the plan view of FIG. 5*a*.

Figure 6A:
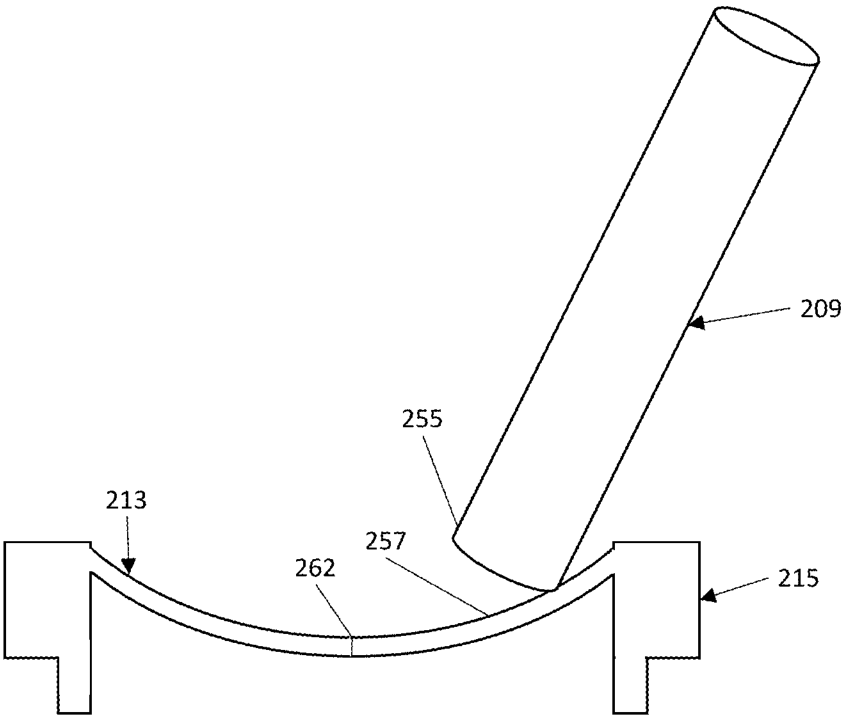
FIG. 6*a* is the cross-sectional side view of FIG. 4*b* of the receptacle device in operation guiding a drinking instrument.
Figure 6B:
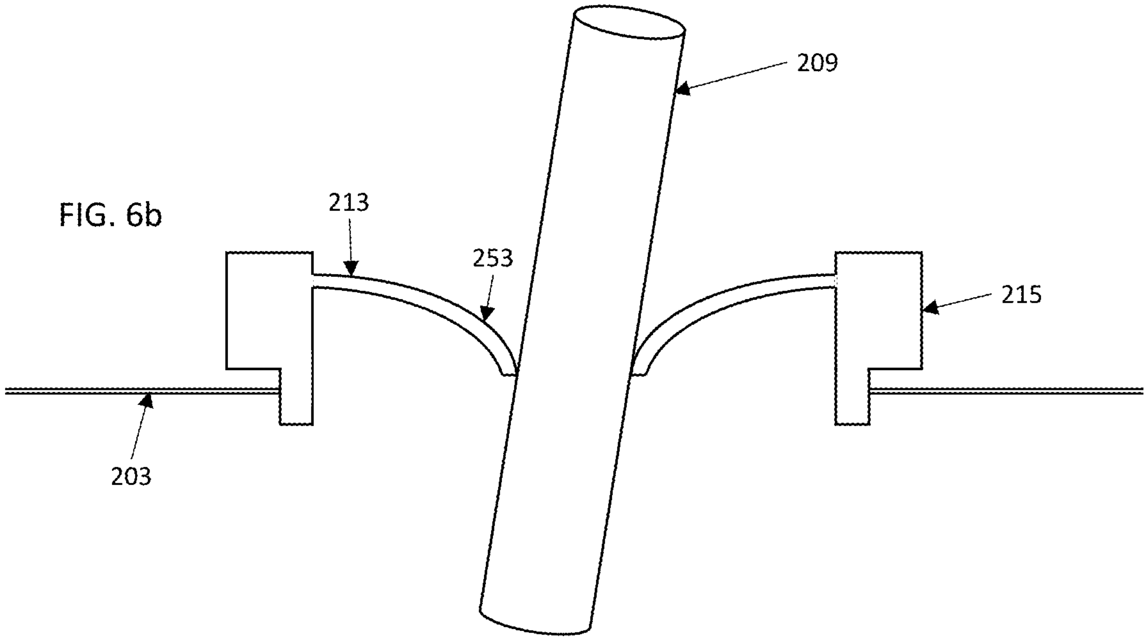
FIG. 6*b* is the cross-sectional side view of FIG. 5*b* of the receptacle device in operation receiving a drinking instrument.

Referring now to FIG. 6*a* there is shown the cross-sectional side view of FIG. 4*b* of the receptacle device in operation guiding a drinking instrument in the form of a straw 209. It will be appreciated that the receptacle device may receive any suitable drinking, feeding, or inhaling instrument in the same manner as that described in respect of the straw 209. Owing to its hemispherical shape in this embodiment, the valve 213 is able to guide the end 255 of the straw 209 along the exterior curved surface 257 of the valve 213 towards the center where the crosshairs 237 intersect, at which intersection 262 the valve 213 requires the least force to be penetrated by the straw 209. Additionally, the angled approach vector of the straw 209 as guided by the curved surface 257 of the valve 213 offers reduced resistance on entry and a wider margin of error for the purposes of the user. FIG. 6*b* shows the cross-sectional side view of FIG. 5*b* of the receptacle device 205 in operation in which the valve 213 is receiving the straw 209. The force applied to the slit pattern 235 by the straw 209 causes the valve petals 253 to deform thereby allowing entry of the straw 209 through the valve 213 and into the interior of the mask 203. In this way, the valve petals 253 conform to the shape of the straw 209 to generate a substantial seal between the valve 213 and the straw 209, thereby minimizing any potentially harmful contaminants from entering the interior region of the mask 203.

Figure 7A:
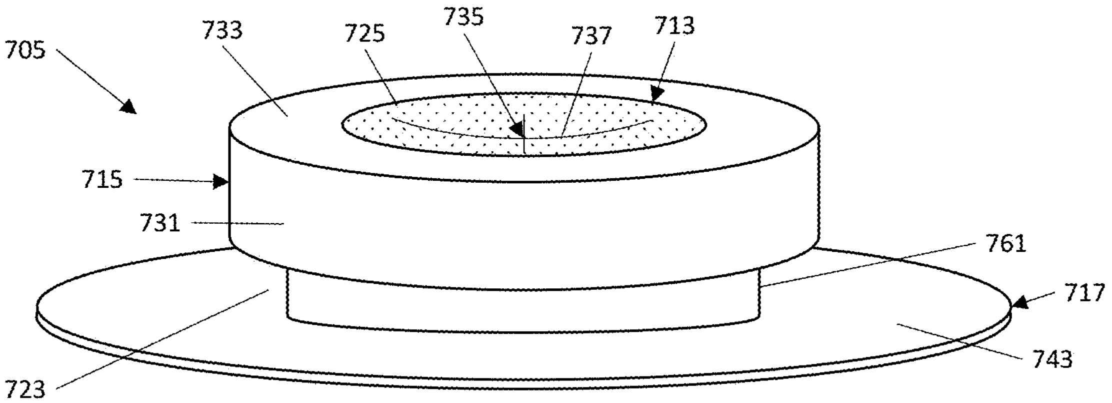
FIG. 7*a* is a perspective view of a receptacle device in accordance with an embodiment of the invention comprising a hemispherical valve.

Referring now to FIG. 7*a* there is shown a perspective view of a receptacle device 705 in accordance with an embodiment of the invention comprising a hemispherical valve 713. The body portion 715 is a short cylinder 731 of circular cross section with a hole 725 through its center. As with other embodiments, it will be understood that the cross-section of the short cylinder 731 need not be circular; for instance it could be square or triangular or any shape defined herein. At the top 733 of the short cylinder 731 is located the hemispherical valve 713. In this way, the body portion 715, by way of the hole 725 housing the hemispherical valve 713, surrounds the hemispherical valve 713. The hemispherical valve 713 comprises a slit pattern 735 in the form of two crosshairs 737 that intersect at their centers. In this embodiment, the anchor portion 717 is an annulus 743 comprising a hole 745 (best seen in FIG. 7*f*).

The diameter of the anchor portion 717 is, in this embodiment, approximately 50% greater than that of the body portion 715. In this embodiment, the receptacle device 705 is a unitary construction. In this embodiment, the body portion 715 is integrally formed with the anchor portion 717 by way of a bridge portion 761. The bridge portion 761 is part of the body portion 715 and defines an annular shape that has a slightly smaller diameter than the body portion 715. Due to the bridge portion 761, there is defined a channel which is operable to releasably engage a suitable mask. In this embodiment, therefore, the channel 723 is in the form of a groove 723. It can, therefore, be said that the anchor portion 717 and the body portion 715 define a channel 723 therebetween, and the channel 723 is configured to releasably engage a mask. The holes 725 and 745 and valve 713 delineate a path for receiving a drinking, feeding or inhaling instrument (not shown). It will be appreciated, however, that the hemispherical valve employed in this environment could be utilised in other embodiments which may not be a unitary construction, for example, and could have the same effect as that of this embodiment.

In this embodiment, for example, the receptacle device 705 engages a mask (not shown) or securing portion (not shown) by way of the channel 723 in the form of a groove 723. More particularly, the body portion 715 can be pushed through a hole (not shown) in a mask (not shown) or securing portion (not shown) so that it protrudes therethrough. The body portion 715 may be flexible/deformable in that its shape can be temporarily changed to more easily fit through the hole in the mask or securing portion. For example, the body portion 715 may be squeezed to help push it through the hole of the mask or securing portion. This provides the benefit of an integrally formed body portion 715 and anchor portion 717 of larger diameter to squeeze through a smaller diameter hole of the mask or securing portion, thus allowing the mask or securing portion to be trapped/releasably engaged within the channel 723 between the body portion 715 and anchor portion 717. This flexibility of the body portion 715 is what allows the integral formation of the body portion 715 and anchor portion 717 to be possible while still maintaining the releasable engagement of the mask or securing portion with the channel 723. The edges of the hole (not shown) are thus able to enter and rest in the groove 723 to close the hole (not shown) of the mask (not shown) or securing portion (not shown). The channel 723 thus engages the mask (not shown) or securing portion (not shown).

Figure 7B:
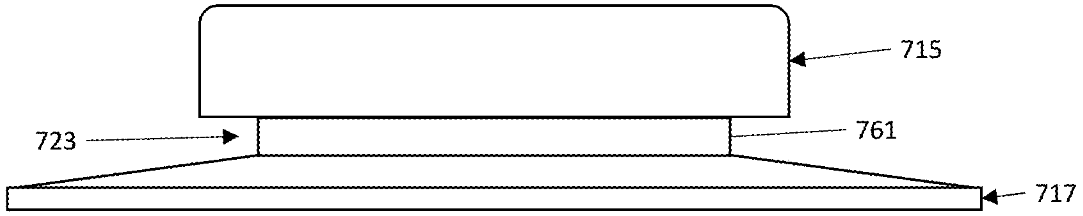
FIG. 7*b* is a side view of the receptacle device of FIG. 7*a;*
Figure 7C:
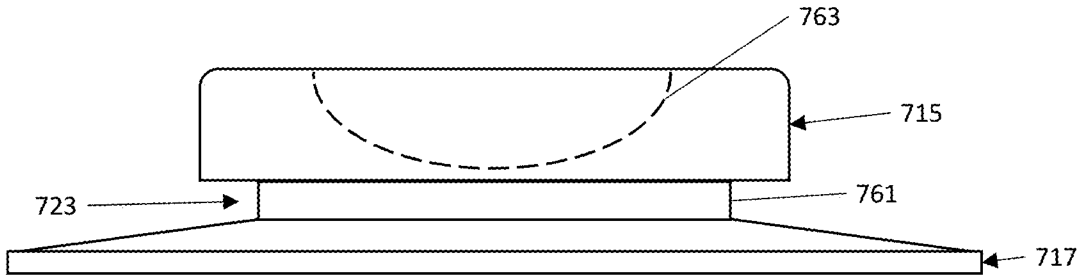
FIG. 7*c* is a side view of the receptacle device of FIG. 7*a* outlining the position of the valve.

Referring to FIG. 7*b*, there is shown a side view of the receptacle device of FIG. 7*a*. FIG. 7*c* is the same as FIG. 7*b* except that it provides a hemispherical outline 763 of the position of the valve 713 with respect to the body portion 715.

Figure 7D:
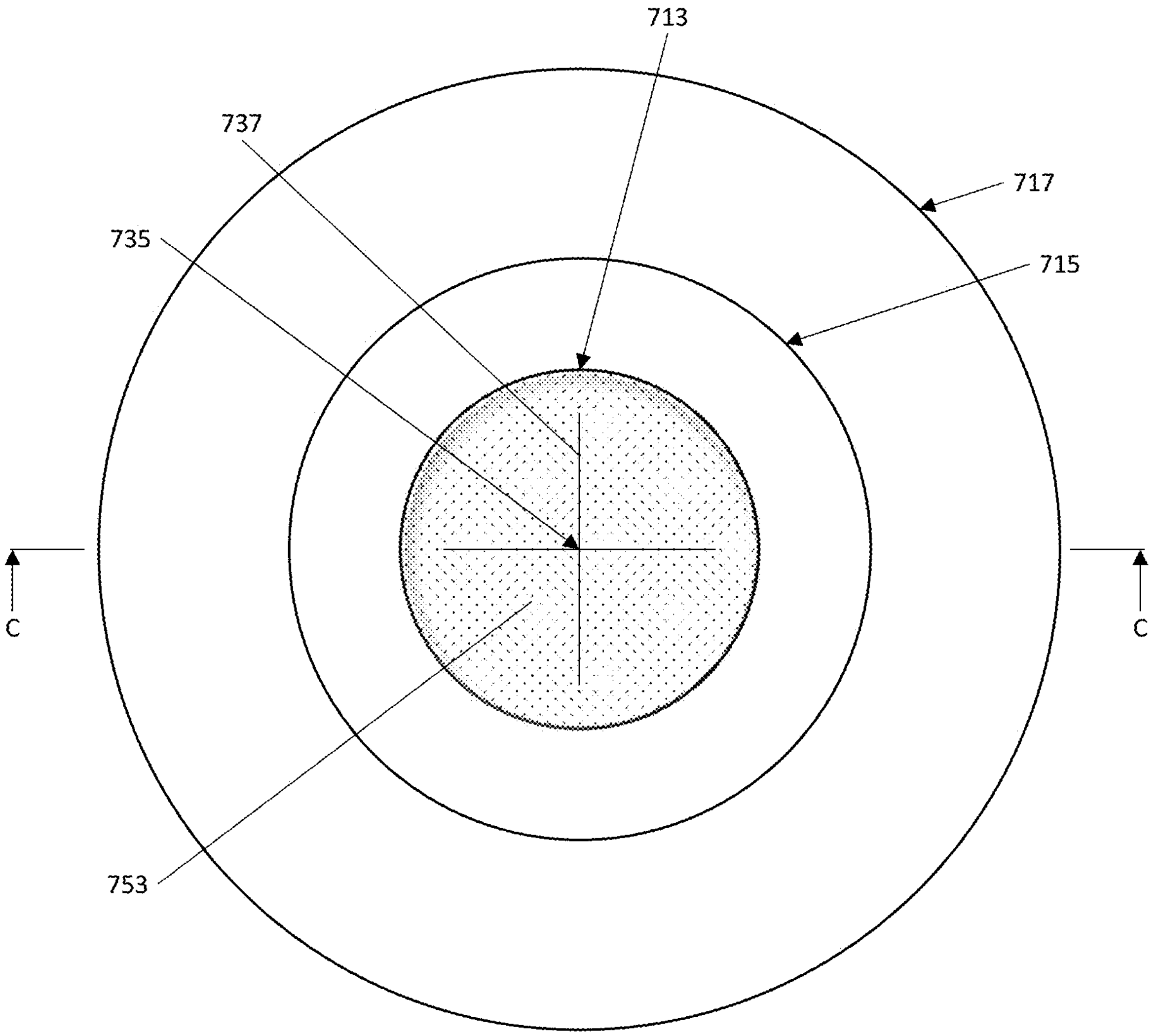
FIG. 7*d* is a plan view of the receptacle device of FIG. 7*a;*

Referring now to FIG. 7*d*, there is shown a plan view of the receptacle device of FIG. 7*a*. The hemispherical valve 713 is shown in the closed position and shown recessed with respect to the plane of the body portion 715. In this embodiment, the hemispherical valve 713 and the body portion 715 are both circular when seen in the plan view of FIG. 7*d*. The crosshairs 737 define four opposing valve petals 753 which can be flexed to allow entry and removal of a drinking, feeding or inhaling instrument (not shown), for instance. In this closed position, the valve petals 753 adjoin to form a substantially hermetic seal. The difference in diameter between the body portion 715 and the anchor portion 717 is clearly visible in FIG. 7*d*.

Figure 7E:
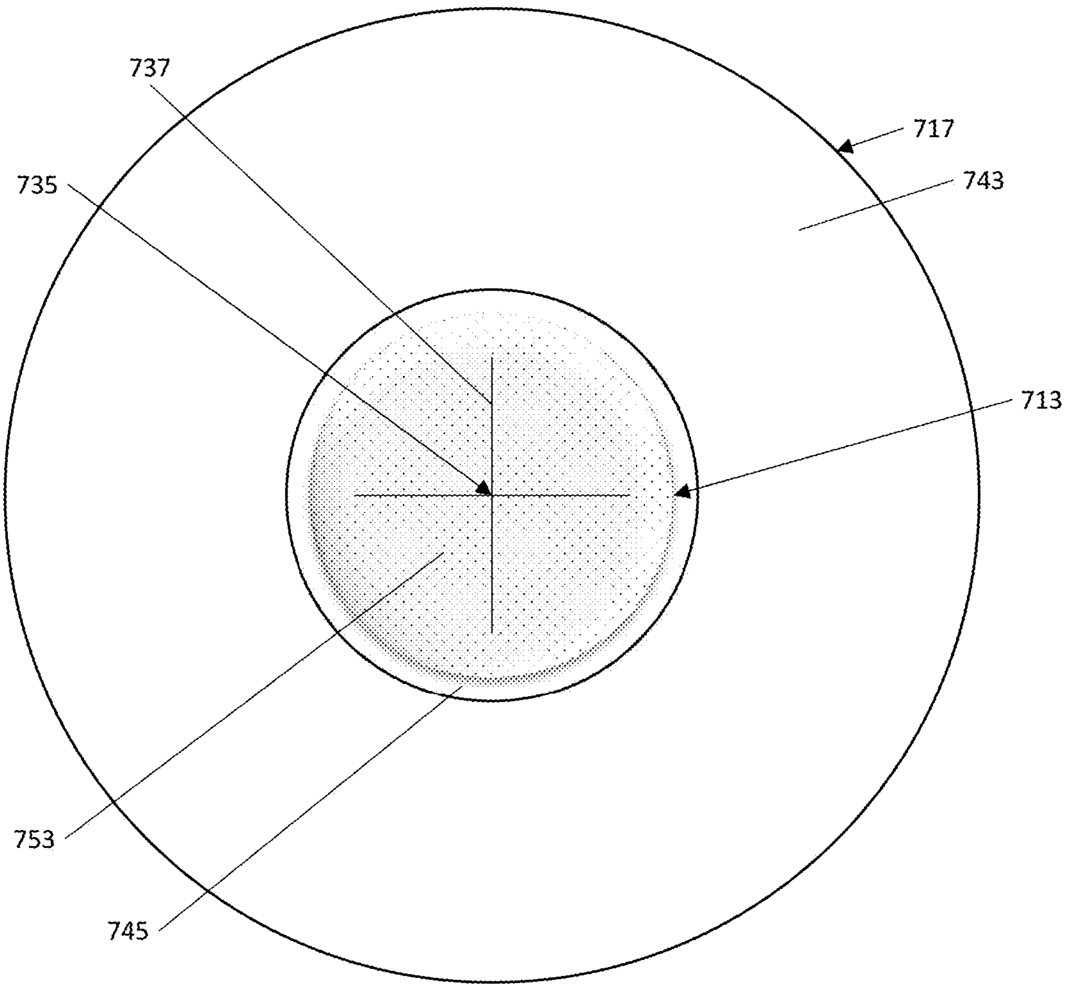
FIG. 7*e* is a bottom view of the receptacle device of FIG. 7*a;*

Referring now to FIG. 7*e*, there is shown a bottom view from the underside (relative to the arrangement shown in FIGS. 7*a* to 7*c*) of the receptacle device of FIG. 7*a*. The hemispherical valve 713 can be seen through the hole 745 of the annulus 743, the valve 713 being in the closed position and shown protruding outwardly with respect to the plane of the body portion 715.

Figures 7F, 7G:
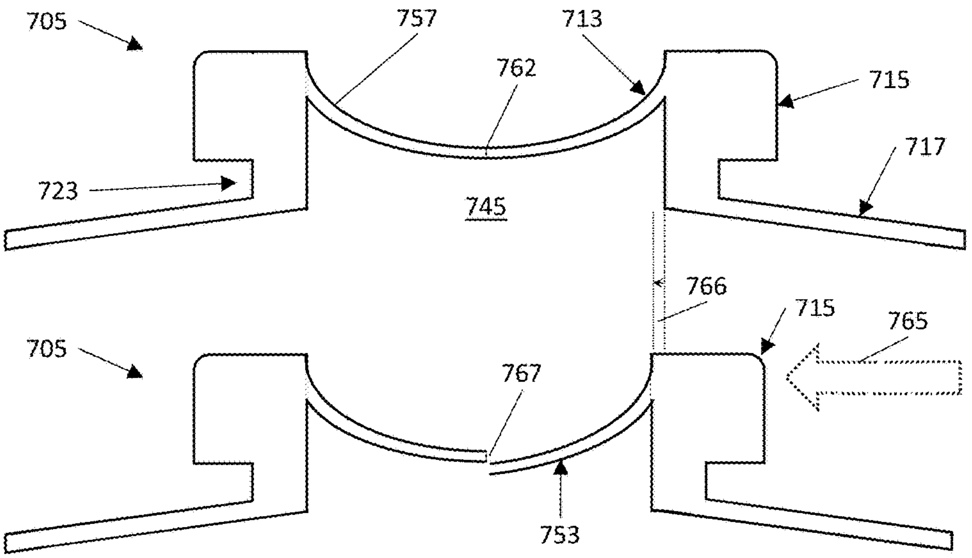
FIG. 7*f* is a cross-sectional side view through C-C of the valve closed position of FIG. 7*d;*
FIG. 7*g* is the cross-sectional side view of FIG. 7*f* following an application of force on the body portion.

Referring now to FIG. 7*f*, there is shown a cross sectional side view through C-C of the hemispherical valve 713 in the closed position of FIG. 7*d*. The curved surface 757 of the hemispherical valve 713 is clearly seen in FIG. 7*f*. In the same way, the configuration of the body portion 715 surrounding the hemispherical valve 713 and extending perpendicularly from the anchor portion 717 is also visible in FIG. 7*f*. The body portion 715 offers the advantage of allowing a user to grip it to hold the receptacle device 705 in position while a drinking, feeding, or inhaling instrument is inserted or withdrawn through/from the hemispherical valve 713 so that the accompanying mask is not displaced from against the user's face.

Referring now to FIG. 7*g*, there is shown the cross-sectional side view of FIG. 7*f* following an application of force 765 on the body portion 715. With respect to the orientation of the page, it can be seen that the external force indicated by arrow 765 is applied laterally against the body portion 715. The effect of the external force 765 is to squeeze the body portion 715 inwardly by a distance indicated 766 thereby causing the hemispherical valve 713 to slightly flex its valve petals 753 such that a small gap 767 appears at the intersection 762 of the hemispherical valve 713; hence, the hermetic seal is slightly disrupted by the application of the external 765 on the body portion 715. This should be contrasted with the same external force being applied to the receptacle device 805 shown in FIG. 8*g*, for example.

Figure 8A:
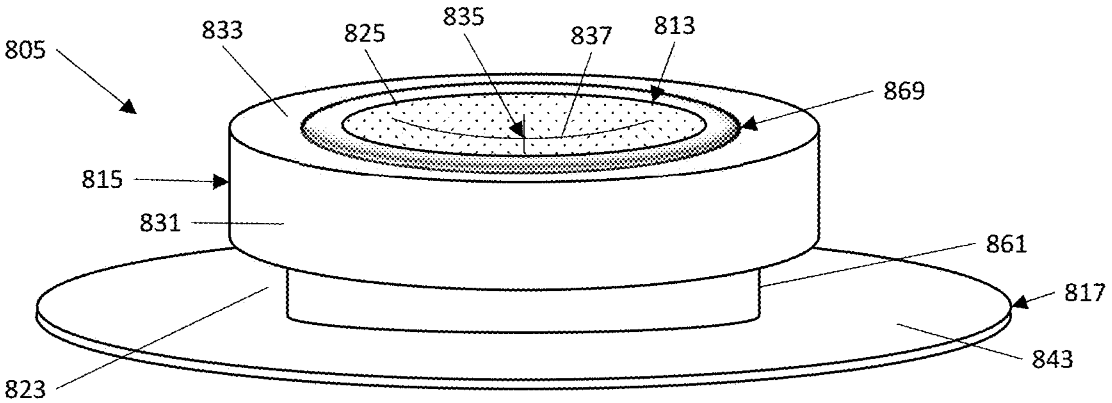
FIG. 8*a* is a perspective view of a receptacle device in accordance with an embodiment of the invention comprising a suspension valve.

Referring now to FIG. 8*a* there is shown a perspective view of a receptacle device 805 in accordance with an embodiment of the invention comprising a suspension valve 813 suspended from a suspension ridge 869. The body portion 815 and anchor portion 843 of the receptacle device

Figure 8B:
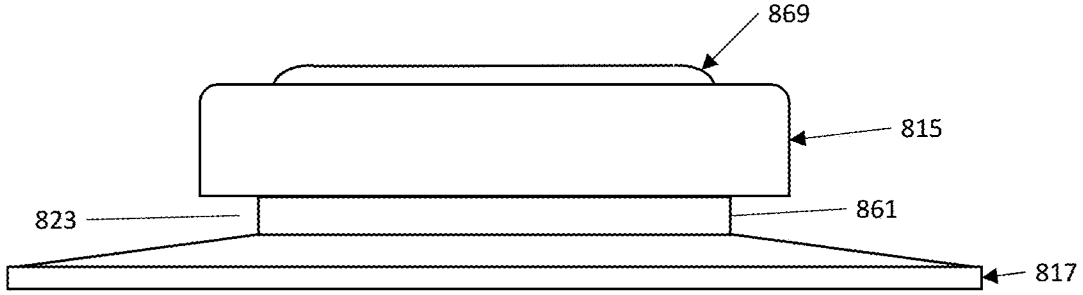
FIG. 8*b* is a side view of the receptacle device of FIG. 8*a;*
Figure 8C:
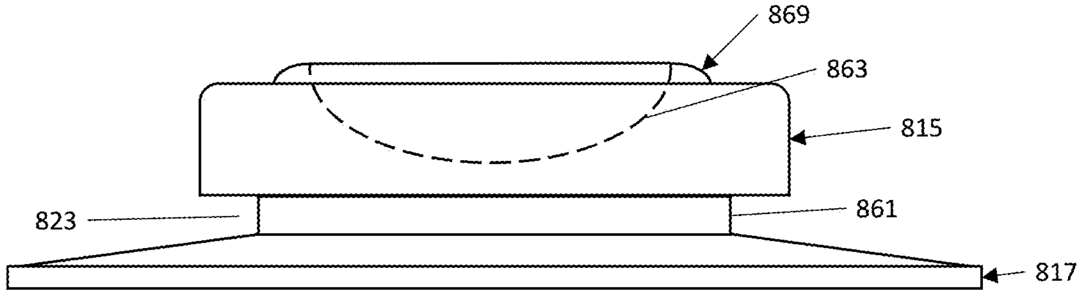
FIG. 8*c* is a side view of the receptacle device of FIG. 8*a* outlining the position of the valve.

805 are generally the same as the body portion 715 and anchor portion 743. Other similar features are thus indicated by like referenced numerals. Accordingly, FIG. 8*b* shows a side view of the receptacle device of FIG. 8*a*, and FIG. 8*c* shows a side view of the receptacle device of FIG. 8*a* providing a hemispherical outline 863 of the position of the suspension valve 813. The primary difference of the embodiment of FIGS. 8*a* to 8*g* compared with the embodiment of FIGS. 7*a* to 7*g* is the valve 813 being a suspension valve 813 suspended from a suspension ridge 869.

Figure 8D:
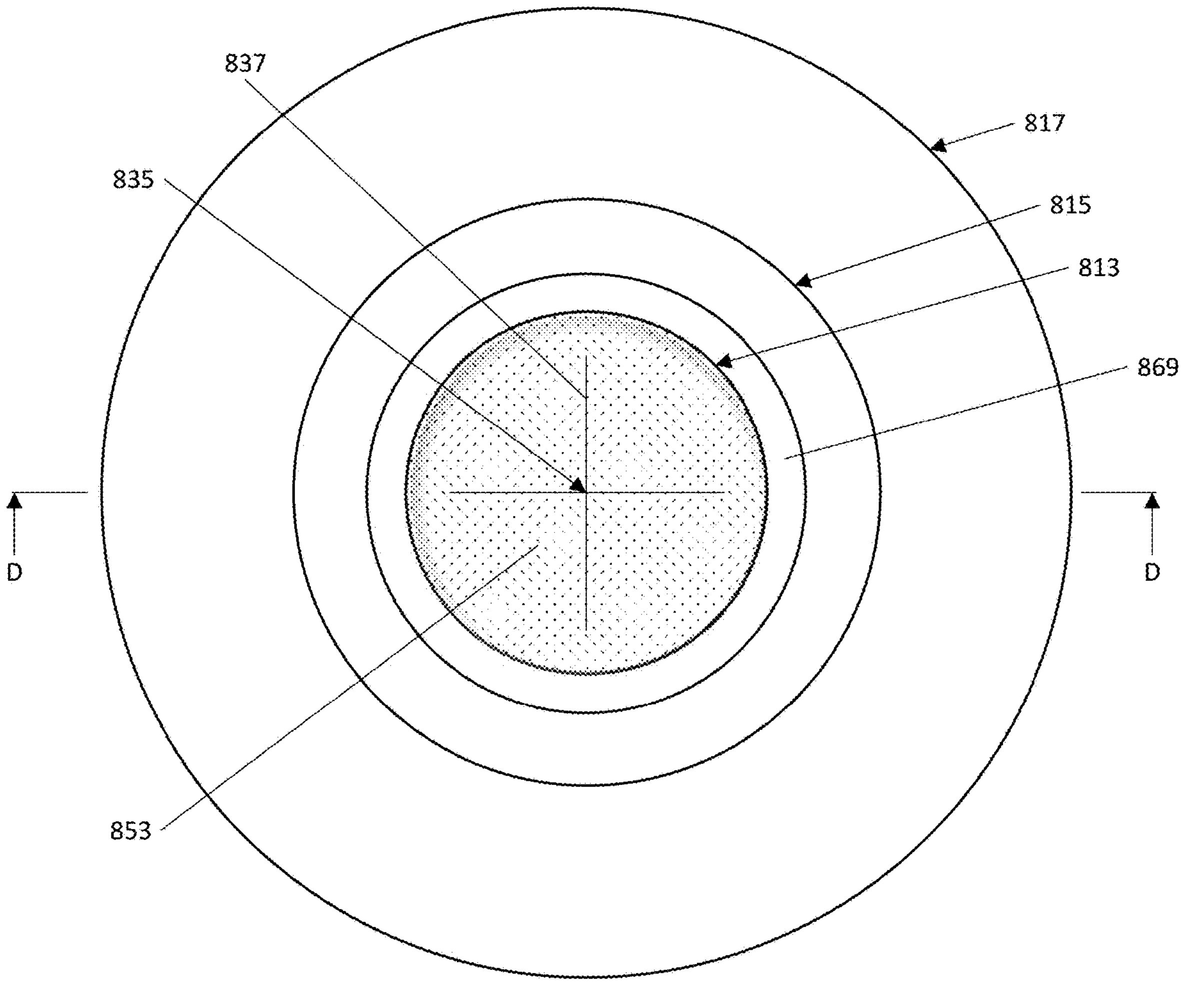
FIG. 8*d* is a plan view of the receptacle device of FIG. 8*a;*

Referring now to FIG. 8*d*, there is shown a plan view of the receptacle device of FIG. 8*a*. The suspension valve 813 is shown in the closed position and shown recessed with respect to the plane of the body portion 815. In this embodiment, the suspension valve 813 and the body portion 815 are both circular when seen in the plan view of FIG. 8*d*. The crosshairs 837 define four opposing valve petals 853 which can be flexed to allow entry and removal of a drinking, feeding or inhaling instrument (not shown), for instance. In this closed position, the valve petals 853 adjoin to form a substantially hermetic seal. The difference in diameter between the body portion 815 and the anchor portion 817 is clearly visible in FIG. 8*d*, which difference is the anchor portion 817 is, in this embodiment, approximately 50% greater in diameter than the body portion 815. The suspension valve 813 is flexibly suspended from the body portion 815 for dampening an external force 865 (best seen in FIG. 8*g*) exerted on the body portion 815. In this embodiment, the receptacle device 805 comprises a suspension ridge 869 which is associated with the body portion 815, wherein the suspension valve 813 is suspended from the suspension ridge 869. Since the suspension valve 813 is flexibly suspended from the body portion 815, this may also provide more freedom of insertion for a drinking, feeding or inhalation instrument through the suspension valve 813. This may encompass, for example, greater degrees of angle, placement, and positioning of the drinking, feeding or inhalation instrument within or with respect to the suspension valve 813. It may be that the flexibly suspended suspension valve 813 from the body portion 815 allows the suspended valve 813 to better conform to various insertion angles and placements of the drinking, feeding or inhalation instrument. This enhanced conformation of the drinking, feeding or inhalation instrument with respect to the suspension valve 813 may improve the seal generated by the suspension valve 813 with the respective drinking, feeding or inhalation instrument, for example.

Figure 8E:
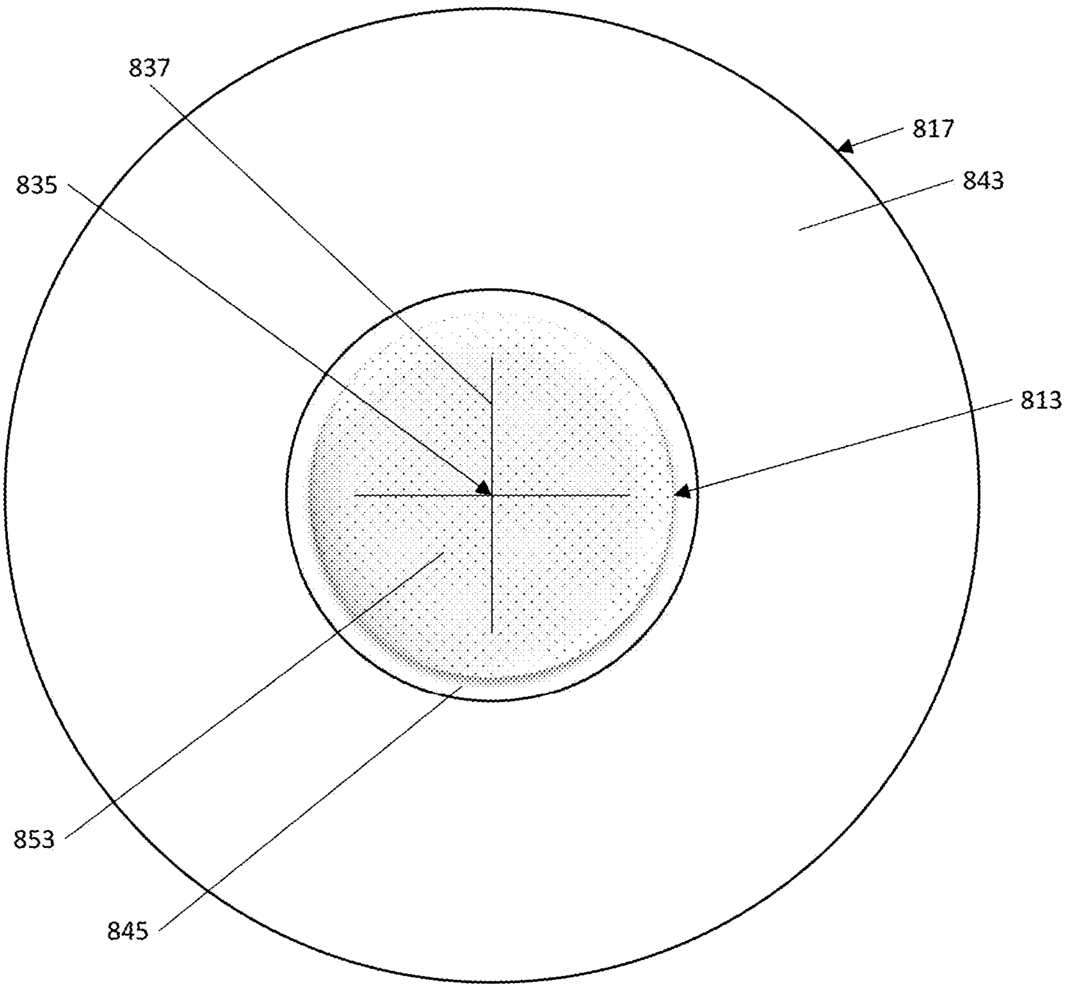
FIG. 8*e* is a bottom view of the receptacle device of FIG. 8*a;*

Referring now to FIG. 8*e*, there is shown a bottom view from the underside (relative to the arrangement shown in FIGS. 8*a* to 8*c*) of the receptacle device of FIG. 8*a*. The suspended valve 813 can be seen through the hole 845 of the annulus 843 of the anchor portion 817, the valve 813 being in the closed position and shown protruding outwardly with respect to the plane of the body portion 815.

Figure 8F:
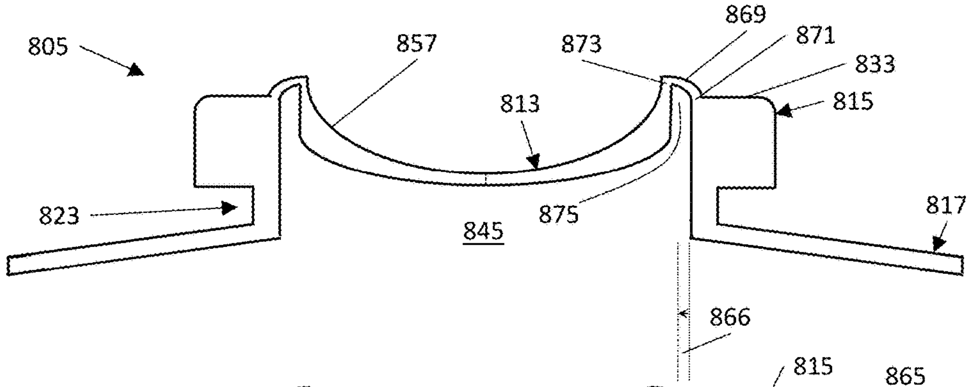
FIG. 8*f* is a cross-sectional side view through D-D of the valve closed position of FIG. 8*d;*

Referring now to FIG. 8*f*, there is shown a cross sectional side view through D-D of the suspension valve 813 in the closed position of FIG. 8*d*. The curved surface 857 of the suspension valve 813 is clearly seen in FIG. 8*f*. In the same way, the configuration of the body portion 815 surrounding the suspension valve 813 and extending perpendicularly from the anchor portion 817 is also visible in FIG. 8*f*. The body portion 815 offers the advantage of allowing a user to grip it to hold the receptacle device 805 in position while a drinking, feeding, or inhaling instrument is inserted or withdrawn through/from the suspension valve 813 so that the accompanying mask is not displaced from against the user's face. The suspension ridge 869 connects the inner annular edge 871 located at the top 833 of the body portion 815 with the outer edge 873 of the suspension valve 813. In the resting state of the receptacle device 805, the suspension valve 813, the suspension ridge 869 and body portion 871 define a space 875 therebetween. In this embodiment, the space 875 has an annular shape and is located beneath the suspension ridge 869 allowing for some lateral movement of the suspension valve 813 even though being surrounded by the body portion 815.

Figure 8G:
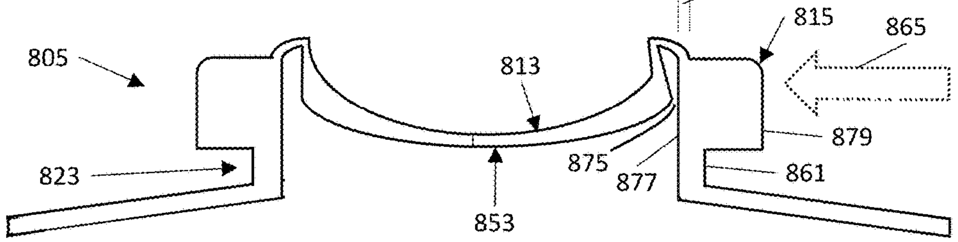
FIG. 8*g* is the cross-sectional side view of FIG. 8*f* following an application of force on the body portion.

Referring now to FIG. 8*g*, there is shown the cross-sectional side view of FIG. 8*f* following an application of force 865 on the body portion 815. This can be defined as a compressed state. With respect to the orientation of the page, it can be seen that the external force indicated by arrow 865 is applied laterally against the body portion 815. The effect of the external force 865 is to squeeze the body portion 815 inwardly by a distance indicated 866 (same approximate distance as distance 766 shown in FIG. 7*g*) thereby causing body portion inner wall 877 facing the suspension valve 813 to move closer to the suspension valve 813 without squeezing or altering the position of the suspension valve 813. In effect, the space 875 collapses allowing for movement of the body portion 815 inwardly without causing the valve petals 853 of the suspension valve 813 to flex so that the hermetic seal is preserved even when a user is gripping the outer surface 879 of the body portion 815 as an aid to insertion and removal of a drinking, feeding or inhaling instrument (not shown), and when the mask (not shown) or securing portion (not shown) engages the channel 823 so tightly that it squeezes the bridge portion 861 or body portion 815. The external force 865 is absorbed by the suspension ridge 869 in this manner. This protects the integrity of the suspension valve 813 and maintain the seal to prevent/minimize air and contaminants leakage therethrough. This should be contrasted with the same external force being applied to the receptacle device 705 shown in FIG. 7*f*, for example, in which an external force on the hemispherical valve 713 can cause disruption of the hermetic seal.

In this embodiment, the suspension valve 813 is allowed to slide/shift within the body portion 815 thereby utilizing more surface area of the valve petals 853 to more securely grip the drinking, feeding, or inhalation instrument, thus allowing the user to adjust the position and angle of a drinking, feeding, or inhalation instrument (not shown). The more secure grip creates a better seal and minimizes air leakage when the suspension valve 813 is housing the drinking, feeding, or inhalation instrument in a holding state, and when the suspension valve 813 is in an active state when it is operable to allow insertion and removal of a drinking, feeding, or inhalation instrument therefrom.

Figure 8H:
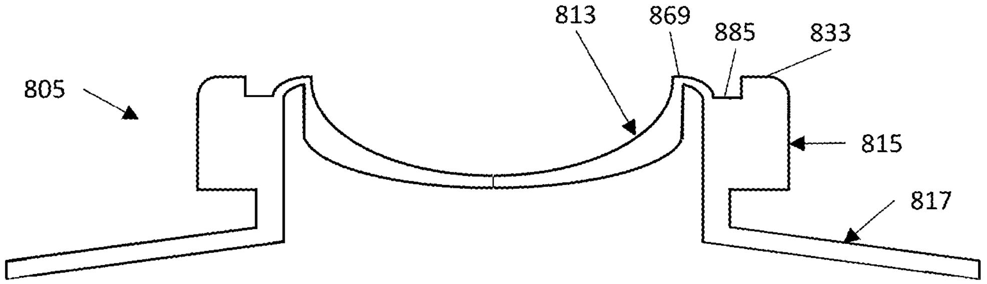
FIG. 8*h* is the cross-sectional side view of a receptacle device comprising a suspension valve in accordance with another embodiment of the invention.

Referring now to FIG. 8*h*, there is shown a cross-sectional side view of a receptacle device 805 comprising a suspension valve 813 in accordance with another embodiment of the invention. This embodiment differs from that shown in FIG. 8*f*, for example, only in that the body portion 815 comprises an annular groove 885 on the top surface 833 of the body portion 815 proximal the suspension ridge 869. The annular groove 885 may extend even further the degree of freedom/range of motion afforded to the suspension valve 813 surrounded by the body portion 815.

Figure 9A:
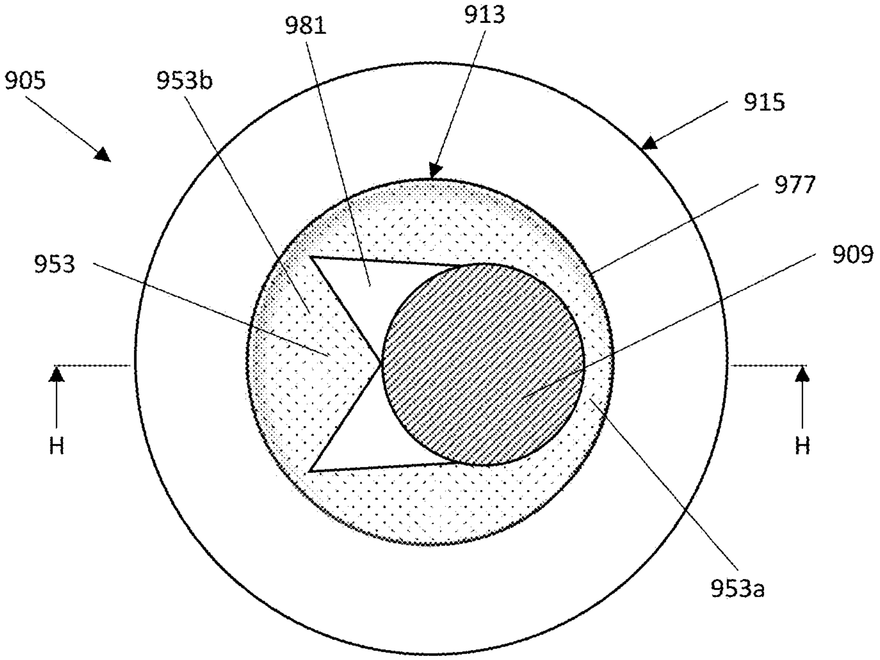
FIG. 9*a* is a plan view of a receptacle device in accordance with an embodiment of the invention comprising a hemispherical valve in operation receiving a drinking instrument.
Figure 9B:
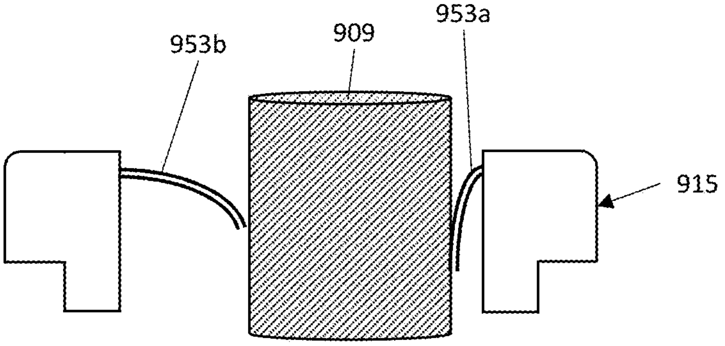
FIG. 9*b* is a cross-sectional side view through H-H of the receptacle device in operation of FIG. 9*a;*

Referring now to FIG. 9*a*, there is shown a plan view of a receptacle device 905 in accordance with an embodiment of the invention comprising a hemispherical valve 913 in operation receiving a drinking, feeding or inhaling instrument embodied by a straw 909. FIG. 9*b* is a cross-sectional side view through H-H of the receptacle device 905 in operation of FIG. 9*a*. FIGS. 9*a* and 9*b* illustrate how the valve petals 953 grip the straw 909 during insertion and use. The straw 909 is shown inserted off-center (with respect to the center of the hemispherical valve 913 so that it is resides near the inner wall 977 of the body portion 915) in order to better illustrate the function of various valves suitable for use with the receptacle device of the present invention. In this embodiment containing the hemispherical valve 913, the valve petals 953 have one degree of motion, moving up or down in the longitudinal direction which is generally orthogonal to the plane of the hemispherical valve 913. In such an arrangement, when the straw 909 is inserted or shifted off center or at an angle, only those valve petals 953*a* closest to the straw 909 can provide sufficient surface area and pressure on the straw 909 to create a secure grip. The valve petals 953*b* on the opposite side to the straw 909 do not have sufficient length to provide equal surface area and grip to the straw 909, thereby potentially resulting in large (air) gaps 981 allowing contaminants undesirably to enter the mask (not shown).

Figure 10A:
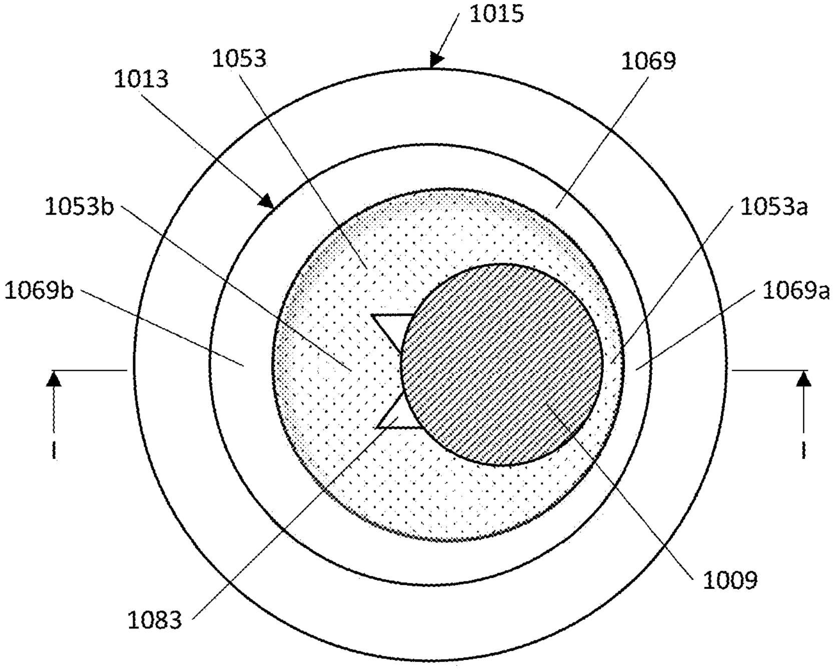
FIG. 10*a* is a plan view of a receptacle device in accordance with an embodiment of the invention comprising a suspension valve in operation receiving a drinking instrument.
Figure 10B:
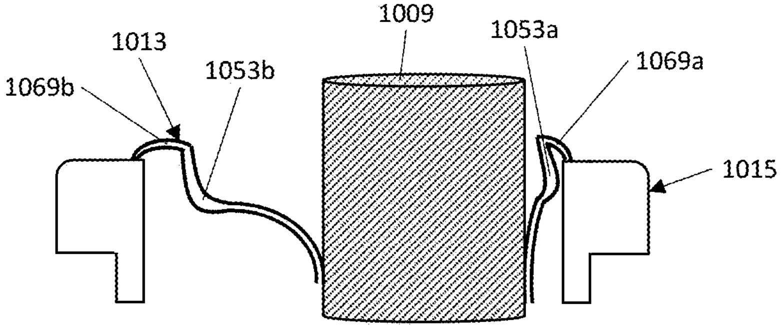
FIG. 10*b* is a cross-sectional side view through I-I of the receptacle device in operation of FIG. 10*a;*

Referring now to FIG. 10*a*, there is shown a plan view of a receptacle device 1005 in accordance with an embodiment of the invention comprising a suspension valve 1013 in operation receiving a drinking, feeding or inhaling instrument embodied by a straw 1009. FIG. 10*b* is a cross-sectional side view through I-I of the receptacle device 1005 in operation of FIG. 10*a*. FIGS. 10*a* and 10*b* illustrate how the valve petals 1053 grip the straw 1009 during insertion and use. The straw 1009 is shown inserted off-center (with respect to the center of the suspension valve 1013 so that it is resides near the inner wall 1077 of body portion 1015) in the same manner as shown in FIGS. 9*a* and 9*b*; however, in this embodiment containing the suspension valve 1013, the suspension valve 1013 is able to move/shift laterally to accommodate the movement of the straw 1009 during use, thereby allowing the valve petals 1053 to move with the straw 1009 and more evenly apply pressure from all sides onto the straw 1009. The straw 1009 can, therefore, move in various degrees of motion, such that the straw 1009 can move up, down, laterally and at most angles with respect to the longitudinal direction which is generally orthogonal to the plane of the hemispherical valve 1013.

Various portions of the suspension valve 1013 may stretch or contract. The suspension ridge portion 1069*b* on the side of the suspension valve 1013 away from the straw 1009 is seen stretching in order to help reach the straw 1009, while the suspension ridge portion 1069*a* on the side of the suspension valve 1013 closest to the straw 1009 is seen contracting to accommodate its proximity thereto. In addition, the respective valve petals 1053*b* and 1053*a* are seen stretching and contracting. The combined efforts of the suspension ridge 1069 and valve petals 1053 allow a more optimal location (proximal to the straw 1009) for the valve petals 1053 to reach the straw 1009 comfortably without over-reaching or contracting in any particular direction or dimension. More particularly, this allows valve petals 1053 on all sides to apply more surface area and pressure to securely grip the straw 1009, thus minimizing (air) gaps 1083 and generating a desirable seal.

Figure 11A:
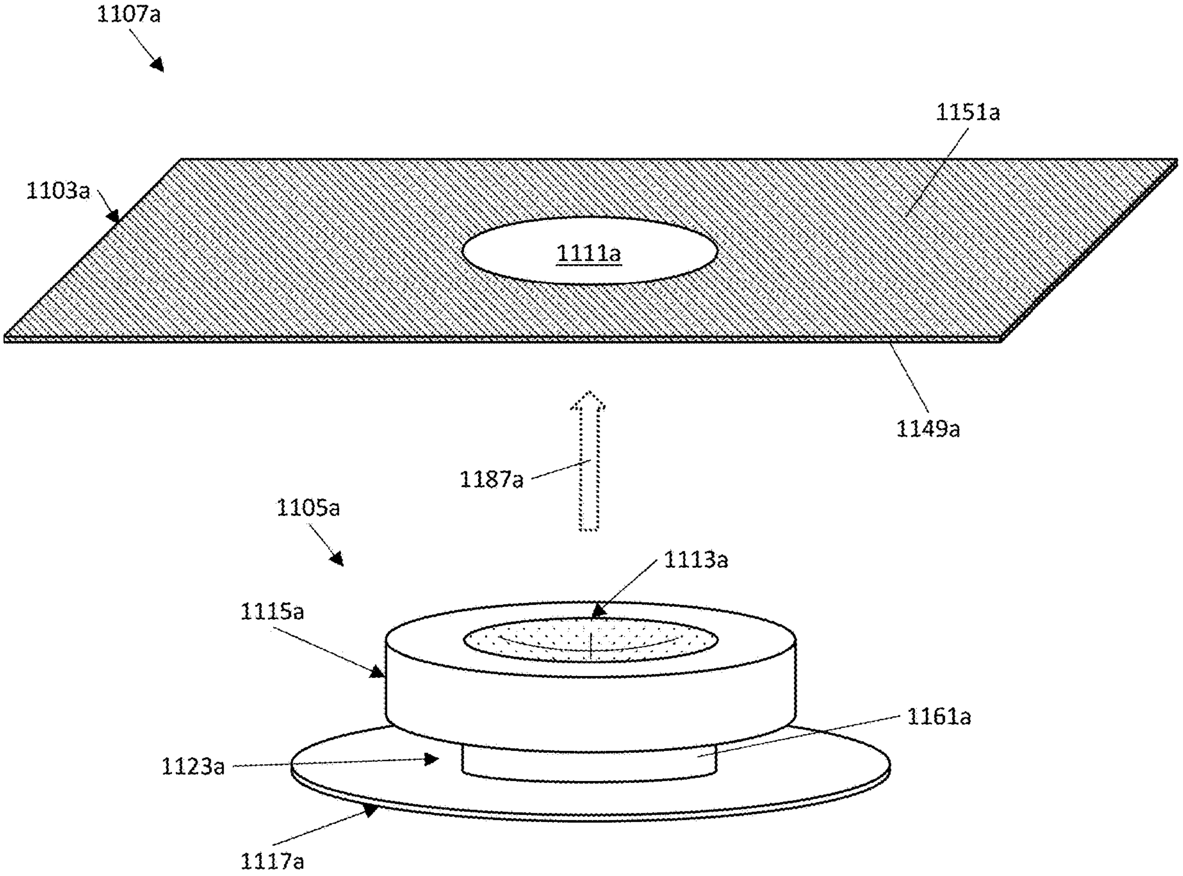
FIG. 11*a* is a perspective view of a receptacle device and a mask in accordance with an embodiment of the invention in which the receptacle device is a unitary construction.
Figure 11B:
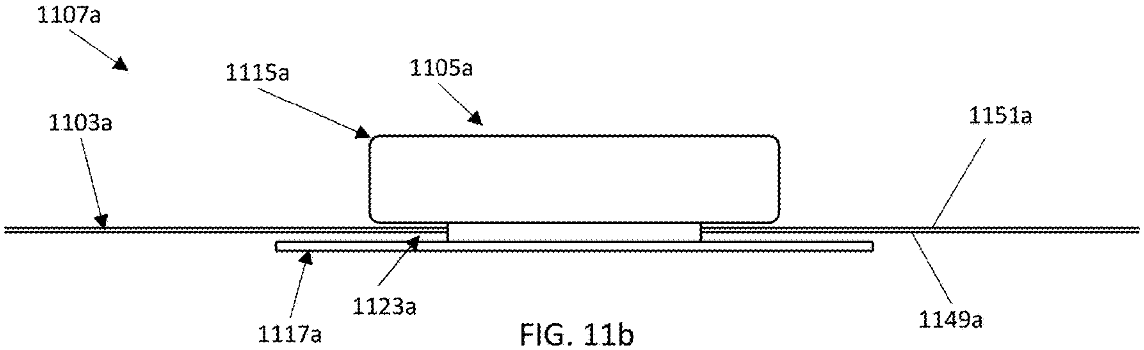
FIG. 11*b* is the cross-sectional side view of FIG. 11*a* following assembly of the receptacle device and the mask.

Referring now to FIG. 11*a*, there is shown a perspective view of an assembly 1107*a* having a receptacle device 1105*a* and a mask 1103*a* in accordance with an embodiment of the invention in which the receptacle device 1105*a* is a unitary construction. More particularly, in this embodiment, the receptacle device 1105*a* is a unitary construction in the same manner as described in relation to FIG. 7*a*, and comprises a body portion 1115*a* that is integrally formed with an anchor portion 1117*a* by way of a bridge portion 1161*a*. The receptacle device 1105*a* may comprise a hemispherical or suspension valve 1113*a* surrounded by the body portion 1115*a*. The mask 1103*a* is a rectangular sheet of an electrostatic non-woven polypropylene fiber comprising a hole 1111*a* at its center. It will be understood that, in operation, the interior surface 1149*a* of the mask 1103*a* faces towards the user's face (not shown). In the same way, the exterior surface 1151*a* of the mask 1103*a* faces away from the user's face. In operation, the receptacle device 1105*a*, and more specifically the body portion 1115*a* in this embodiment, is inserted through the hole 1111*a* of the mask 1103*a* in the direction indicated by arrow 1187*a* to engage it therewith by way of the channel 1123*a*. This is best seen in FIG. 11*b* that shows a cross-sectional side view of FIG. 11*a* following assembly of the receptacle device 1105*a* and the mask 1103*a*. In the assembled configuration, the body portion 1115*a* is exposed on the side of the exterior surface 1151*a* of the mask 110*a*3, while the anchor portion 1117*a* is hidden on the side of the interior surface 1149*a* of the mask 1103*a*.

In this embodiment, for example, the receptacle device 1105*a* engages a mask 1103*a* by way of the channel 1123*a* in the form of a groove 1123*a*. More particularly, the body portion 1115*a* can be pushed through a hole 1111*a* in a mask 1103*a* so that it protrudes therethrough. The body portion 1115*a* may be flexible/deformable in that its shape can be temporarily changed to more easily fit through the hole 1111*a* in the mask 1103*a*. For example, the body portion 1115*a* may be squeezed to help push it through the hole 1111*a* of the mask 1103*a*. This provides the benefit of an integrally formed body portion 1115*a* and anchor portion 1117*a* of larger diameter to squeeze through a smaller diameter hole 1111*a* of the mask 1103*a*, thus allowing the mask 1103*a* to be trapped/releasably engaged within the channel 1123*a* between the body portion 1115*a* and anchor portion 1117*a*. This flexibility of the body portion 1115*a* is what allows the integral formation of the body portion 1115*a* and anchor portion 1117*a* to be possible while still maintaining the releasable engagement of the mask 1103*a* with the channel 1123*a*.

Figure 11C:
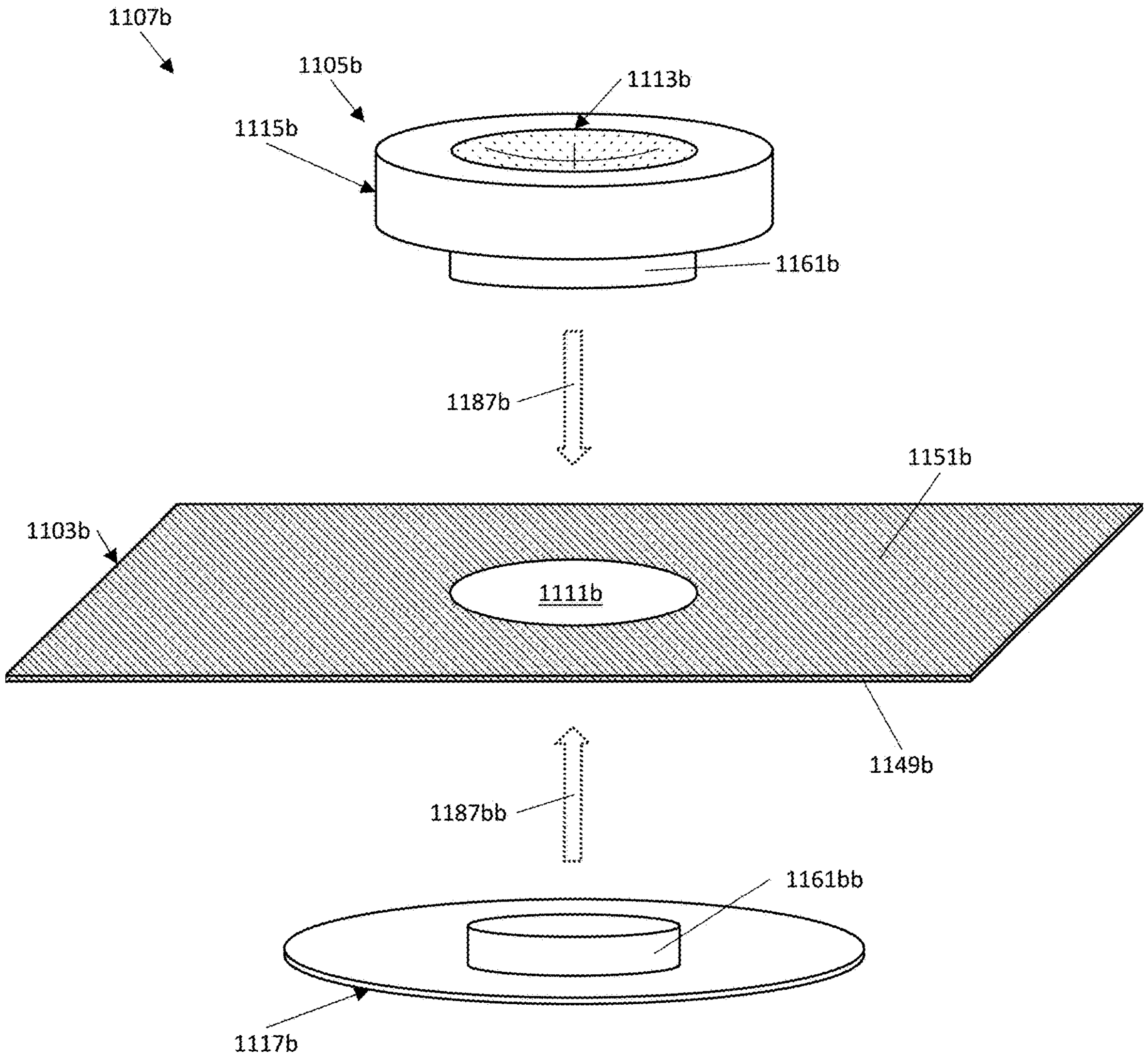
FIG. 11*c* is a perspective view of a receptacle device and a mask in accordance with an embodiment of the invention in which the receptacle device comprises a body portion and anchor portion which are separate components.
Figure 11D:
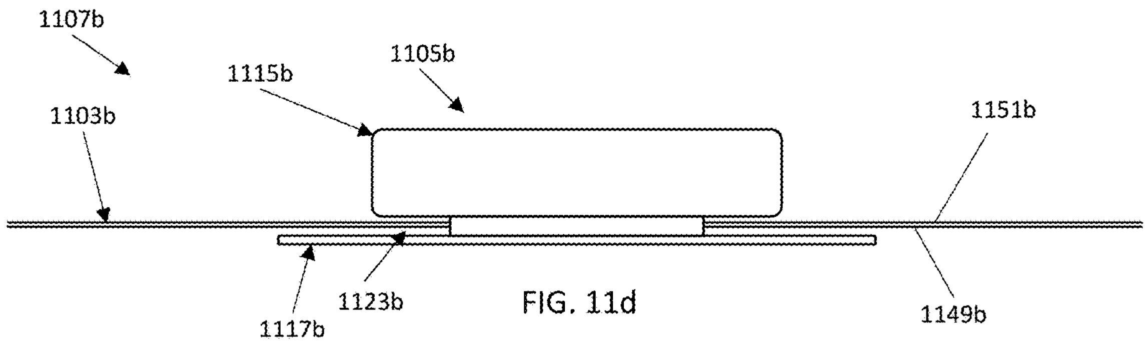
FIG. 11*d* is the cross-sectional side view of FIG. 11*c* following assembly of the receptacle device and the mask.

Referring now to FIG. 11*c*, there is shown a perspective view of a receptacle device 1105*b* and a mask 1103*b* in accordance with an embodiment of the invention in which the receptacle device 1105*b* comprises a body portion 1115*b* and anchor portion 1117*b* which are separate components. This may allow the body portion to be interchangeable and attachable to the anchor portion, and/or the anchor portion to be interchangeable and attachable to the body portion. The receptacle device 1105*b* can in embodiments comprise a hemispherical or suspension valve 1113*b* surrounded by the body portion 1115*b*. The body portion 1115*b*, optionally, comprises a bridge portion 1161*b* on its underside, while the anchor portion 1117*b*, optionally, comprises an anchor bridge portion 1161*bb* on its upper face. In operation, the anchor portion 1117*b* is moved upwardly in the direction indicated by arrow 1187*bb* towards the hole 1111*b* of the mask 1103*b*, while the body portion is moved downwardly in the direction indicated by arrow 1187*b* towards the hole 1111*b* of the mask 1103*b*. In this way, the bridge portion 1161*b* and the anchor bridge portion 1161*bb* meet and interconnect through the hole 1111*b* of the mask 1103*b* forming a channel 1123*b* and trapping the mask 1103*b* therein. This is best seen in FIG. 11*d* that shows a cross-sectional side view of FIG. 11*c* following assembly of the receptacle device 1105*b* and the mask 1103*b*. In the assembled configuration, the body portion 1115*b* is exposed on the side of the exterior surface 1151*b* of the mask 1103*b*, while the anchor portion 1117*b* is hidden on the side of the interior surface 1149*b* of the mask 1103*b*.

Figure 11E:
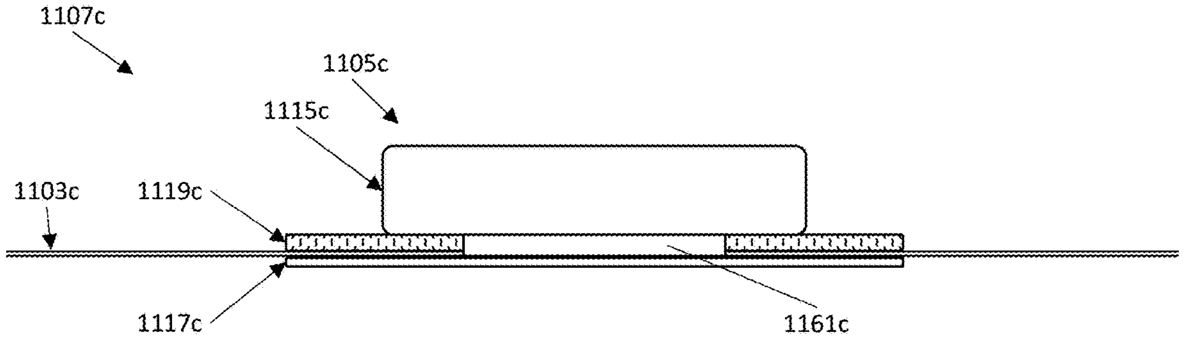
FIG. 11*e* is the cross-sectional side view of a receptacle device similar to that shown in FIGS. 11*b* and 11*d* but comprising a securing portion.

Referring now to FIG. 11*e*, there is shown a cross-sectional side view of a receptacle device 1105*c* similar to that shown in FIGS. 11*b* and 11*d*, but comprising a securing portion 1119*c*. The securing portion 1119*c* is located between the mask 1103*c* and body portion 1115*c*. This generates a pressure seal or hermetic seal in keeping with the purpose of the invention to prevent contaminants from entering the mask 1103*c* while a user is drinking, feeding or inhaling. This may be attributed to the securing portion 1119*c* applying pressure against the respecting neighboring surfaces of the mask 1103*c*, body portion 1115*c* and anchor portion 1117*c*.

Figure 12A:
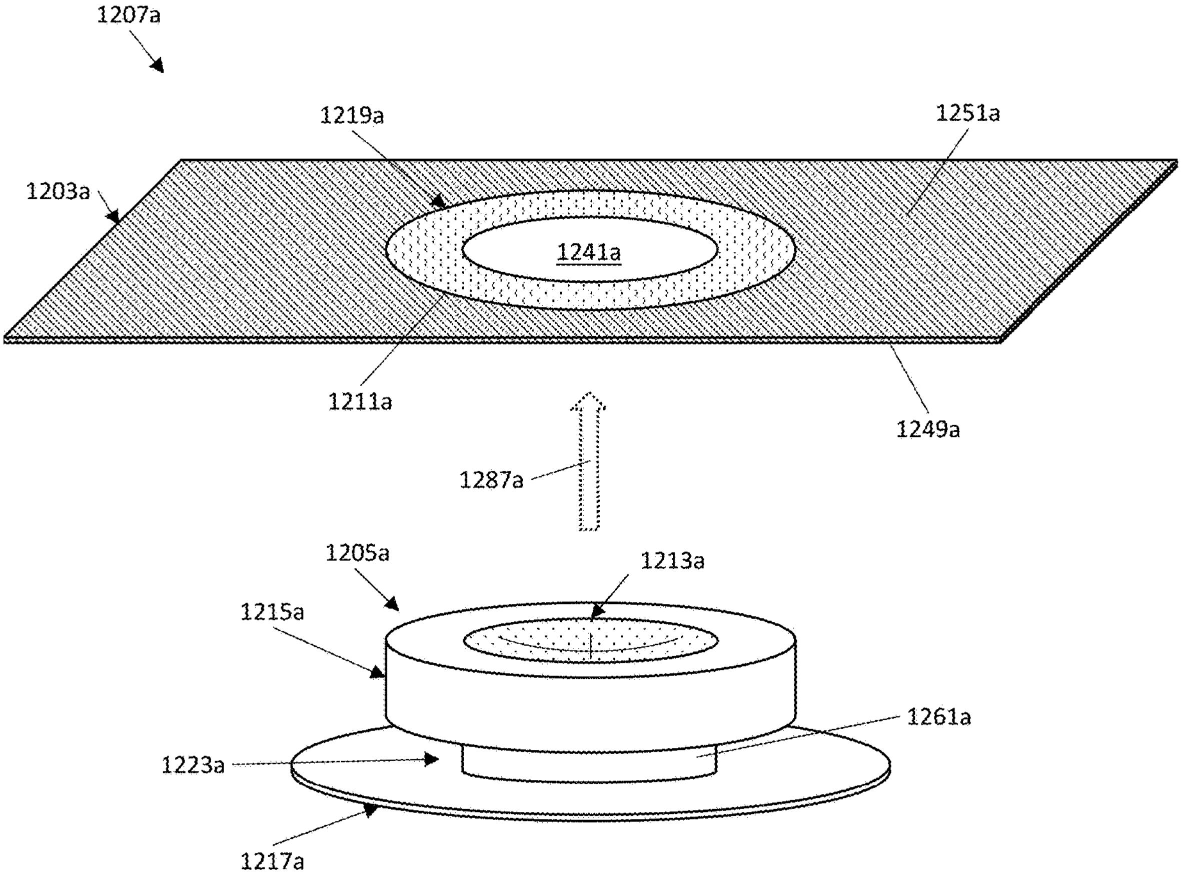
FIG. 12*a* is a perspective view of a receptacle device and a mask engaging a securing portion in accordance with an embodiment of the invention in which the receptacle device is a unitary construction.

Referring now to FIG. 12*a*, there is shown a perspective view of an assembly 1207*a* having a receptacle device 1205*a* and a mask 1203*a* engaging an annular securing portion 1219*a* in accordance with an embodiment of the invention in which the receptacle device 1205*a* is a unitary construction, comprising a body portion 1215*a* that is integrally formed with an anchor portion 1217*a* by way of a bridge portion 1261*a*. The receptacle device 1205*a* may comprise a hemispherical or suspension valve 1213*a* surrounded by the body portion 1215*a*. In this embodiment, there is shown a securing portion 1219*a*; wherein the anchor portion 1217*a* and the body portion 1215*a* define a channel 1223*a* therebetween, and the channel 1223*a* is configured to releasably engage the securing portion 1219*a*; and wherein the securing portion 1219*a* is configured to engage the mask by plastic joining at the hole 1211*a* of the mask 1203*a*. In other embodiments, it will be appreciated that the securing portion 1219*a* may be configured to engage the mask by at least one of adhesive bonding, welding, mechanical fastening, stitching, and magnetic elements. In operation, the receptacle device 1205*a*, and more specifically the body portion 1215*a* in this embodiment, is inserted through the hole 1241*a* of the securing portion 1219*a* in the direction indicated by arrow 1287*a* to engage it therewith by way of the channel 1223*a*. This is best seen in FIG. 12*c* that shows a cross-sectional side view of FIG. 12*a*.

In this embodiment, for example, the receptacle device 1205*a* engages a mask 1203*a* by way of the channel 1223*a* in the form of a groove 1223*a*. More particularly, the body portion 1215*a* can be pushed through a hole 1241*a* in the securing portion 1219*a* so that it protrudes therethrough. The body portion 1215*a* may be flexible/deformable in that its shape can be temporarily changed to more easily fit through the hole 1241*a* of the securing portion 1219*a*. For example, the body portion 1215*a* may be squeezed to help push it through the hole 1241*a* of the securing portion 1219*a*. This provides the benefit of an integrally formed body portion 1215*a* and anchor portion 1217*a* of larger diameter to squeeze through a smaller diameter hole 1241*a* of the securing portion 1219*a*, thus allowing the securing portion 1219*a* to be trapped/releasably engaged within the channel 1223*a* between the body portion 1215*a* and anchor portion 1217*a*. This flexibility of the body portion 1215*a* is what allows the integral formation of the body portion 1215*a* and anchor portion 1217*a* to be possible while still maintaining the releasable engagement of the securing portion 1219*a* with the channel 1223*a*.

Figure 12B:
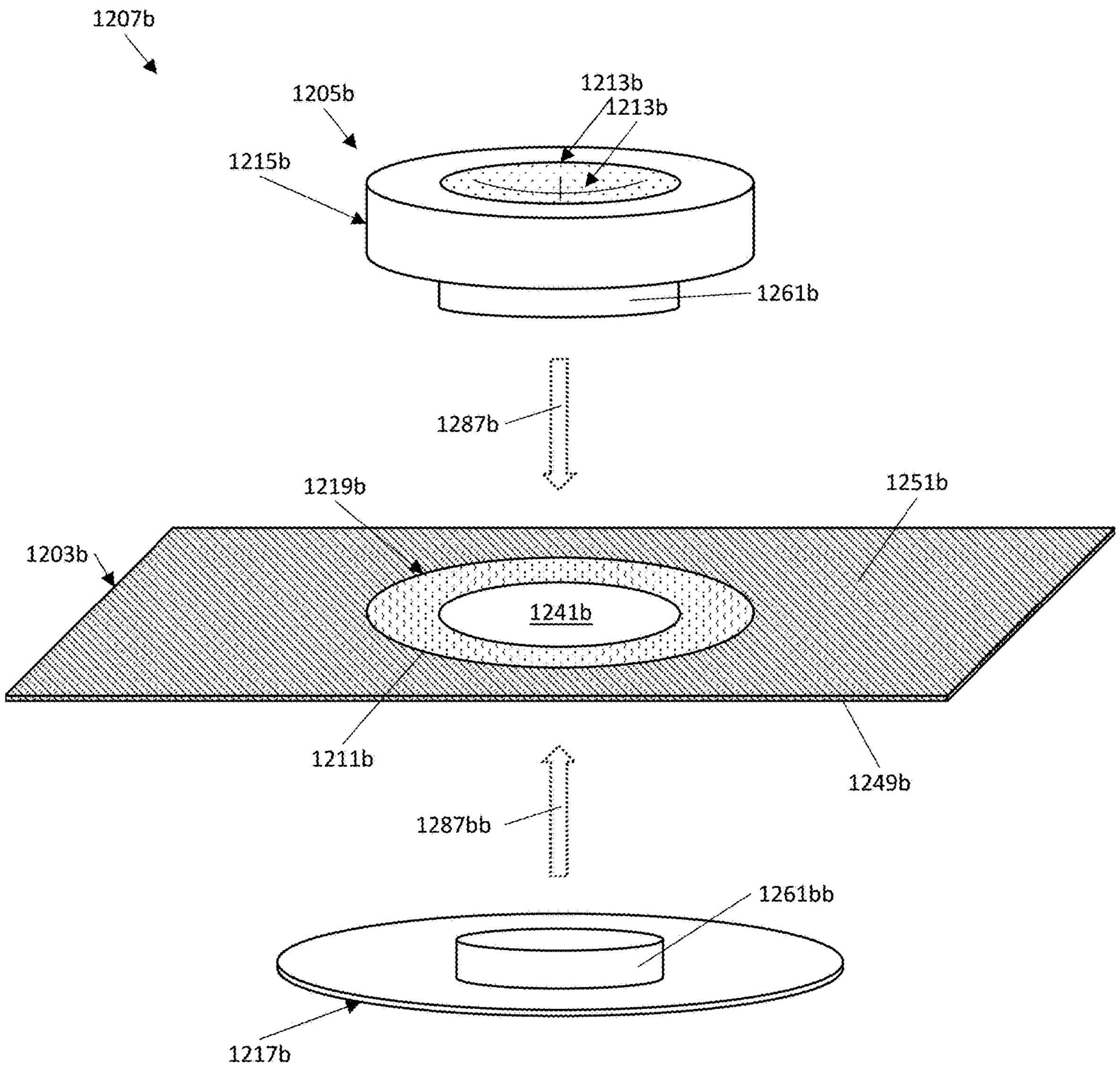
FIG. 12*b* is a perspective view of a receptacle device and a mask engaging a securing portion in accordance with an embodiment of the invention in which the receptacle device comprises a body portion and anchor portion which are separate components.

Referring now to FIG. 12*b*, there is shown a perspective view of an assembly 1207*b* having a receptacle device 1205*b* and a mask 1203*b* engaging a securing portion 1219*b* in accordance with an embodiment of the invention in which the receptacle device 1205*b* comprises a body portion 1215*b* and anchor portion 1217*b* which are separate components. This may allow the body portion to be interchangeable and attachable to the anchor portion, and/or the anchor portion to be interchangeable and attachable to the body portion. The receptacle device 1205*b* may comprise a hemispherical or suspension valve 1213*b* surrounded by the body portion 1215*b*. This arrangement is similar to that shown in FIG. 11*c*, except that the bridge portion 1261*b* and the anchor bridge portion 1261*bb* meet and interconnect through the hole 1241*b* of the securing portion 1219*b* forming a channel and trapping the mask 1203*b* and securing portion 1219*b* therein. This is best seen in the cross-sectional side views of FIGS. 12*c*, 12*d* and 12*e*.

Figure 12C:
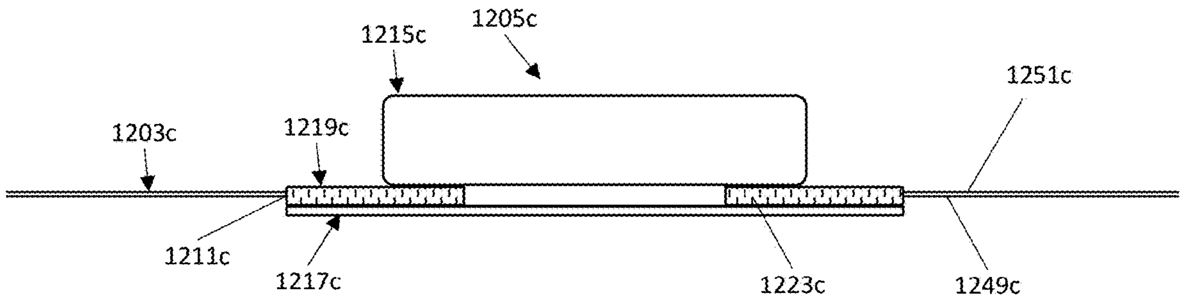
FIG. 12*c* is a cross-sectional side view of a receptacle device and a mask according to an embodiment of the invention engaging a securing portion in a first configuration.

Referring now to FIG. 12*c*, there is shown a cross-sectional side view of the receptacle device 1205*c* and the mask 1203*c*. In this first assembled configuration of the invention engaging a securing portion 1219*c*, the channel 1223*c* defined between the body portion 1215*c* and the anchor portion 1217*c* releasably engages the securing portion 1219*c*. The outer edge of the securing portion 1219*c* engages the hole 1211*c* of the mask 1203*c*. The mask 1203*c* then extends laterally from the securing portion 1219*c*. The body portion 1215*c* is exposed on the side of the exterior surface 1251*c* of the mask 1203*c*, while the anchor portion 1217*c* is hidden on the side of the interior surface 1249*c* of the mask 1203*c*.

Figure 12D:
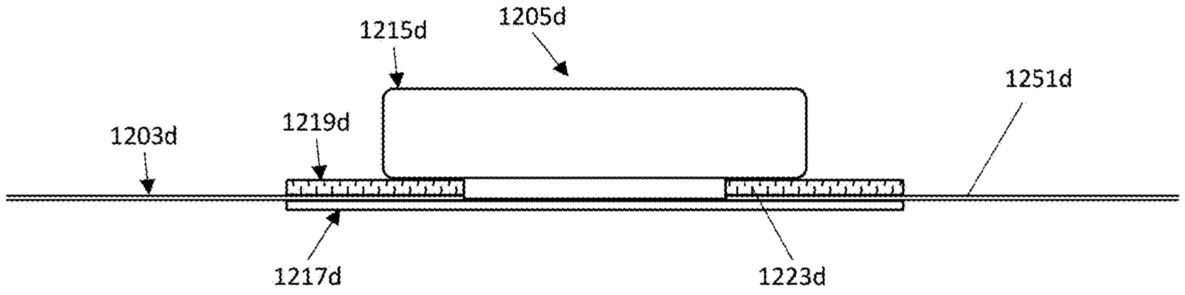
FIG. 12*d* is a cross-sectional side view of a receptacle device and a mask according to an embodiment of the invention engaging a securing portion in a second configuration.

Referring now to FIG. 12*d*, there is shown a cross-sectional side view of a receptacle device 1205*d* and a mask 1203*d* according to an embodiment of the invention engaging a securing portion 1219*d* in a second configuration. In this second configuration, the channel 1223*d* defined between the body portion 1215*d* and the anchor portion 1217*d* releasably engages both the securing portion 1219*d* and the mask 1203*d*. The securing portion 1219*d* engages the exterior surface 1251*d* of the mask 1203*d* and sits beneath the body portion 1215*d*; essentially located between said mask 1203*d* and body portion 1215*d*.

Figure 12E:
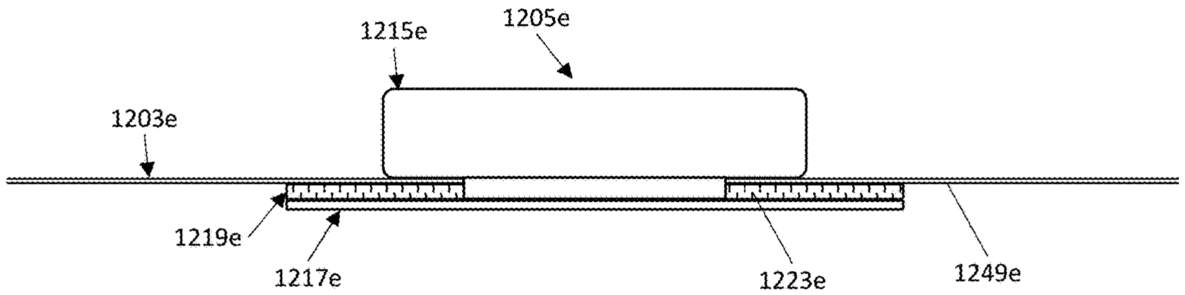
FIG. 12*e* is a cross-sectional side view of a receptacle device and a mask according to an embodiment of the invention engaging a securing portion in a third configuration.

Referring now to FIG. 12*e*, there is shown a cross-sectional side view of a receptacle device 1205*e* and a mask 1203*e* according to an embodiment of the invention engaging a securing portion 1219*e* in a third configuration. In this third configuration, the channel 1223*e* defined between the body portion 1215*e* and the anchor portion 1217*e* releasably engages both the mask 1203*e* and the securing portion 1219*e*. The securing portion 1219*e* engages the interior surface 1249*e* of the mask 1203*e* and sits on top of the anchor portion 1217*e*; essentially located between said anchor portion 1217*e* and mask 1203*e*.

Figure 13A:
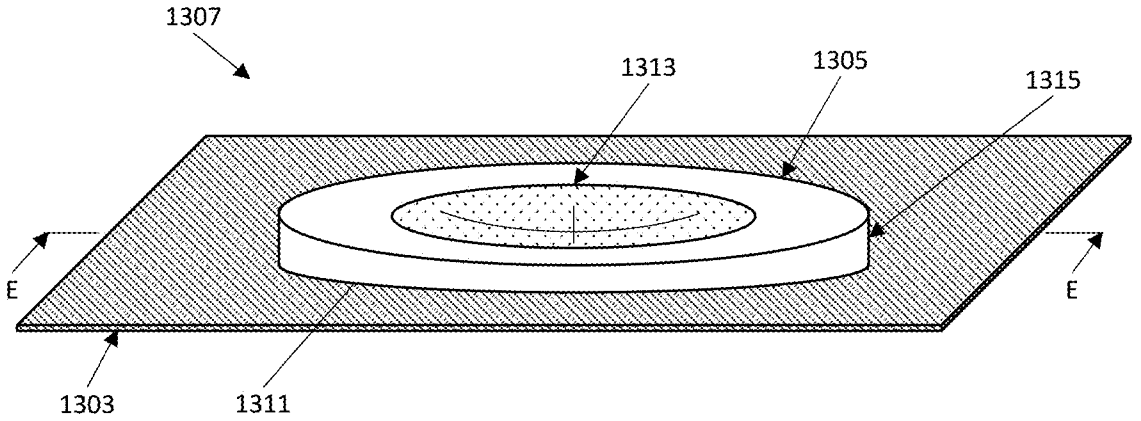
FIG. 13*a* is a perspective view of a receptacle device in accordance with another embodiment of the invention comprising a hemispherical valve and an anchor portion engaged with a mask, and in which the receptacle device is a unitary construction.

Referring now to FIG. 13*a*, there is shown a mask assembly 1307 and a receptacle device 1305 for a mask 1303, the receptacle device 1305 comprising: a hemispherical or suspension valve 1313; a body portion 1315 surrounding the valve 1313; and an anchor portion 1317. In this embodiment, the body portion 1315 and anchor portion 1317 are integrally formed (unitary construction). This embodiment is particularly effective in attaching to masks of the N95 variety (both molded and unmolded). In this embodiment, the anchor portion 1317 is configured to engage the hole 1311 of the mask 1303 by welding. Engagement by welding generates a strong hermetic seal between the receptacle device 1305 and the mask 1303 without use of any additional elements or chemicals that might be required in other engagements. It will be appreciated that, while engagement by welding is utilized in this embodiment, in other embodiments, at least one of the body portion and anchor portion may be configured to engage the mask by any suitable mechanism which may include plastic joining, adhesive bonding, welding, mechanical fastening, stitching, or magnetic elements, for instance.

Figure 13B:
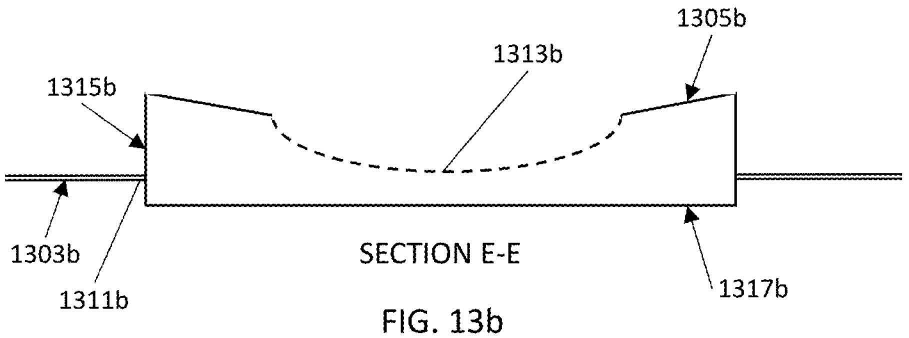
FIG. 13*b* is a cross-sectional side view through E-E of the mask assembly shown in FIG. 9*a;*
Figure 13C:
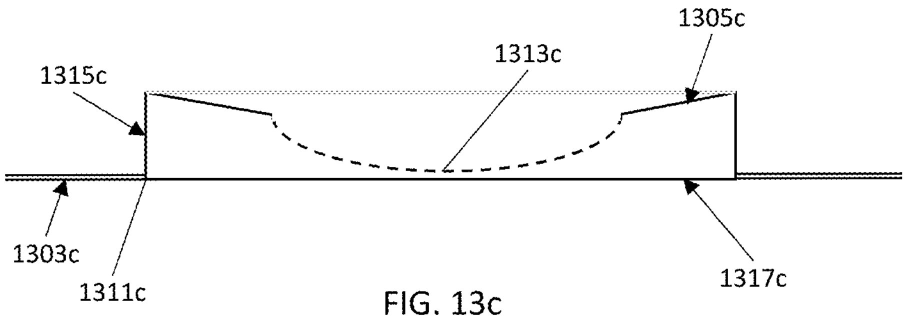
FIG. 13*c* is a cross-sectional side view of a receptacle device similar to that shown in FIG. 13*b* but in a second configuration.
Figure 13D:
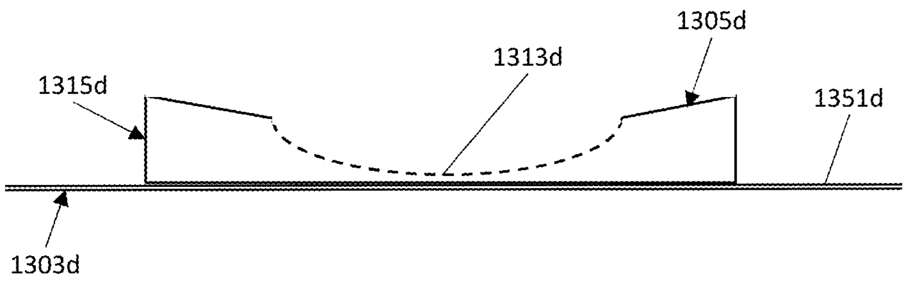
FIG. 13*d* is a cross-sectional side view of a receptacle device similar to that shown in FIG. 13*b* but in a third configuration.

Referring now to FIG. 13*b*, there is shown the cross-section through E-E of the mask assembly 1307 of FIG. 13*a*. It can be seen that the outer edge of the body portion 1315*b* engages the hole 1311*b* of the mask 1303*b*. The mask 1303*b* then extends laterally from the body portion 1315*b*. Additionally, the receptacle device 1305*b* is seated centrally with respect to the mask 1303*b* such that approximately half of the body portion 1315*b* protrudes outwardly through the mask 1303*b* to the outside of the mask 1303*b*, and approximately half of the body portion 1315*b* (involving the anchor portion 1317*b*) protrudes inwardly through the mask 1303*b* to the inside of the mask 1303*b*. It will be appreciated that in other embodiments, the majority of the body portion 1315*b* (including the anchor portion 1317*b*) may protrude outwardly through the mask 1303*b* or inwardly through the mask 1303*b*. Such embodiments can be seen in FIGS. 13*c* through 13*h*. The embodiment shown in FIG. 13*c* is similar to the receptacle device 1305*b* of FIG. 13*b*, for instance, except that the majority of the body portion 1315*b* sits exterior to the mask 1303*b*. The anchor portion 1317*c* sits nearly flush with the mask 1303*c*, and the outer edge of the body portion 1315*c* engages the hole 1311*c* of the mask 1303*c*, which then extends laterally from the body portion 1315*c*. FIG. 13*d* shows an embodiment similar to the embodiment seen in FIG. 13*c*, except that the bottom surface of the receptacle device 1305*d* engages the exterior surface 1351*d* of the mask 1303*d*.

Figure 13E:
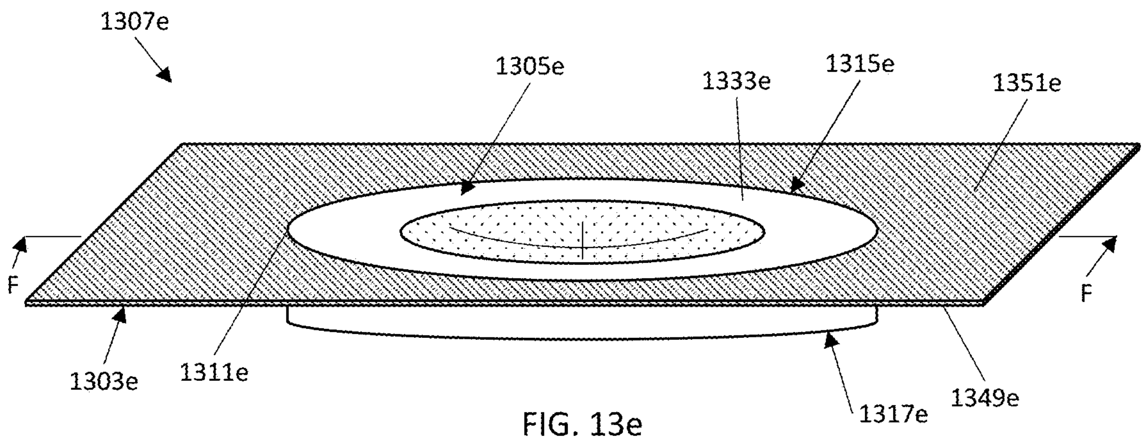
FIG. 13*e* is a perspective view of a receptacle device in accordance with another embodiment of the invention comprising a hemispherical valve and a body portion engaged with a mask, and in which the receptacle device is a unitary construction.
Figure 13F:
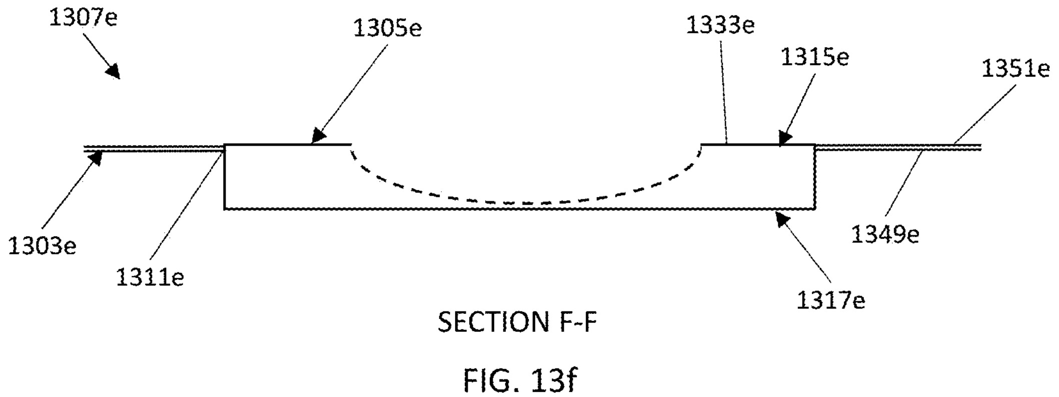
FIG. 13*f* is a cross-sectional side view through F-F of the mask assembly shown in FIG. 13*e;*
Figure 13G:
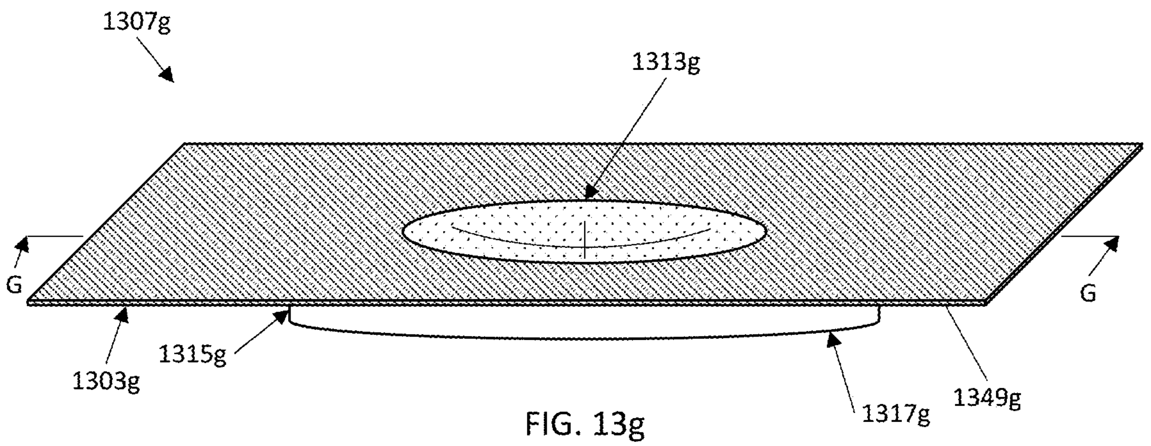
FIG. 13*g* is a perspective view of a receptacle device similar to that shown in FIG. 13*e* but in a second configuration.
Figure 13H:
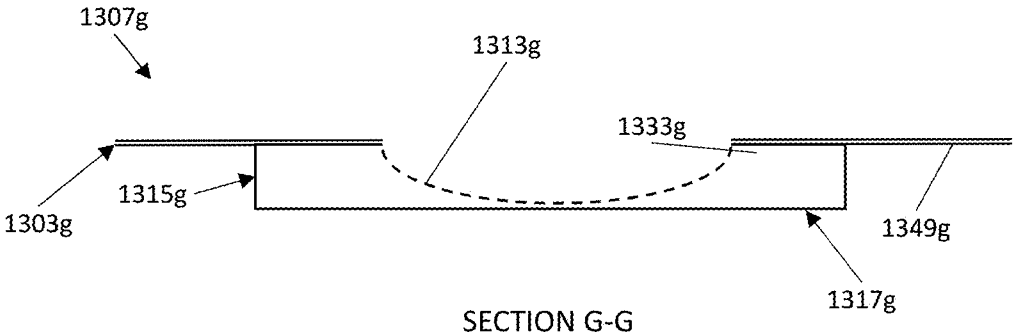
FIG. 13*h* is a cross-sectional side view through G-G of the mask assembly shown in FIG. 13*g;*

Referring now to FIGS. 13*e* and 13*f*, there is shown a perspective view of a mask assembly generally indicated 1307*e*, and a cross-section through F-F of the same. The mask assembly 1307*e* is generally the same as the mask assembly 1307, except that a top surface 1333*e* of the receptacle device 1305*e* sits almost flush with an exterior face 1351*e* of the mask 1303*e* which faces away from the user's face in operation. Thus, the top surface 1333*e* and the exterior face 1351*e* define a substantially smooth surface. In this embodiment, the body portion 1315*e* is integrally formed with the anchor portion 1317*e*. Therefore, in this embodiment, the body portion 1315*e* (comprising the anchor portion 1317*e*) sits below the interior face 1349*e* of the mask 1303*e*. The outer edge of the body portion 1315*e* engages the hole 1311*e* of the mask 1303*e*, which then extends laterally from the body portion 1315*e*. Referring now to FIGS. 13*g* and 13*h*, a cross-section through G-G of the same, there is shown a mask assembly 1307*g* similar to the mask assembly 1307*e* seen in FIG. 13*e*, except that the top surface 1333*g* of the body portion 1315*g* engages the interior surface 1349*g* of the mask 1303*g*. As such, the only portion of the body portion 1315*g* that is visible from the exterior of the mask 1303*g* is the valve 1313*g*.

Figure 13I:
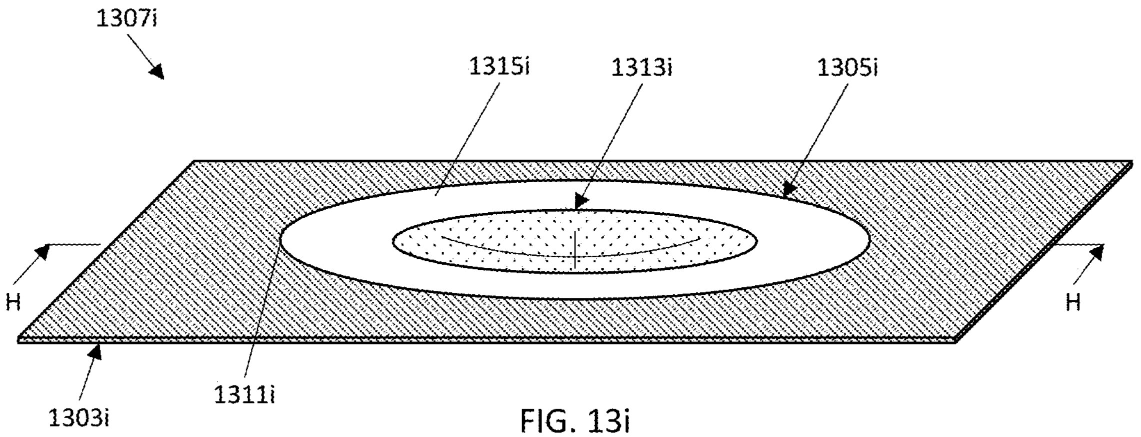
FIG. 13*i* is a perspective view of a receptacle device in accordance with another embodiment of the invention comprising a hemispherical valve and engaged with a mask, and in which the receptacle device is a unitary construction almost flush with the mask.
Figure 13J:
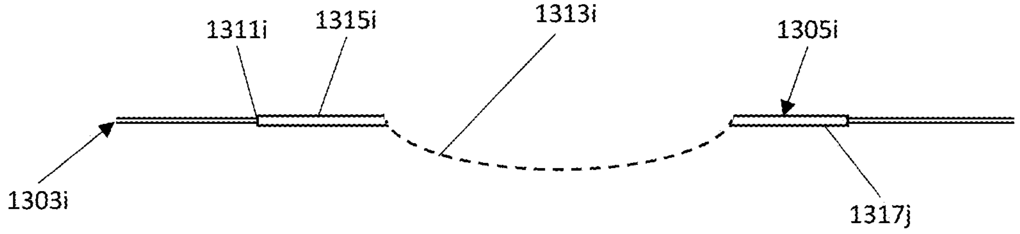
FIG. 13*j* is a cross-sectional side view through H-H of the mask assembly shown in FIG. 13*i;*

Referring now to FIGS. 13*i* and 13*j*, there is shown a perspective view of a mask assembly generally indicated 1307*i*, and a cross-section through H-H of the same. In this embodiment, there is shown a receptacle device 1305*i* for a mask 1303*i*, the receptacle device 1305*i* comprising: a hemispherical or suspension valve 1313*i*; a body portion 1315*i* surrounding the valve 1313*i*; and an anchor portion 1317*i* formed integrally with the body portion 1315*i* (a unitary construction); wherein the body portion 1315*i* (integrally formed with the anchor portion 1317*i*) is configured to engage the mask 1303*i* (at its hole 1311*i*, for example) by plastic joining. It will be appreciated, however, that in other embodiments, at least one of the body portion 1315*i* and anchor portion may be configured to engage the mask 1303*i* by at least one of plastic joining, adhesive bonding, welding, mechanical fastening, stitching, and magnetic elements. The mask assembly 1307*i* is generally the same as the mask assembly 1307, except that the body portion 1315*i* is substantially shorter in height than that of the body portion 1315*i*, which means that the body portion 1315*i* is substantially in line with the longitudinal axis of the mask 1303*i*. The hemispherical or suspension valve 1313*i*, however, sits primarily beneath the longitudinal axis of the mask 1303*i*. The outer edge of the body portion 1315*i* engages the hole 1311*i* of the mask 1303*i*, which then extends laterally from the body portion 1315*i*.

Figure 13K:
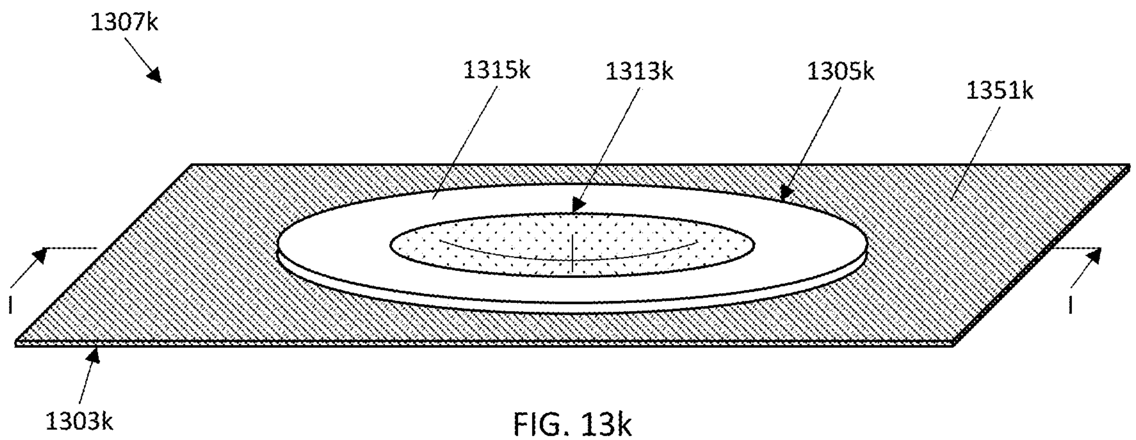
FIG. 13*k* is a perspective view of a receptacle device similar to that shown in FIG. 13*i* but in a second configuration in which a unitary body engages the exterior face of the mask.
Figure 13L:
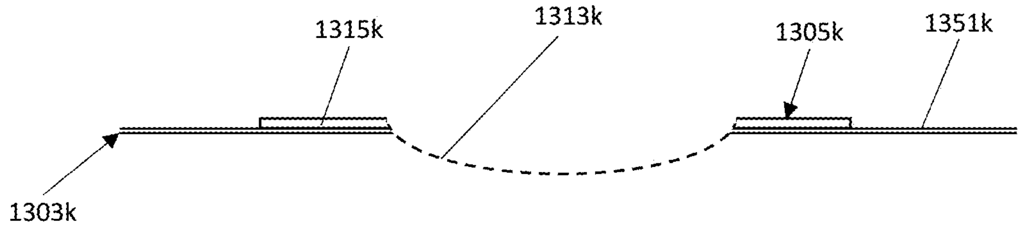
FIG. 13*l* is a cross-sectional side view through I-I of the mask assembly shown in FIG. 13*k;*

Referring now to FIG. 13*k*, there is shown a perspective view of a receptacle device 1305*k* in accordance with another embodiment of the invention that is the same as that shown in FIG. 13*i*, except in this embodiment an anchor portion formed integrally with the body portion 1315*k* (a unitary construction) sits on top of a mask 1303*k* and engages the exterior surface 1351*k* of the mask 1303*k*. In this way, the body portion 1315*k* sits on top of and is not quite flush with the exterior surface 1351*k* of the mask 1303*k*. This is best seen in FIG. 13*l*, a cross-section through I-I of FIG. 13*k*.

Figure 13M:
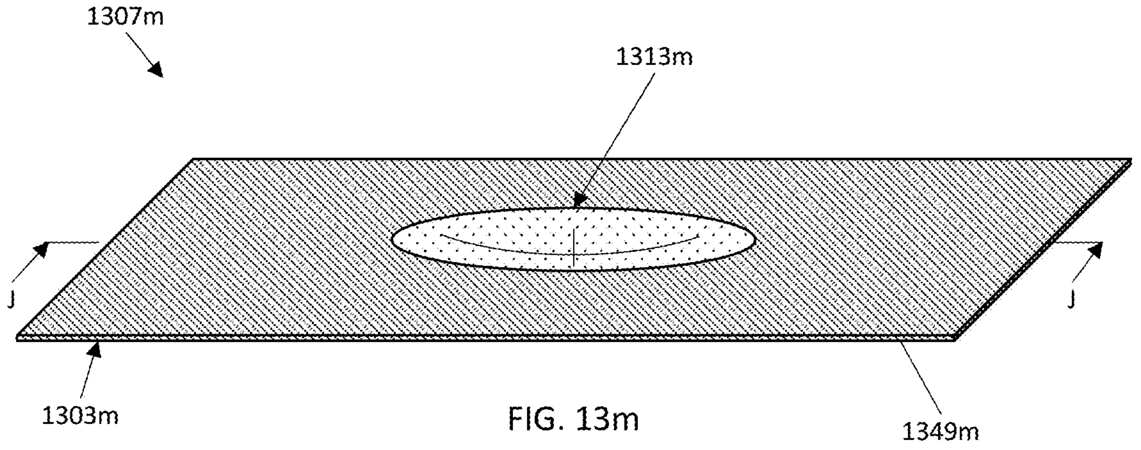
FIG. 13*m* is a perspective view of a receptacle device similar to that shown in FIG. 13*i* but in a third configuration in which a unitary body engages the interior face of the mask.
Figure 13N:
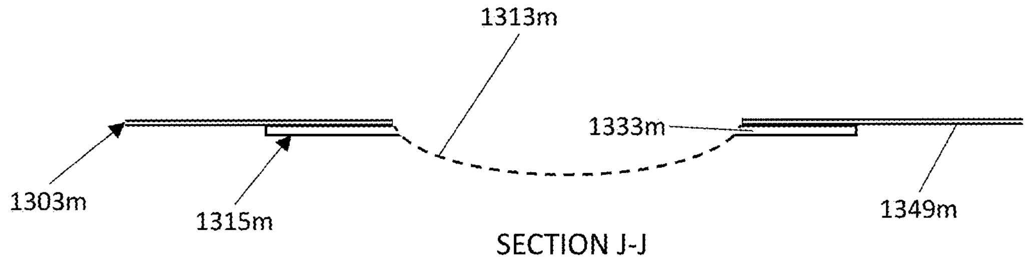
FIG. 13*n* is a cross-sectional side view through J-J of the mask assembly shown in FIG. 13*m;*

Referring now to FIGS. 13*m* and 13*n*, a cross-section through J-J of the same, there is shown a mask assembly 1307*m* similar to the mask assembly 1307*k* of FIG. 13*k*, except that the top surface 1333*m* of the body portion 1315*m* engages the interior surface 1349*m* of the mask 1303*m*. As such, the only portion of the body portion 1315*m* that is visible from outside the mask 1303*m* during use is the valve 1313*m*.

Figure 14A:
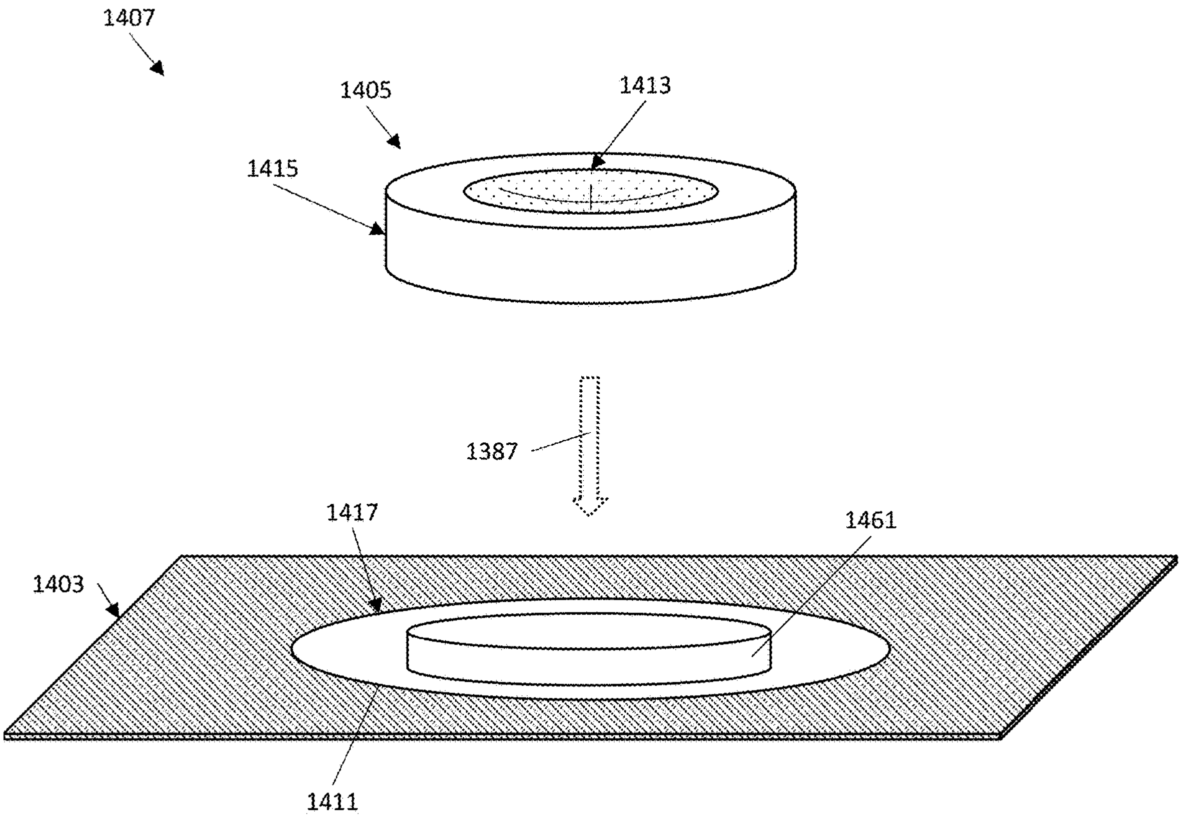
FIG. 14*a* is a perspective view of a receptacle device in accordance with another embodiment of the invention in which the receptacle device comprises a body portion and anchor portion which are separate components, and the anchor portion engages a mask.
Figure 14B:
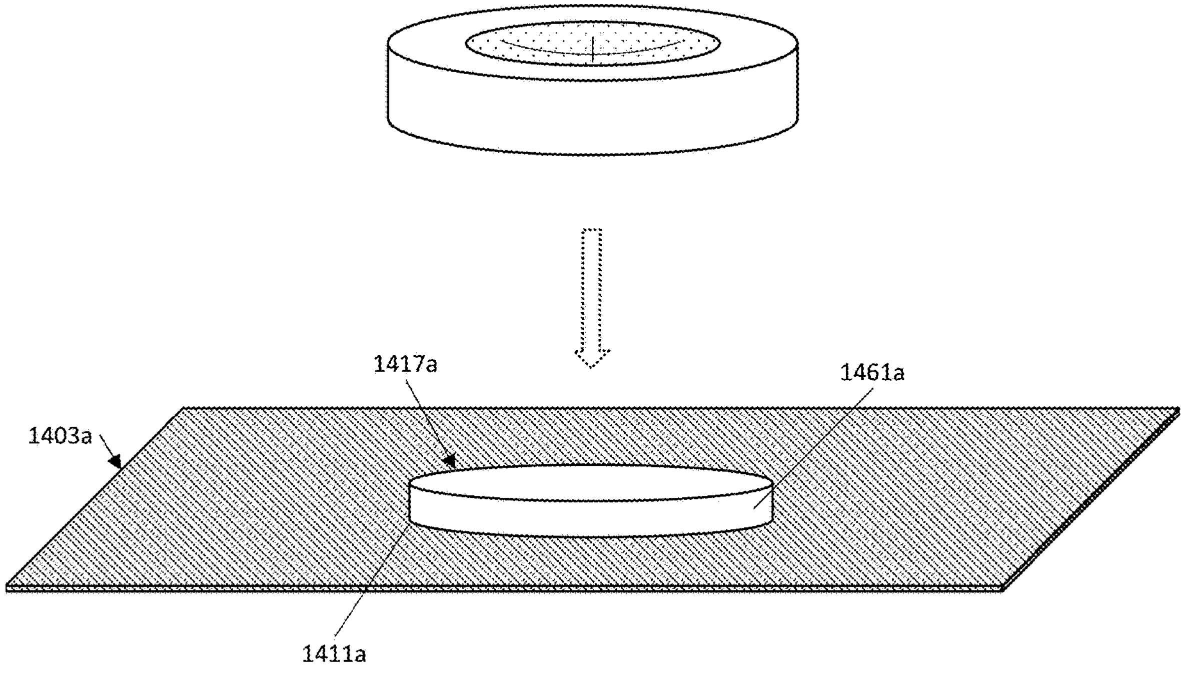
FIG. 14*b* is a perspective view of a receptacle device similar to that shown in FIG. 14*a* but with another embodiment of the anchor portion.

Referring now to FIG. 14*a*, there is shown a perspective view of a receptacle device 1405 in accordance with another embodiment of the invention in which the receptacle device 1405 comprises a body portion 1415 and anchor portion 1417 which are separate components. This may allow the body portion to be interchangeable and attachable to the anchor portion, and/or the anchor portion to be interchangeable and attachable to the body portion. The body portion 1415 may comprise a hemispherical or suspension valve 1413. The anchor portion 1417 is configured to engage the mask 1403 by plastic joining at the hole 1411 of the mask 1403. It will be appreciated that other embodiments may engage the mask 1403 by any suitable mechanism which may include plastic joining, adhesive bonding, welding, mechanical fastening, stitching, or magnetic elements, for instance. In operation, the body portion 1415 is moved downwardly in the direction indicated by arrow 1487 towards the anchor portion 1417. In this way, the body portion 1413 and the anchor bridge portion 1461 meet and interconnect. As shown in FIG. 14*b*, the anchor portion 1417*a* may have a smaller diameter than the anchor portion 1417 of FIG. 14*a*. Its diameter can be reduced to as little as, or even smaller than, the diameter of the anchor bridge portion 1461*a*. In such a case, a smaller diameter hole 1411*a* can be cut in the mask 1403*a* to engage with the reduced diameter of the anchor portion 1417*a*.

Figure 14C:
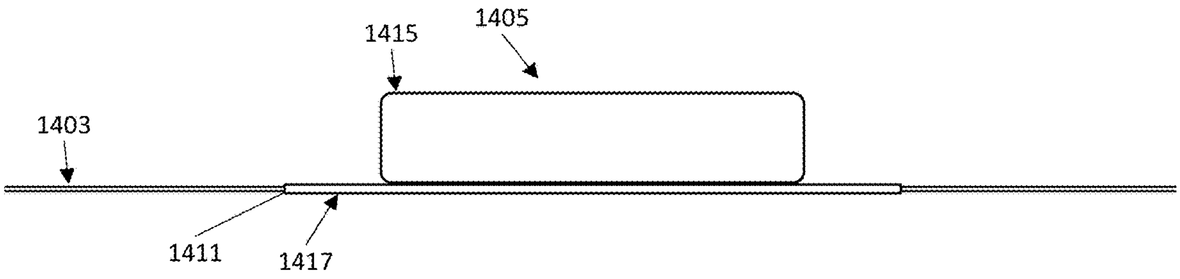
FIG. 14*c* is a cross-sectional side view of the mask assembly shown in FIG. 14*a* in which the anchor portion engages the mask in a first configuration.
Figure 14D:
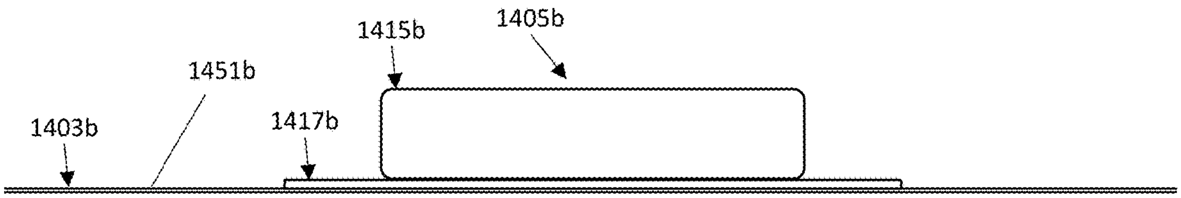
FIG. 14*d* is a cross-sectional side view of the mask assembly shown in FIG. 14*a* in which the anchor portion engages the mask in a second configuration.
Figure 14E:
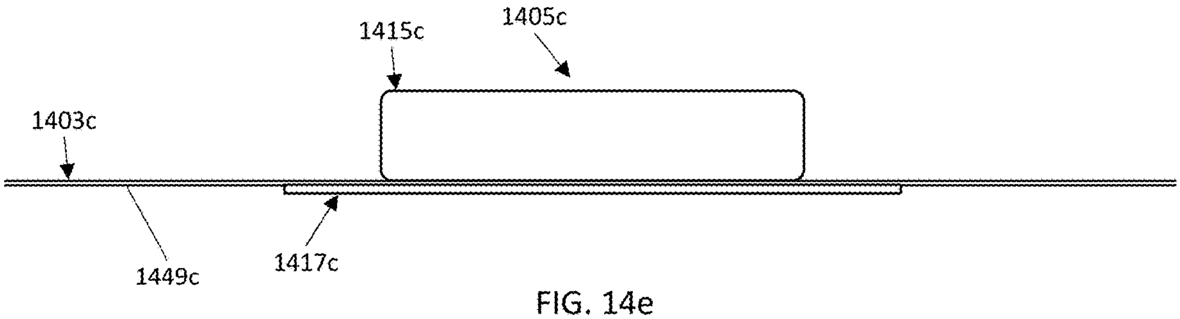
FIG. 14*e* is a cross-sectional side view of the mask assembly shown in FIG. 14*a* in which the anchor portion engages the mask in a third configuration.

FIG. 14*c* shows a cross-sectional side view of FIG. 14*a* following assembly of the receptacle device 1405 and the mask 1403. In this first assembled configuration, the outer edge of the anchor portion 1417 engages the hole 1411 of the mask 1403, which then extends laterally from the anchor portion 1417. FIG. 14*d* shows a second configuration in which the anchor portion 1417*b* engages the exterior surface 1451*b* of the mask 1403*b*. FIG. 14*e* shows a third configuration in which the anchor portion 1417*c* engages the interior surface 1449*c* of the mask 1403*c*; essentially the mask 1403*c* is located between said anchor portion 1417*c* and body portion 1415*c*.

Figure 15A:
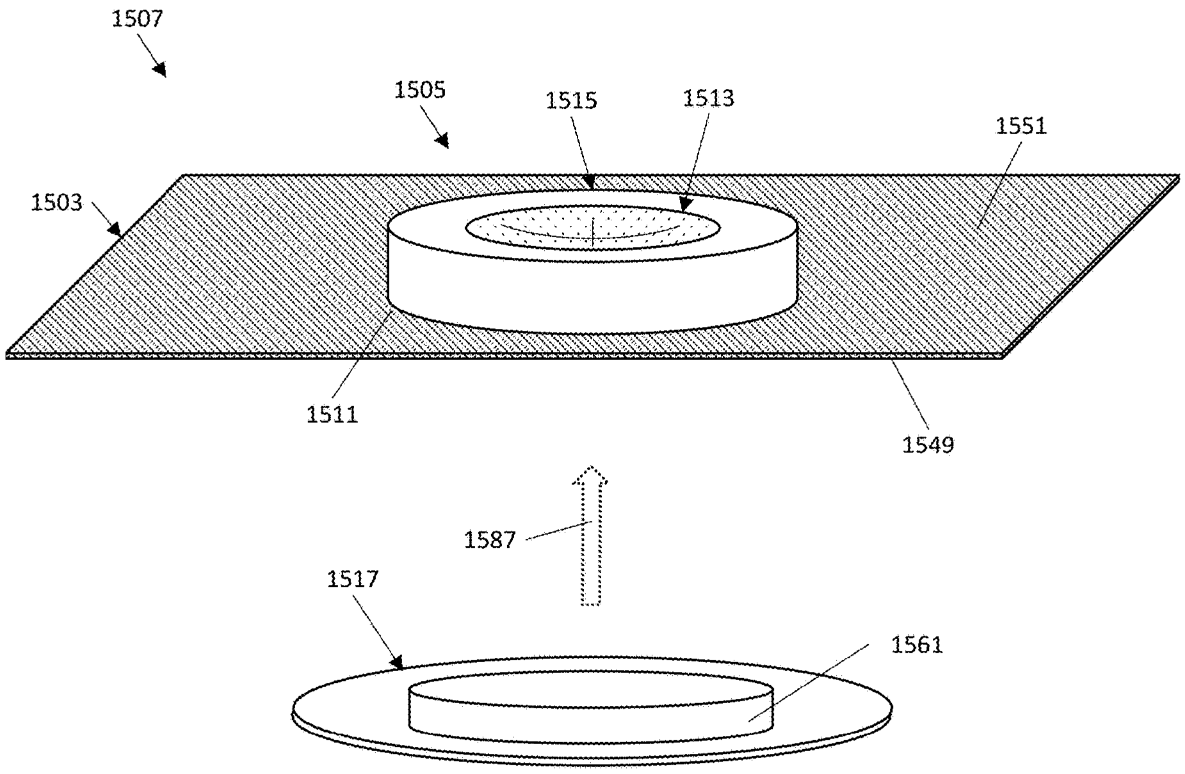
FIG. 15*a* is a perspective view of a receptacle device and mask in accordance with another embodiment of the invention in which the receptacle device comprises a body portion and anchor portion which are separate components, and the body portion engages a mask.
Figure 15B:
FIG. 15*b* is a perspective view of a receptacle device similar to that shown in FIG. 15*a* but with another embodiment of the anchor portion.

Referring now to FIG. 15*a*, there is shown a perspective view of a receptacle device 1505 in accordance with another embodiment of the invention in which the receptacle device 1505 comprises a body portion 1515 and anchor portion 1517 which are separate components. This may allow the body portion to be interchangeable and attachable to the anchor portion, and/or the anchor portion to be interchangeable and attachable to the body portion. The body portion 1515 may comprise a hemispherical or suspension valve 1513. The body portion 1517 is configured to engage the mask 1503 by plastic joining at the hole 1511 of the mask 1503. It will be appreciated that in other embodiments the body portion 1517 may engage the mask 1503 by any suitable mechanism which may include plastic joining, adhesive bonding, welding, mechanical fastening, stitching, or magnetic elements, for instance. In operation, the anchor portion 1515 is moved upwardly in the direction indicated by arrow 1587 towards the body portion 1515. In this way, the body portion 1515 and the anchor bridge portion 1561 meet and interconnect. As shown in FIG. 15*b*, the anchor portion 1517*a* may have a smaller diameter than the anchor portion 1517 seen in FIG. 15*a*. Its diameter can be reduced to as little as, or even smaller than, the diameter of the anchor bridge portion 1561*a*.

Figure 15C:
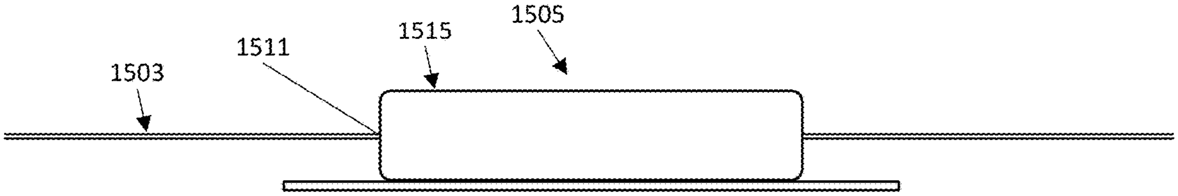
FIG. 15*c* is a cross-sectional side view of the mask assembly shown in FIG. 15*a* in which the body portion engages the mask in a first configuration.
Figure 15D:
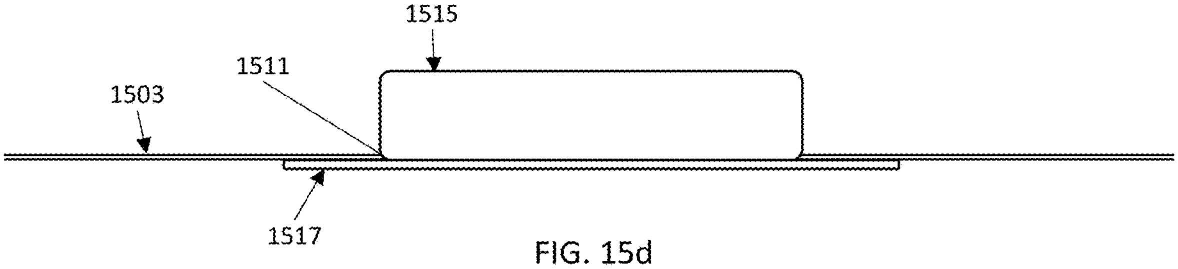
FIG. 15*d* is a cross-sectional side view of the mask assembly shown in FIG. 15*a* in which the body portion engages the mask in a second configuration.
Figure 15E:
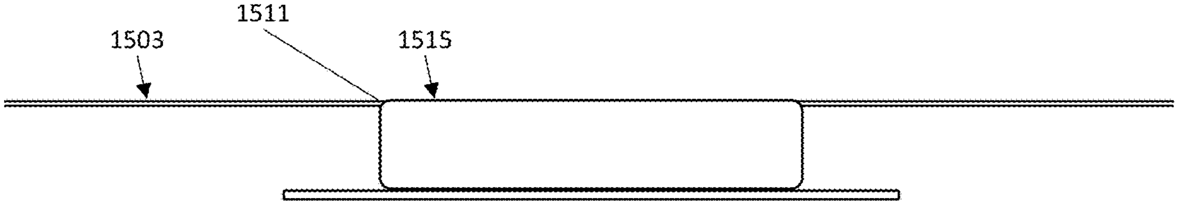
FIG. 15*e* is a cross-sectional side view of the mask assembly shown in FIG. 15*a* in which the body portion engages the mask in a third configuration.
Figure 15F:
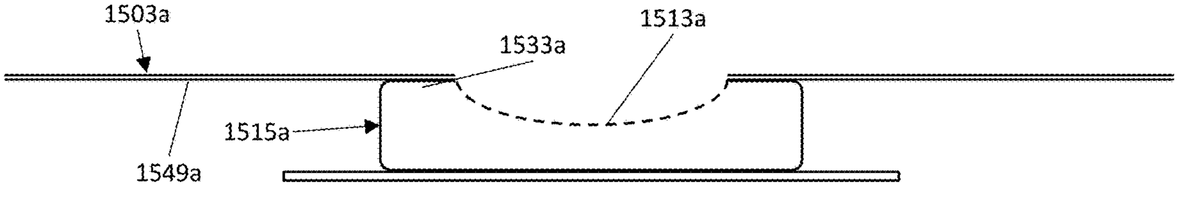
FIG. 15*f* is a cross-sectional side view of the mask assembly shown in FIG. 15*a* in which the body portion engages the mask in a fourth configuration.

FIG. 15*c* shows a cross-sectional side view of FIG. 15*a* following assembly of the receptacle device 1505 and the mask 1503. In this first assembled configuration, the outer edge of the body portion 1515 engages the hole 1511 of the mask 1503, which then extends laterally from the body portion 1515. It will be appreciated that, in other embodiments, the majority of the body portion 1515 may protrude outwardly through the mask 1503, as shown in FIG. 15*d* or inwardly through the mask 1503, as shown in FIG. 15*e*. FIG. 15*f* shows a fourth configuration in which the top surface 1533*a* of the body portion 1515*a* engages the interior surface 1549*a* of the mask 1503*a*. As such, the only portion of the body portion 1515*a* that is visible from outside the mask 1503*a* during use is the valve 1513*a*.

Figure 16:
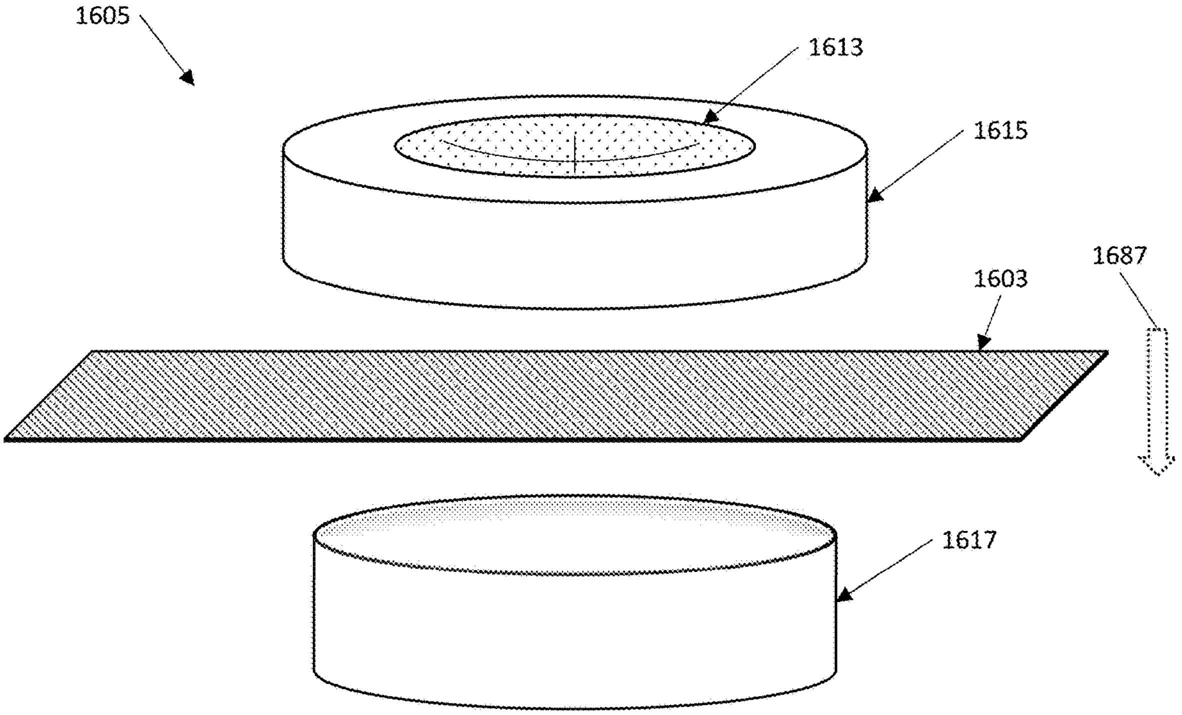
FIG. 16 is a perspective exploded view of a receptacle device in accordance with an embodiment of the invention comprising a body portion and anchor portion which are separate components utilizing a push-pull mechanism for connection.

Referring now to FIG. 16, there is shown a perspective exploded view of a receptacle device 1605 in accordance with an embodiment of the invention. In this embodiment, the receptacle device 1605 comprises a body portion 1615 and anchor portion 1617 which are separate components utilizing a push-pull mechanism for connection with one another. More particularly, in operation, to assemble a mask assembly, for instance, the body portion 1615 surrounding the valve 1613 is pushed towards the anchor portion 1617 in the direction indicated by arrow 1687, and concurrently engaging (trapping) a mask 1603 in a channel (not shown in exploded view) defined therebetween. In this embodiment, the diameter of the hollow body portion 1615 is slightly greater than that of the anchor portion 1617 which allows the hollow body portion to receive the anchor portion 1617 by way of an interference fit to hold the separate components together by friction and, in turn, engage the mask 1603. To release the joint formed between the body portion 1615 and the anchor portion 1617, and consequently release the mask 1603, the body portion 1615 can be pulled in the opposite direction to the direction indicated by arrow 1687. It will be appreciated that any of the suitable embodiments defined herein may comprise a push-pull mechanism to releasably engage any of the separate components.

Figure 17:
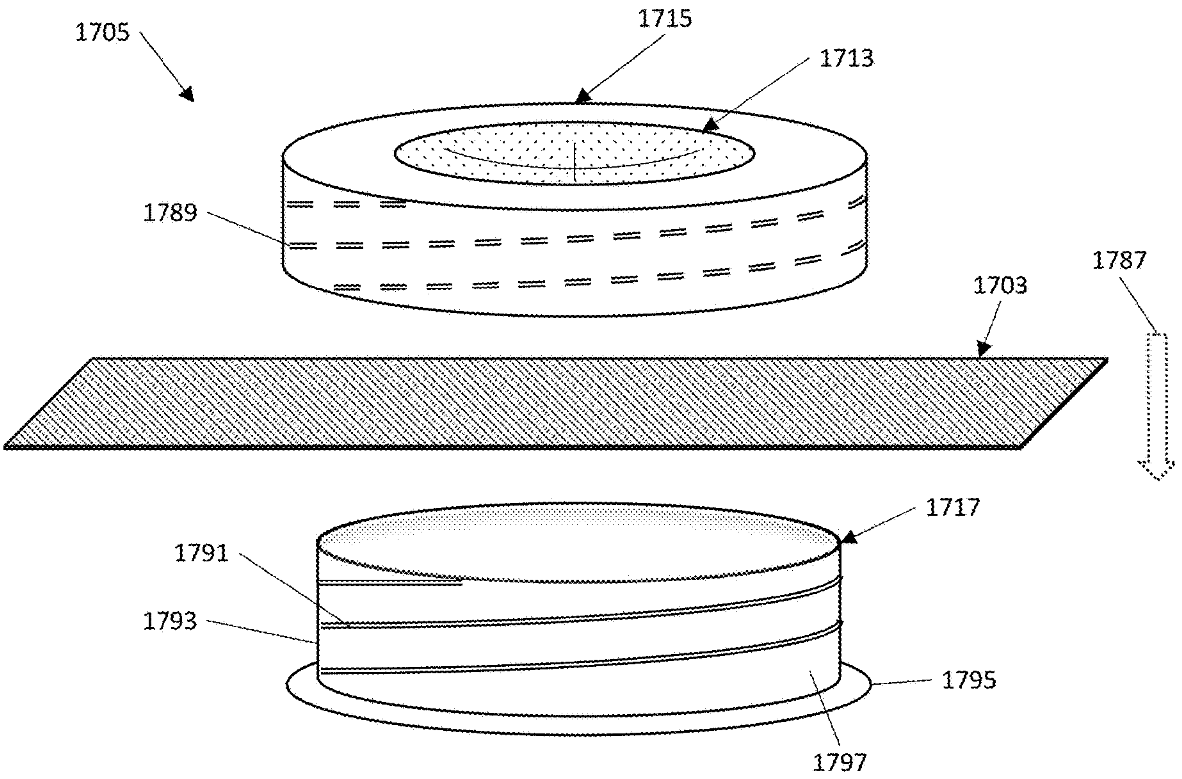
FIG. 17 is a perspective exploded view of a receptacle device in accordance with another embodiment of the invention comprising a body portion and anchor portion which are separate components utilizing a screw-fit mechanism for connection.

Referring now to FIG. 17, there is shown a perspective exploded view of a receptacle device in accordance with another embodiment of the invention. In this embodiment, the receptacle device 1705 comprises a body portion 1715 and anchor portion 1717 which are separate components utilizing a screw-fit mechanism for connection with one another. The body portion 1715 comprises an internal thread 1789 on its internal wall (not shown), while the anchor portion 1717 comprises an external thread 1791 on external surface 1793. The anchor portion 1717 may also comprise a lip 1795 at its base 1797. In operation, to assemble a mask assembly, for instance, the body portion 1715 surrounding the valve 1713 is moved in the direction indicated by arrow 1787 and screwed in a clockwise manner, for instance, onto the anchor portion 1717, concurrently engaging (trapping) a mask 1703 in a channel (not shown in exploded view) defined therebetween. In this embodiment, the diameter of the hollow body portion 1715 is slightly greater than that of the anchor portion 1717 which allows the hollow body portion to receive the anchor portion 1717 by way of screwing it therein in order to hold the separate components together by way of the engagement of the internal thread 1789 with the external thread 1791 and, in turn, engage the mask 1703. To release the joint formed between the body portion 1715 and the anchor portion 1717, and consequently release the mask 1703, the body portion 1715 can be screwed (rotated) in the opposite direction (anticlockwise, for instance) and moved in the direction opposite to that indicated by arrow 1787. It will be appreciated that any of the suitable embodiments defined herein may comprise a screw-fit mechanism to releasably engage any of the separate components.

Figure 18:
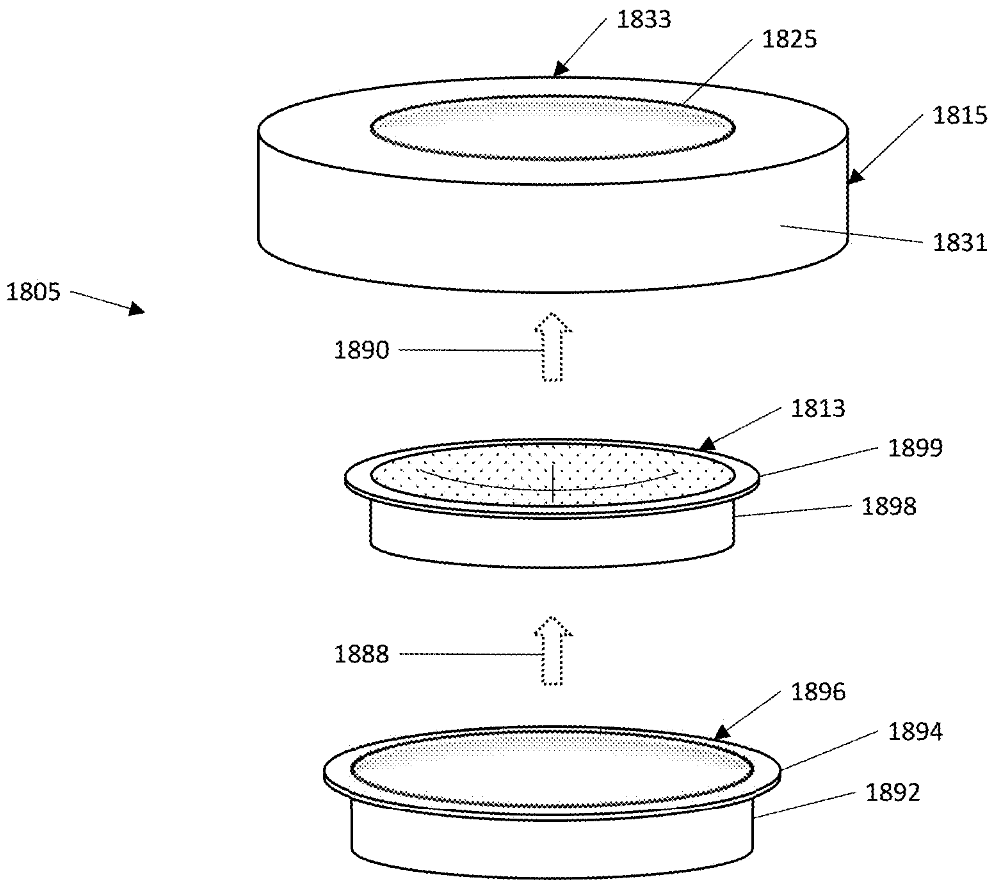
FIG. 18 is a perspective exploded view of a receptacle device in accordance with another embodiment of the invention comprising a body portion and valve which are separate components.

Referring now to FIG. 18, there is shown a perspective exploded view of a receptacle device 1805 in accordance with another embodiment of the invention comprising a body portion 1815 and valve 1813 which are separate components. In this embodiment, the body portion is a short cylinder 1831 with a hole 1825 through its center extending through to its top surface 1833. The valve 1813 comprises a circular ring top 1899 from which a circular skirt 1898 extends about its perimeter. The receptacle device 1805 also comprises a valve seat 1896. The valve seat 1896 comprises a circular ring top 1894 from which a circular base 1892 extends. The diameter of the circular ring top 1894 is slightly greater than the diameter of the circular ring top 1899; thus, when engaged, the valve 1813 sits comfortably in the valve seat 1896. When assembled, the valve 1813 is inserted through the bottom (not shown) of the body portion 1815 in the direction indicated by arrow 1890 to fill the hole 1825 in the top surface 1833. Next, the valve seat 1896 is also inserted through the bottom of the body portion 1815 in the direction indicated by arrow 1888 towards the valve 1813 and engages therewith to hold it in position relative to the body portion 1815. The valve seat 1896 may optionally snap into the body portion 1815, thus securing the valve 1813 in place, or the valve seat 1896 may optionally secure the valve 1813 by friction or tight fit. This embodiment demonstrates that the body portion and valve can be separate components and formed in accordance with the present invention. This is true for any suitable environment defined herein. It will be appreciated that this embodiment of the receptacle device 1805 may include an anchor portion.

Referring now to FIGS. 19*a* to 19*e*, there are shown plan views of various valve slit patterns in accordance with embodiments of the invention. More particularly, FIGS. 19*a* to 19*e* illustrate that the slit patterns generate valve petals 1953. FIG. 19*a* is of a slit pattern that comprises dual crosshairs 1937*a*, 1937*b* which intersect at their respective centers 1986*a* and define a cross shape. FIG. 19*b* is of a slit pattern that comprises three crosshairs 1937*c*, 1937*d*, 1937*e* which intersect at their respective centers 1986*b* and are radially equally spaced. FIG. 19*c* is of a slit pattern that comprises three crosshairs 1937*f*, 1937*g*, 1937*h*, wherein each of the at three crosshairs 1937*f*, 1937*g*, 1937*h* radially extend from a common center 1986*c* and are radially equally spaced. FIG. 19*d* is of a slit pattern that comprises four crosshairs 1937*i*, 1937*j*, 1937*k*, 19371 which intersect at their respective centers 1986*d* and are radially equally spaced. FIG. 19*e* is of a slit pattern that comprises a snowflake pattern. In this embodiment, the snowflake pattern comprises two crosshairs 1937*m*, 1937*n* which intersect at their respective centers 1986*e* and define a cross shape. At each of the four ends furthest from the centers 1986*e* there are defined V-shapes 1984.

Any receptacle device formed in accordance with the invention defined herein may utilize any of the slit patterns described above. The slit pattern is configured to conform to the shape of a drinking, feeding or inhalation instrument when inserted through the valve. The slit pattern is configured to releasably grip and hold in position a drinking, feeding or inhalation instrument when inserted through the valve.

Figure 20A:
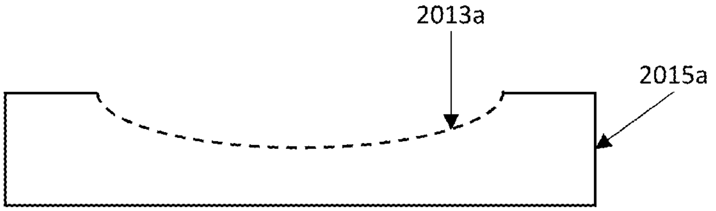
FIGS. 20*a* to 20*d* are side views of various valve arrangements relative to the body portion in accordance with embodiments of the invention.
Figure 20B:
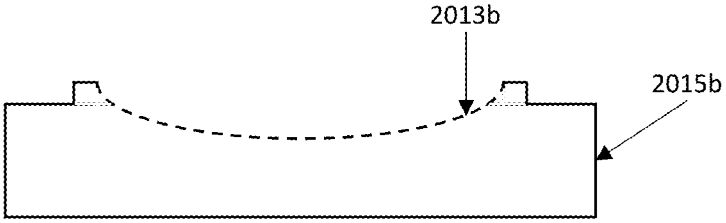
Figure 20C:
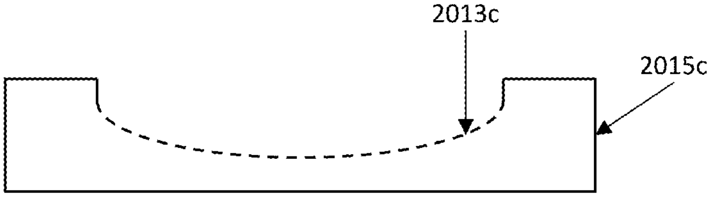
Figure 20D:
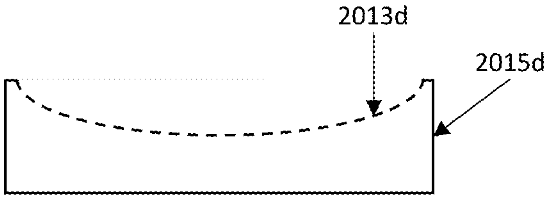

Referring now to FIGS. 20*a* to 20*d*, there are shown side views of various valve arrangements relative to the body portion in accordance with embodiments of the invention. FIG. 20*a* shows the valve 2013*a* in line with the body portion 2015*a*. FIG. 20*b* shows the valve 2013*b* raised above the body portion 2015*b*. FIG. 20*c* shows the valve 2013*c* recessed with respect to the body portion 2015*c*. FIG. 20*d* shows the valve at 2013*d* in line with the body portion 2015*d* in the same manner shown in FIG. 20*a*, except that the valve 2013*d* is almost the same width as the body portion 2015*d*, whereas the width of the body portion 2015*a* is larger than the width of the valve 2013*a*. It will be appreciated that any receptacle device formed in accordance with the invention defined herein may utilize any of the valve profiles described herein.

Figure 21A:
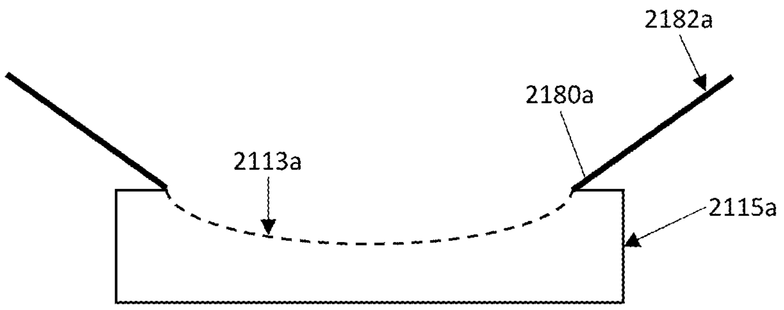
FIGS. 21*a* to 21*d* are side views of various guide portion arrangements relative to the body portion in accordance with embodiments of the invention.
Figure 21B:
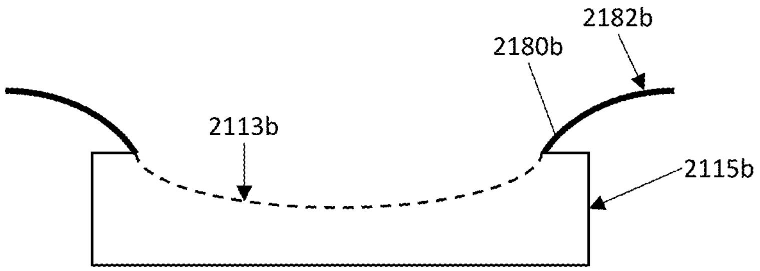
Figure 21C:
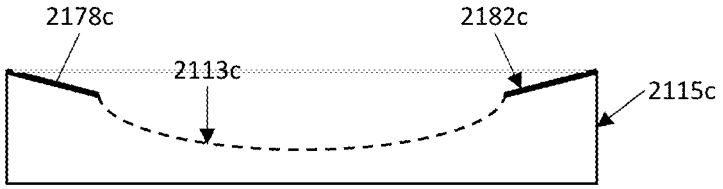
Figure 21D:
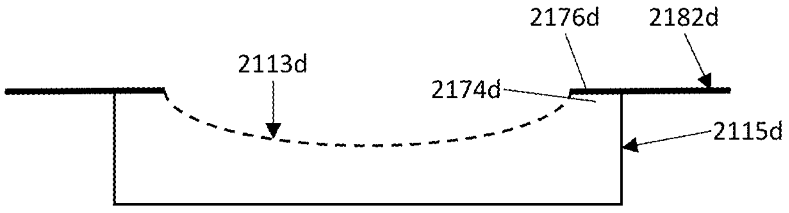

Referring now to FIGS. 21*a* to 21*d*, there are shown side views of various guide portion arrangements relative to the body portion in accordance with embodiments of the invention. FIG. 21*a* illustrates a body portion 2115*a* surrounding a valve 2113*a*. A guide portion 2182*a* is positioned at the periphery of the valve 2113*a* where it meets the body portion 2115*a*. The guide portion 2182*a* comprises a base 2180*a* which engages the body portion 2115*a*. The guide portion 2182*a* has a linear funnel-shape which tapers towards the base 2180*a*. It will be appreciated that in other embodiments, the guide portion may comprise a base and a wall, and wherein the wall extends generally orthogonally from the base. Alternatively or additionally, in embodiments, the guide portion may comprise a base and a wall, and wherein the wall tapers towards the base. FIG. 21*b* Is the same as FIG. 21*a*, except that the guide portion 2182*b* has an exponential/curved follow-shape that tapers towards the base 2180*b*. FIG. 21*c* is the same as FIG. 21*a*, except that the body portion 2115*c* comprises the guide portion 2182*c* towards its top slanted surface 2178*c*. In this way, the funnel-shaped guide portion 2182*c* is built within the body portion 2115*c*. It will be appreciated that the width of the body portion 2115*c* can be as narrow as the valve 2113*c* or as wide as the guide portion 2182*c*. FIG. 21*d* is the same as FIG. 21*a*, except that the guide portion 2182*d* has a flat surface 2176*d* which extends outwardly and away from the valve 2113*d*. In this embodiment, therefore, the guide portion 2182*d* is parallel with and sits on the top flat surface 2174*d* of the body portion 2115*d*. It will be appreciated that the guide portion may be detachably attachable to the body portion, or comprised within the body portion, in any of the suitable embodiments defined herein. Although not shown, it will be understood that the guide portion may be detachably attachable to a securing portion.

Figure 22:
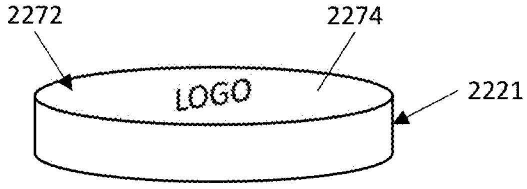
FIG. 22 is a perspective view of a cap in accordance with an embodiment of the invention.

Referring now to FIG. 22, that is shown a perspective view of a cap 2221 in accordance with an embodiment of the invention. The cap 2221 is substantially similar to that shown in FIG. 2, except that it comprises a logo on its top flat surface 2274. In this way, the cap 2221 comprises an exterior surface 2272 for displaying advertising indicia or decoration. It will be appreciated that in some embodiments, it may be that the securing portion comprises an exterior surface for displaying advertising indicia or decoration. Alternatively or additionally, in some embodiments, the body portion may comprise an exterior surface for displaying advertising indicia or decoration. It will be appreciated that the cap 2221 may be a separate component or formed as part of another component formed in accordance with the present invention. The cap 2221 may be configured to engage a body portion (not shown) or a guide portion (not shown). It may be that the cap 2221 is connectable to a body portion (not shown) or a guide portion (not shown) by screwing thereon, by clipping thereon, by a hinge connection, by a string attachment, or by a push-pull connection, for instance. It will be appreciated that any receptacle device formed in accordance with the invention defined herein may utilize the cap described herein.

Figure 23A:
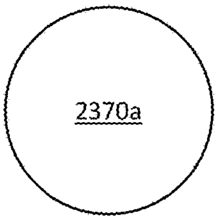
FIGS. 23*a* to 23*r* are a collection of side and perspective views of various shapes of a body portion, anchor portion, securing portion and/or cap in accordance with embodiments of the invention.
Figure 23B:
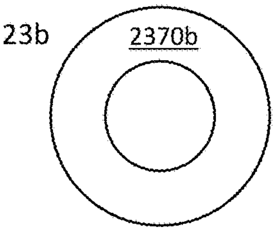
Figure 23C:
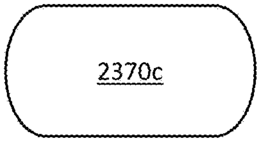
Figure 23D:
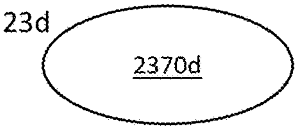
Figure 23E:
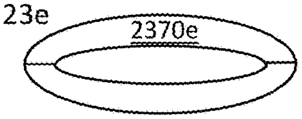
Figure 23F:
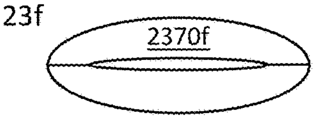
Figure 23G:
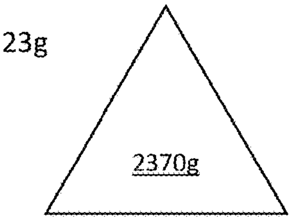
Figure 23H:
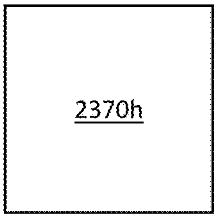
Figure 23I:
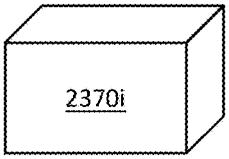
Figure 23J:
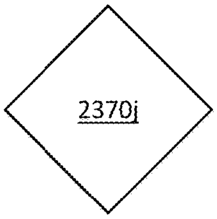
Figure 23K:
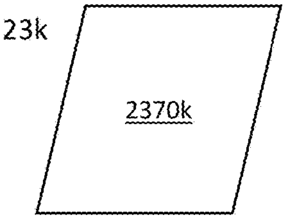
Figure 23L:
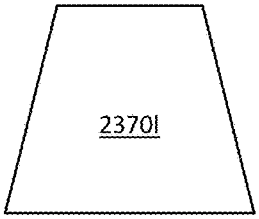
Figure 23M:
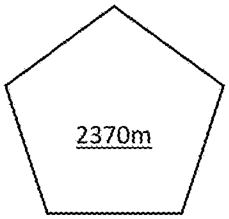
Figure 23N:
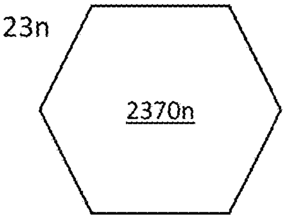
Figure 23O:
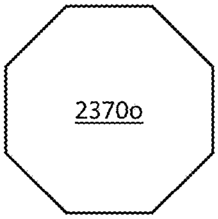
Figure 23P:
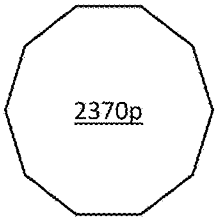
Figure 23Q:
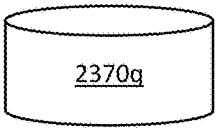
Figure 23R:
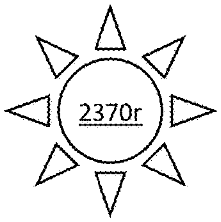

Referring now to FIGS. 23*a* to 23*r*, there is shown a collection of side and perspective views of various shapes of a body portion, anchor portion, securing portion and/or cap in accordance with embodiments of the invention. These shapes include a circle 2370*a*; an annulus 2370*b*; a stadium 1370*c*; an ellipse 2370*d*; an oval-shaped ring 2370*e*; human-lip-shape 2370*f*; a triangle 2370*g*; a square 2370*h*; a rectangular prism 2370*i*; a diamond 2370*j*; a rhombus 2370*k*; a trapezoid 23701; a pentagon 2370*m*; a hexagon 2370*n*; an octagon 2370*o*; a decagon 2370*p*; a cylinder 2370*q*; and a sun-like shape 2370*r*.

Figure 24A:
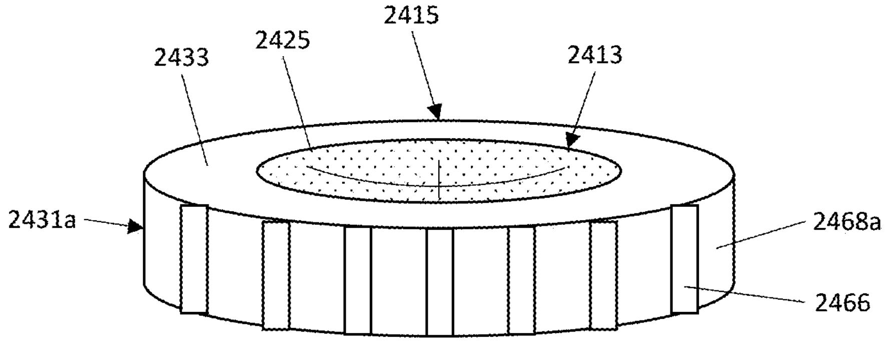
FIG. 24*a* is a perspective view of a body portion in accordance with an embodiment of the invention comprising gripping ridges.

Referring now to FIG. 24*a* there is shown a perspective view of a body portion 2415 in accordance with an embodiment of the invention comprising gripping ridges 2466. The body portion 2415 is a short cylinder 2431*a* with a hole 2425 through its center. At the top 2433 of the short cylinder 2431*a* is located a valve 2413. The short cylinder 2431*a* comprises an outer circular wall 2468*a* on which are equidistantly placed the gripping ridges 2466 about the entire perimeter thereof. The gripping ridges 2466 facilitate assembly/installation of the receptacle device formed according to the present invention. The gripping ridges 2466 also find utility during use of the receptacle device as an aid to the user to grip the body portion 2415 while inserting or removing a drinking, feeding or inhaling instrument from the valve 2413, for instance. It will be appreciated that in at least some embodiments, a securing portion may comprise gripping ridges. The gripping ridges may be equidistantly positioned about a perimeter of such a securing portion.

Figure 24B:
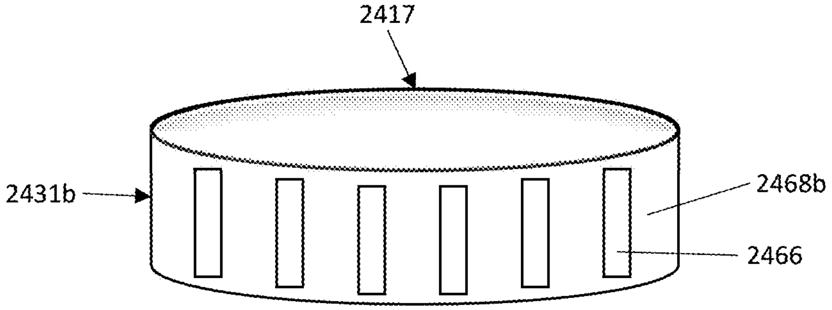
FIG. 24*b* is a perspective view of an anchor portion in accordance with an embodiment of the invention comprising gripping ridges.

Referring now to FIG. 24*b*, there is show a perspective view of an anchor portion 2417 in accordance with an embodiment of the invention comprising gripping ridges 2466. In this embodiment, the anchor portion 2417 is a short cylinder 2431*b* comprising an outer circular wall 2468*b* on which are equidistantly placed the gripping ridges 2466 about the entire perimeter thereof. The gripping ridges 2466 facilitate assembly/installation of the receptacle device formed according to the present invention to help connect the anchor portion 2417 to other parts of the receptacle device, for instance.

Figure 25A:
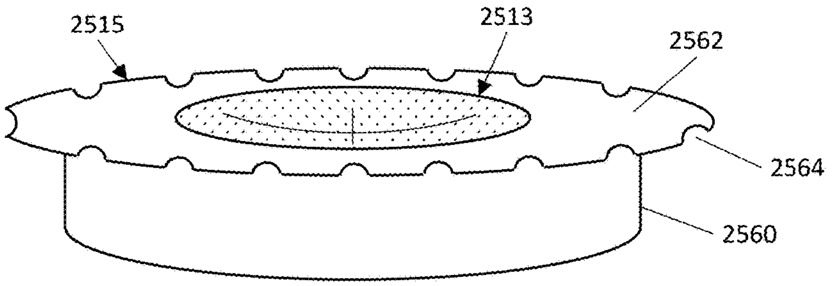
FIG. 25*a* is a perspective view of a body portion in accordance with an embodiment of the invention comprising gripping notches.

Referring now to FIG. 25*a*, there is shown a perspective view of a body portion 2515 in accordance with an embodiment of the invention comprising gripping notches. The body portion 2515 surrounds a valve 2513, as shown in other embodiments herein. In this embodiment, the body portion 2515 comprises a top annulus 2562 which surrounds the valve 2513, and an annular skirt 2560 that extends orthogonally downwardly from the plane of the top annulus 2562. The top annulus 2562 comprises gripping notches 2564 about its entire perimeter that are equidistantly spaced from one another. The gripping notches 2564 facilitate gripping while installation and use of a receptacle device formed in accordance with the present invention which includes said gripping notches 2564.

Figure 25B:
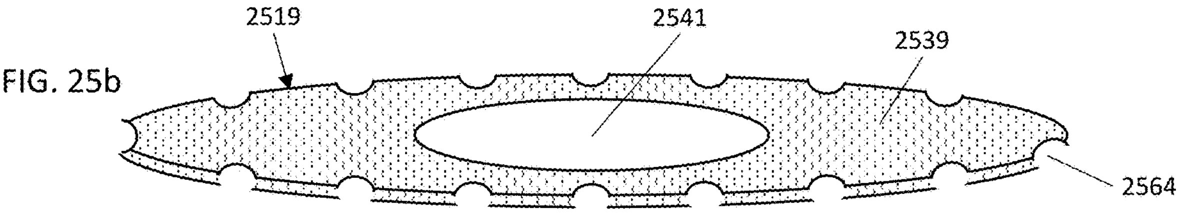
FIG. 25*b* is a perspective view of a securing portion in accordance with an embodiment of the invention comprising gripping notches.

Referring now to FIG. 25*b*, there is shown a perspective view of a securing portion 2519 in accordance with an embodiment of the invention comprising gripping notches 2564. In this embodiment, the securing portion 2519 is a ring 2539 comprising a hole 2541 at its center. The ring 2539 comprises gripping notches 2564 about its entire perimeter that are equidistantly spaced from one another. The gripping notches 2564 facilitate gripping while installation and use of a receptacle device formed in accordance with the present invention which includes said gripping notches 2564.

Figure 25C:
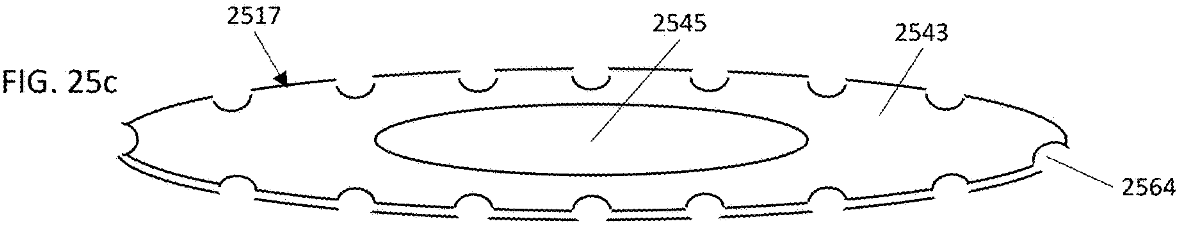
FIG. 25*c* is a perspective view of an anchor portion in accordance with an embodiment of the invention comprising gripping notches.

Referring now to FIG. 25*c*, there is shown a perspective view of an anchor portion 2517 in accordance with an embodiment of the invention comprising gripping notches 2564. In this embodiment, the anchor portion 2517 is a ring 2543 comprising a hole 2545 at its center. The ring 2543 comprises gripping notches 2564 about its entire perimeter that are equidistantly spaced from one another. The gripping notches 2564 facilitate gripping while installation and use of a receptacle device formed in accordance with the present invention which includes said gripping notches 2564.

Figure 25D:
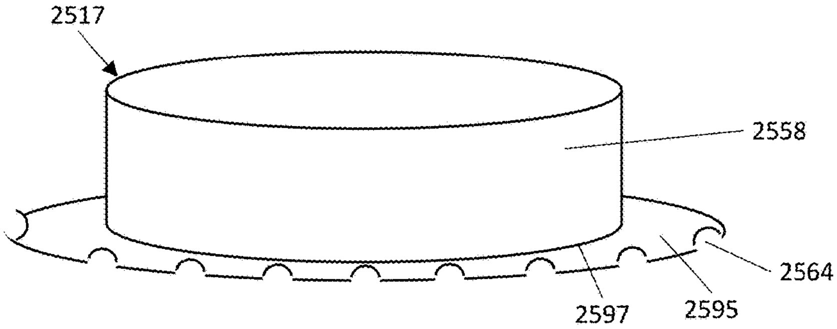
FIG. 25*d* is a perspective view of an anchor portion in accordance with another embodiment of the invention comprising gripping notches.

Referring now to FIG. 25*d*, there is shown a perspective view of an anchor portion 2517 in accordance with another embodiment of the invention comprising gripping notches 2564. The anchor portion in 2517 comprises a short cylinder 2558, which has a circular base 2597. The anchor portion 2517 also comprises a lip 2595 which extends about the perimeter of the circular base 2597. The lip 2595 comprises gripping notches 2564 about its entire perimeter that are equidistantly spaced from one another. The gripping notches 2564 facilitate gripping while installation and use of a receptacle device formed in accordance with the present invention which includes said gripping notches 2564. It will be appreciated that any receptacle device formed in accordance with the invention defined herein may utilize any of the gripping notch embodiments described herein, for example, those shown in FIGS. 25*a* to 25*d*.

Figure 26A:
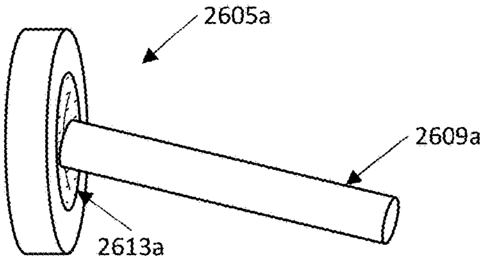
FIG. 26*a* is a perspective view of a receptacle device in accordance with an embodiment of the invention in operation receiving a drinking, feeding or inhalation instrument.

Referring now to FIG. 26*a*, there is shown a perspective view of a receptacle device 2605*a* in accordance with an embodiment of the invention in operation receiving a drinking instrument 2609*a*, constituted by a straw 2609*a*, through a valve 2613*a*.

Figure 26B:
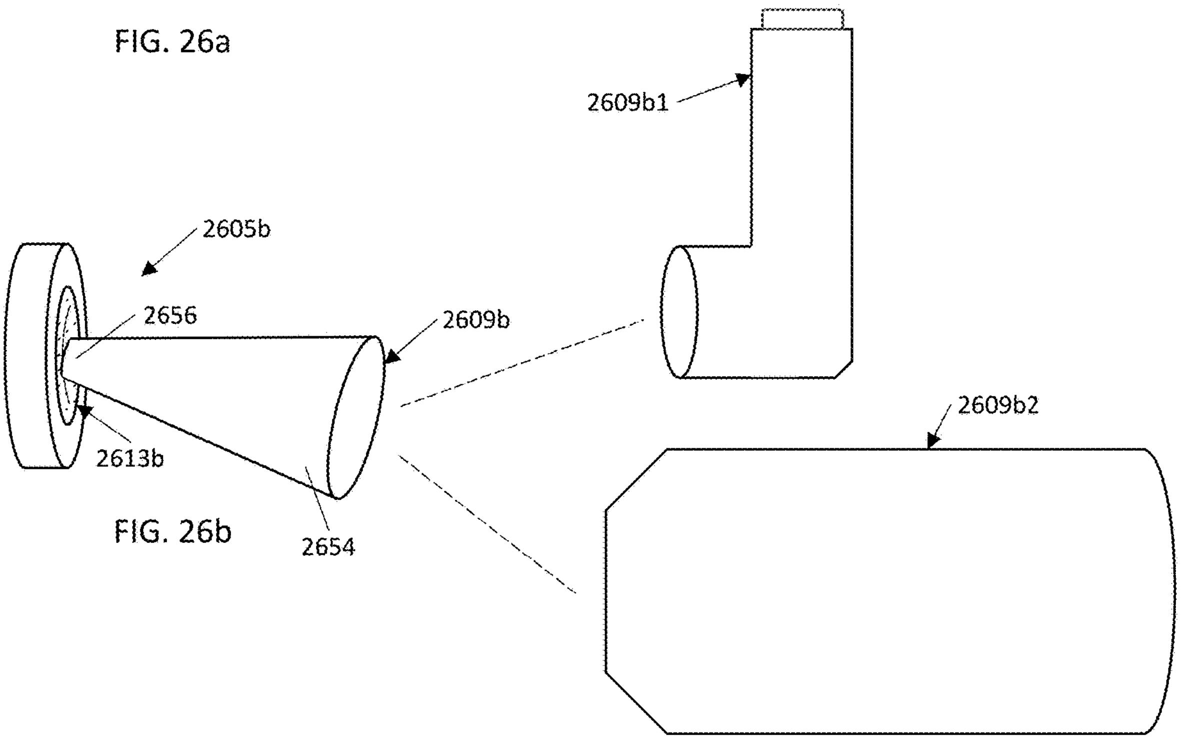
FIG. 26*b* is a perspective view of a receptacle device in accordance with an embodiment of the invention in operation receiving an adapter.

FIG. 26*b* is a perspective view of a receptacle device 2605*b* in accordance with an embodiment of the invention in operation receiving an adapter 2609*b*. In this embodiment, the adapter 2609*b* is cone-shaped such that the smaller end 2656 is inserted into the valve 2613*b* of the receptacle device 2605*b*, while the larger end 2654 functions to engage drinking, feeding or inhalation instruments, such as an L-shaped inhaler 2609*b*1 or a cylindrical squeeze bottle 2609*b*2. It will be understood that in other embodiments, the adapter may have any suitable shape to allow it to adapt to sources of drink, food and air; the shape may cylindrical, for instance.

Figure 26C:
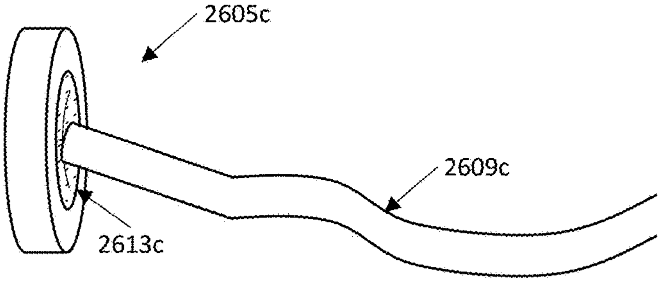
FIG. 26*c* is a perspective view of a receptacle device in accordance with an embodiment of the invention in operation receiving a tube/hose.

Referring now to FIG. 26*c*, there is shown a perspective view of a receptacle device 2605*c* in accordance with an embodiment of the invention in operation receiving a tube/hose 2609*c*. The tube/hose 2609*c* is received by a valve 2613*c* of the receptacle device 2605*c*. In this embodiment, the tube/hose 2609*c* is flexible and may be a source of liquid beverage, food or air from a ventilator, for instance. It will be appreciated that any suitable drinking, feeding or inhalation instrument may be utilized with a receptacle device formed according to the present invention, which drinking, feeding or inhalation instrument may be at least one selected from a straw, a bottle pourer, a spout, a squeeze bottle, a tube, a hose, a nebulizer, a smoking apparatus, an e-cigarette, a vape pen, an inhaler, and a ventilator, for example.

As used in this document, both in the description and in the claims, and as customarily used in the art, the words "substantially," "approximately," and similar terms of approximation are used to account for manufacturing tolerances, manufacturing variations, and manufacturing imprecisions that are inescapable parts of fabricating any mechanism or structure in the physical world.

While the invention has been described in detail, it will be apparent to one skilled in the art that various changes and modifications can be made and equivalents employed, without departing from the present invention. It is to be understood that the invention is not limited to the details of construction, the arrangements of components, and/or the method set forth in the above description or illustrated in the drawings. Statements in the abstract of this document, and any summary statements in this document, are merely exemplary; they are not, and cannot be interpreted as, limiting the scope of the claims. Further, the figures are merely exemplary and not limiting. Topical headings and subheadings are for the convenience of the reader only. They should not and cannot be construed to have any substantive significance, meaning or interpretation, and should not and cannot be deemed to indicate that all of the information relating to any particular topic is to be found under or limited to any particular heading or subheading. The purpose of the Abstract of this document is to enable the U.S. Patent and Trademark Office, as well as readers who are not familiar with patent or legal terms or phraseology, to determine quickly from a cursory inspection the nature and essence of the technical disclosure of the application. The Abstract is not intended to define the invention, nor is it intended to limit to the scope of the invention.

The invention claimed is:

1. A face mask receptacle device comprising:

a valve comprising at least one slit;

a body portion surrounding the valve; and an anchor portion;

wherein at least one of the body portion or anchor portion is elastic;

wherein the body portion and the anchor portion are inseparable by being integrally formed as one continuous piece;

wherein the one continuous piece is configured to protrude through a hole of the face mask that, in an assembled configuration, the body portion and the at least one slit are in an exterior region of the face mask and the anchor portion is in an interior region of the face mask;

wherein the valve is configured to receive a drinking, feeding or inhalation instrument therethrough; and wherein the valve is structurally concave in a non-deformed state prior to receiving the drinking, feeding or inhalation instrument therethrough.

2. The receptacle device of claim 1, wherein the valve is a self-sealing valve.

3. The receptacle device of claim 1, wherein the valve is flexibly suspended from the body portion.

4. The receptacle device of claim 1, wherein at least one of the body portion and anchor portion comprises gripping ridges or gripping notches.

5. The receptacle device of claim 1, wherein the at least one slit comprises a slit pattern.

6. The receptacle device of claim 5, wherein the slit pattern is configured to conform to the shape of a drinking, feeding or inhalation instrument when inserted through the valve, and/or wherein the slit pattern is configured to releasably grip and hold in position a drinking, feeding or inhalation instrument when inserted through the valve.

7. The receptacle device of claim 1, wherein the anchor portion comprises a surface for a user's lips to brace against when inserting a drinking, feeding or inhalation instrument through the valve.

8. The receptacle device of claim 1, comprising a securing portion that is configured to engage at least one of the body portion, the anchor portion, and the mask.

9. The receptacle device of claim 8, wherein the securing portion comprises gripping ridges or gripping notches.

10. The receptacle device of claim 1, comprising a guide portion.

11. The receptacle device of claim 10, wherein the guide portion comprises a base and a wall, and wherein the wall tapers towards the base.

12. The receptacle device of claim 1, wherein the body portion is configured to protrude through the hole in the mask.

13. The receptacle device of claim 8, wherein the body portion is configured to protrude through a hole in the securing portion.

14. The receptacle device of claim 1, wherein at least one of the body portion and anchor portion is configured to engage the mask by at least one of plastic joining, adhesive bonding, welding, mechanical fastening, stitching, and magnetic elements.

15. The receptacle device of claim 1, wherein the anchor portion and the body portion define a channel therebetween, and the channel is configured to releasably engage the mask.

16. The receptacle device of claim 15, wherein the channel is a groove.

17. The receptacle device of claim 15, wherein the mask is trapped within the channel to generate a substantially hermetic seal.

18. The receptacle device of claim 2, wherein the self-sealing valve is configured to generate a hermetic seal.

19. The receptacle device of claim 5, wherein the slit pattern generates valve petals.

20. The receptacle device of claim 8, wherein the securing portion is configured to engage the mask by at least one of plastic joining, adhesive bonding, welding, mechanical fastening, stitching, and magnetic elements.

21. The receptacle device of claim 1, wherein the valve is hemispherical.

22. The receptacle device of claim 1, wherein the anchor portion is configured to be substantially flush with an inner surface of the mask.

23. The receptacle device of claim 3, comprising a suspension ridge that connects the flexibly suspended valve and the body portion.

24. The receptacle device of claim 23, wherein the suspension ridge, the flexibly suspended valve, and the body portion define a space therebetween; and wherein the space is collapsible on application of a force against the body portion.

25. The receptacle device of claim 8, wherein the anchor portion and the body portion define a channel therebetween, and the channel is configured to releasably engage the securing portion.

* * * * *